US012701570B2

(12) United States Patent
Zhang et al.

(10) Patent No.: US 12,701,570 B2
(45) Date of Patent: Aug. 4, 2026

(54) METHOD PERFORMED BY TERMINAL AND BASE STATION IN WIRELESS COMMUNICATION SYSTEM

(71) Applicant: Samsung Electronics Co., Ltd., Suwon-si (KR)

(72) Inventors: Sa Zhang, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 296 days.

(21) Appl. No.: 18/475,802

(22) Filed: Sep. 27, 2023

(65) Prior Publication Data

US 2024/0107527 A1    Mar. 28, 2024

(30) Foreign Application Priority Data

Sep. 28, 2022    (CN) .......................... 202211194287.7
Nov. 4, 2022    (CN) ......................... 202211379180.X
Mar. 31, 2023    (CN) .......................... 202310345143.5

(51) Int. Cl.
| | |
|---|---|
| *H04W 72/11* | (2023.01) |
| *H04L 1/00* | (2006.01) |
| *H04W 72/1268* | (2023.01) |
| *H04W 72/232* | (2023.01) |

(52) U.S. Cl.
CPC ....... *H04W 72/1268* (2013.01); *H04L 1/0003* (2013.01); *H04L 1/0061* (2013.01); *H04W 72/11* (2023.01); *H04W 72/232* (2023.01)

(58) Field of Classification Search
CPC ............. H04W 72/1268; H04W 72/11; H04W 72/232; H04L 1/0003; H04L 1/0061

USPC .......................................................... 370/329
See application file for complete search history.

(56) References Cited

U.S. PATENT DOCUMENTS

2020/0081130 A1* 3/2020 Modarres Razavi ... G01S 19/44

FOREIGN PATENT DOCUMENTS

KR    10-2022-0090565 A    6/2022

OTHER PUBLICATIONS

NTT Docomo, Inc., Discussion on multi-cell PUSCH/PDSCH scheduling with a single DCI, R1-2204398, 3GPP TSG RAN WG1 #109-e, e-Meeting, Apr. 28, 2022.
Fujitsu, Remaining issues of multi-PDSCH/PUSCH scheduling via a single DCI, R1-2203708, 3GPP TSG RAN WG1 #109-e, e-Meeting, Apr. 25, 2022.
Moderator (ZTE Corporation), Feature lead summary #3 on UE support for two overlapping CRS rate matching patterns, R1-2205499, 3GPP TSG RAN WG1 #109-e, e-Meeting, May 20, 2022.

(Continued)

*Primary Examiner* — Christopher R Crompton
(74) *Attorney, Agent, or Firm* — Jefferson IP Law, LLP

(57) ABSTRACT

The disclosure relates to a 5G or 6G communication system for supporting a higher data transmission rate. A method performed by a terminal in a wireless communication system is provided. The method includes receiving, from a base station on a first cell, first downlink control information (DCI) for scheduling multiple physical downlink shared channels (PDSCHs) on first multiple cells and receiving, from the base station, the multiple PDSCHs on the first multiple cells based on the first DCI. at least one CRC of the first DCI is scrambled with at least one of a cell radio network temporary identifier (C-RNTI) or a modulation coding scheme (MCS)-C-RNTI.

20 Claims, 23 Drawing Sheets

(56)               References Cited

OTHER PUBLICATIONS

Nokia et al., On multi-cell PUSCH/PDSCH scheduling with a single
DCI, R1-2203276, 3GPP TSG RAN WG1 #109-e, e-Meeting, Apr.
29, 2022.
International Search Report dated Jan. 12, 2024, issued in Interna-
tional Application No. PCT/KR2023/015091.

* cited by examiner

116

310

305

330

325

SPEAKER

RX PROCESSING CIRCUITRY

RF TRANSCEIVER

320

315

MICROPHONE

TX PROCESSING CIRCUITRY

345

340

350

I/O IF

PROCESSOR/C ONTROLLER

INPUT DEVICE(S)

DISPLAY

355

360

STORAGE

OPERATING SYSTEM — 361

APPLICATIONS — 362

| Row Index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2,3 | Type B | 0 | 5 | 7 |
| 9 | 2,3 | Type B | 0 | 5 | 2 |
| 10 | 2,3 | Type B | 0 | 9 | 2 |
| 11 | 2,3 | Type B | 0 | 12 | 2 |
| 12 | 2,3 | Type A | 0 | 1 | 13 |
| 13 | 2,3 | Type A | 0 | 1 | 6 |
| 14 | 2,3 | Type A | 0 | 2 | 4 |
| 15 | 2,3 | Type B | 0 | 4 | 7 |
| 16 | 2,3 | Type B | 0 | 8 | 4 |

FIG.7A

| Row Index | $\{K_0, S, L\}$ set |
|-----------|---------------------|
| 1 | $\{0, 0, 7\}, \{1, 2, 7\}, \{2, 4, 4\}$ |
| 2 | $\{1, 3, 4\}, \{3, 5, 7\}$ |
| 3 | $\{0, 0, 7\}, \{3, 7, 7\}$ |

FIG.7B

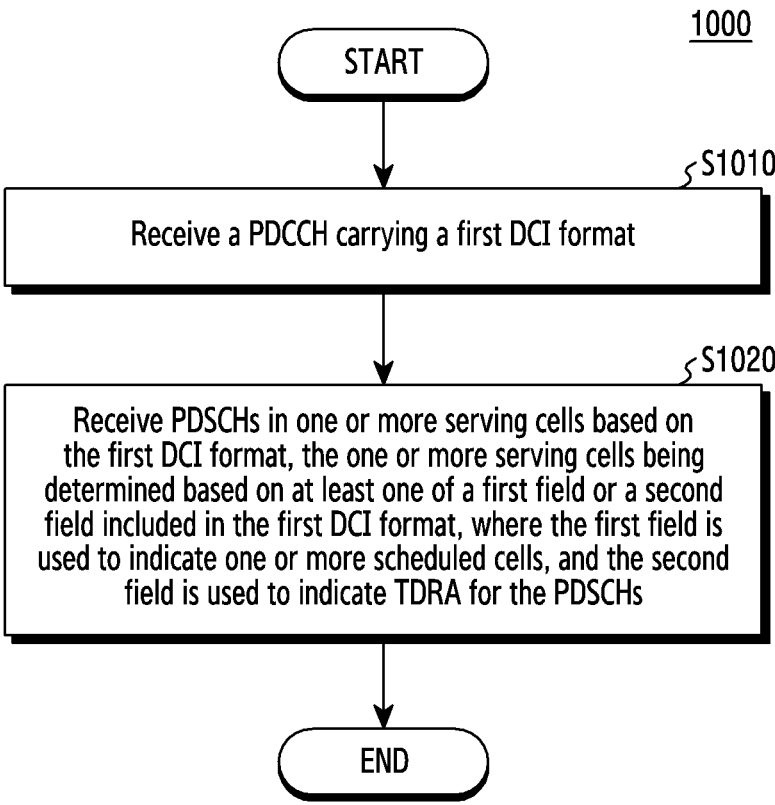

1000

START

S1010

Receive a PDCCH carrying a first DCI format

S1020

Receive PDSCHs in one or more serving cells based on the first DCI format, the one or more serving cells being determined based on at least one of a first field or a second field included in the first DCI format, where the first field is used to indicate one or more scheduled cells, and the second field is used to indicate TDRA for the PDSCHs

END

FIG.10

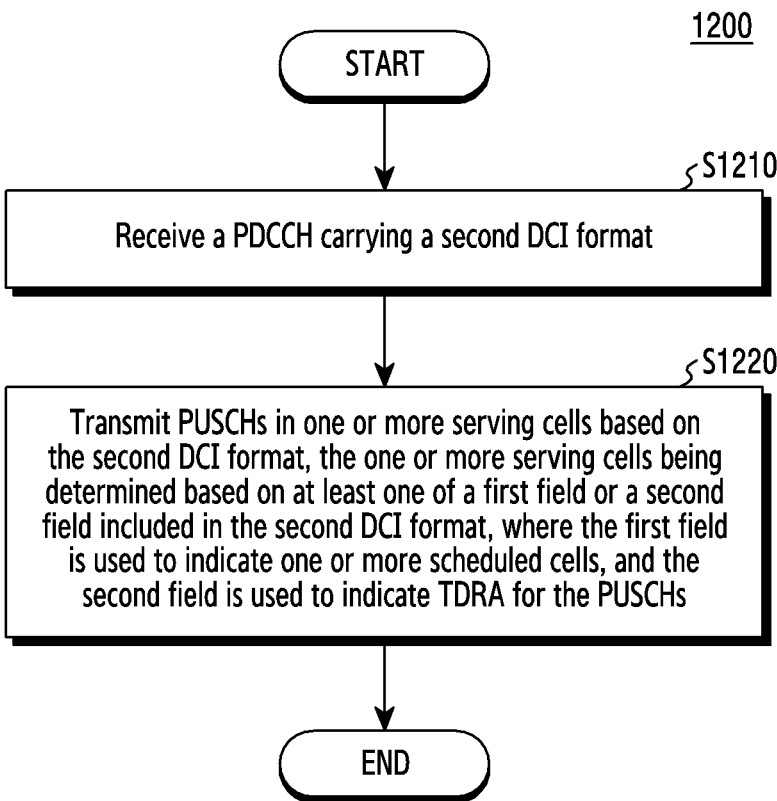

1200

START

S1210

Receive a PDCCH carrying a second DCI format

S1220

Transmit PUSCHs in one or more serving cells based on the second DCI format, the one or more serving cells being determined based on at least one of a first field or a second field included in the second DCI format, where the first field is used to indicate one or more scheduled cells, and the second field is used to indicate TDRA for the PUSCHs

END

FIG.12

METHOD PERFORMED BY TERMINAL AND BASE STATION IN WIRELESS COMMUNICATION SYSTEM

CROSS-REFERENCE TO RELATED APPLICATION(S)

This application is based on and claims priority under 35 U.S.C. § 119(a) of a Chinese patent application number 202211194287.7, filed on Sep. 28, 2022, in the China National Intellectual Property Administration, of a Chinese patent application number 202211379180.X, filed on Nov. 4, 2022, in the China National Intellectual Property Administration, and of a Chinese patent application number 202310345143.5, filed on Mar. 31, 2023, in the China National Intellectual Property Administration, the disclosure of each of which is incorporated by reference herein in its entirety.

BACKGROUND

1. Field

The disclosure relates to a wireless communication system. More particularly, the disclosure relates to a method performed by a terminal and a base station in a wireless communication system.

2. Description of Related Art

5th generation (5G) mobile communication technologies define broad frequency bands such that high transmission rates and new services are possible, and can be implemented not only in "Sub 6 GHz" bands such as 3.5 GHz, but also in "Above 6 GHz" bands referred to as millimeter wave (mmWave) including 28 GHz and 39 GHz. In addition, it has been considered to implement 6th generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multiple input multiple output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method performed by a terminal and a base station in a wireless communication system.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes receiving, from a base station on a first cell, first downlink control information (DCI) for scheduling multiple physical downlink shared channels (PDSCHs) on first multiple cells and receiving, from the base station, the multiple PDSCHs on the first multiple cells based on the first DCI. At least one cyclic redundancy check (CRC) of the first DCI is scrambled with at least one of a first cell radio network temporary identifier (C-RNTI) or a first modulation coding scheme (MCS)-C-RNTI.

In accordance with another aspect of the disclosure, a terminal in a wireless communication system is provided. The terminal includes a transceiver and at least one processor coupled with the transceiver and configured to receive, from a base station on a first cell, first downlink control information (DCI) for scheduling multiple physical downlink shared channels (PDSCHs) on first multiple cells, and receive, from the base station, the first multiple PDSCHs on the multiple cells based on the first DCI. At least one cyclic redundancy check (CRC) of the first DCI is scrambled with at least one of a first cell radio network temporary identifier (C-RNTI) or a first modulation coding scheme (MCS)-C-RNTI.

In accordance with another aspect of the disclosure, a method performed by a base station in a wireless communication system is provided. The method includes transmitting, to a terminal on a first cell, first downlink control information (DCI) for scheduling multiple physical downlink shared channels (PDSCHs) on first multiple cells and transmitting, to the terminal, the multiple PDSCHs on the first multiple cells based on the first DCI. At least one cyclic redundancy check (CRC) of the first DCI is scrambled with at least one of a first cell radio network temporary identifier (C-RNTI) or a first modulation coding scheme (MCS)-C-RNTI.

In accordance with another aspect of the disclosure, a base station in a wireless communication system is provide. The base station includes a transceiver and at least one processor coupled with the transceiver and configured to transmit, to a terminal on a first cell, first downlink control information (DCI) for scheduling multiple physical downlink shared channels (PDSCHs) on first multiple cells and transmit, to the terminal, the multiple PDSCHs on the first multiple cells based on the first DCI. At least one cyclic redundancy check (CRC) of the first DCI is scrambled with at least one of a first cell radio network temporary identifier (C-RNTI) or a first modulation coding scheme (MCS)-C-RNTI.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7A illustrates examples of time domain resource allocation tables according to an embodiment of the disclosure;

FIG. 7B illustrates examples of time domain resource allocation tables according to an embodiment of the disclosure;

FIG. 10 a flowchart of a method performed by a terminal according to an embodiment of the disclosure;

FIG. 12 a flowchart of a method performed by a terminal according to an embodiment of the disclosure;

Throughout the drawings, it should be noted that like reference numbers are used to depict the same or similar elements, features, and structures.

DETAILED DESCRIPTION

Figure 1:
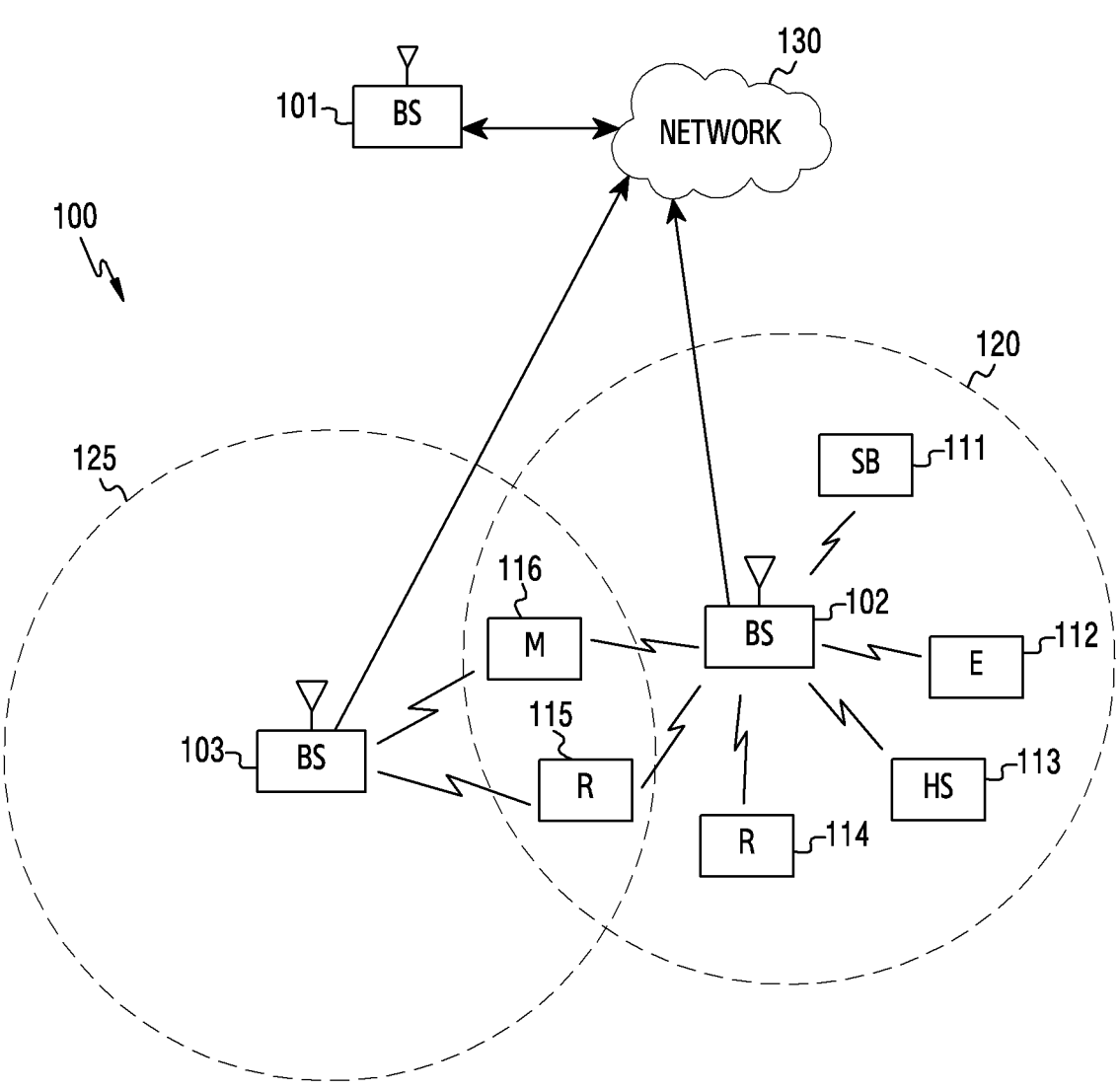
FIG. 1 illustrates a schematic diagram of an example wireless network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, connect to, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C. For example, "at least one of: A, B, or C" includes any of the following combinations: A, B, C, A and B, A and C, B and C, and A, B and C.

Moreover, various functions described below can be implemented or supported by one or more computer programs, each of which is formed from computer-readable program code and embodied in a computer-readable medium. The terms "application" and "program" refer to one or more computer programs, software components, sets of instructions, procedures, functions, objects, classes, instances, related data, or a portion thereof adapted for implementation in a suitable computer-readable program code. The phrase "computer-readable program code" includes any type of computer code, including source code, object code, and executable code. The phrase "computer-readable medium" includes any type of medium capable of being accessed by a computer, such as Read-Only Memory (ROM), Random Access Memory (RAM), a hard disk drive, a Compact Disc (CD), a Digital Versatile Disc (DVD), or any other type of memory. A "non-transitory" computer-readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

Terms used herein to describe the embodiments of the disclosure are not intended to limit and/or define the scope of the disclosure. For example, unless otherwise defined, the technical terms or scientific terms used in the disclosure shall have the ordinary meaning understood by those with ordinary skills in the art to which the disclosure belongs.

It should be understood that "first", "second" and similar words used in the disclosure do not express any order, quantity or importance, but are only used to distinguish different components.

As used herein, any reference to "an example" or "example", "an implementation" or "implementation", "an embodiment" or "embodiment" means that particular elements, features, structures or characteristics described in connection with the embodiment is included in at least one embodiment. The phrases "in one embodiment" or "in one example" appearing in different places in the specification do not necessarily refer to the same embodiment.

As used herein, "a portion of" something means "at least some of" the thing, and as such may mean less than all of, or all of, the thing. As such, "a portion of" a thing includes the entire thing as a special case, i.e., the entire thing is an example of a portion of the thing.

As used herein, the term "set" means one or more. Accordingly, a set of items can be a single item or a collection of two or more items.

In this disclosure, to determine whether a specific condition is satisfied or fulfilled, expressions, such as "greater than" or "less than" are used by way of example and expressions, such as "greater than or equal to" or "less than or equal to" are also applicable and not excluded. For example, a condition defined with "greater than or equal to" may be replaced by "greater than" (or vice-versa), a condition defined with "less than or equal to" may be replaced by "less than" (or vice-versa), etc.

It will be further understood that similar words such as the term "include" or "comprise" mean that elements or objects appearing before the word encompass the listed elements or objects appearing after the word and their equivalents, but other elements or objects are not excluded. Similar words such as "connect" or "connected" are not limited to physical or mechanical connection, but can include electrical connection, whether direct or indirect. "upper", "lower", "left" and "right" are only used to express a relative positional relationship, and when an absolute position of the described object changes, the relative positional relationship may change accordingly.

The various embodiments discussed below for describing the principles of the disclosure in the patent document are for illustration only and should not be interpreted as limiting the scope of the disclosure in any way. Those skilled in the art will understand that the principles of the disclosure can be implemented in any suitably arranged wireless communication system. For example, although the following detailed description of the embodiments of the disclosure will be directed to long term evolution (LTE) and/or 5G communication systems, those skilled in the art will understand that the main points of the disclosure can also be applied to other communication systems with similar technical backgrounds and channel formats with slight modifications without departing from the scope of the disclosure. The technical schemes of the embodiments of the application can be applied to various communication systems, and for example, the communication systems may include global systems for mobile communications (GSM), code division multiple access (CDMA) systems, wideband code division multiple access (WCDMA) systems, general packet radio service (GPRS) systems, long term evolution (LTE) systems, LTE frequency division duplex (FDD) systems, LTE time division duplex (TDD) systems, universal mobile telecommunications system (UMTS), worldwide interoperability for microwave access (WiMAX) communication systems, 5th generation (5G) systems or new radio (NR) systems, etc. In addition, the technical schemes of the embodiments of the application can be applied to future-oriented communication technologies.

Hereinafter, the embodiments of the disclosure will be described in detail with reference to the accompanying drawings. It should be noted that the same reference numerals in different drawings will be used to refer to the same elements already described.

The following FIGS. 1, 2A, 2B, 3A, and 3B describe various embodiments implemented by using orthogonal frequency division multiplexing (OFDM) or orthogonal frequency division multiple access (OFDMA) communication technologies in wireless communication systems. The descriptions of FIGS. 1, 2A, 2B, 3A, and 3B do not mean physical or architectural implications for the manner in which different embodiments may be implemented. Different embodiments of the disclosure may be implemented in any suitably arranged communication systems.

In order to meet the increasing demand for wireless data communication services since the deployment of 4th generation (4G) communication systems, efforts have been made to develop improved 5G or pre-5G communication systems. Therefore, 5G or pre-5G communication systems are also called "Beyond 4G networks" or "Post-LTE systems".

In order to achieve a higher data rate, 5G communication systems are implemented in higher frequency (millimeter wave (mmWave)) bands, e.g., 60 GHz bands. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, hybrid frequency shift keying (FSK) and quadrature amplitude modulation (QAM) (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

According to at least one embodiment of the disclosure, a method performed by a terminal in a wireless communication system is provided. The method includes: receiving a physical downlink control channel (PDCCH) carrying a first downlink control information (DCI) format; and for at least one serving cell, validating the PDCCH for activation or release of semi-persistent scheduling (SPS) physical downlink shared channel (PDSCHs), or receiving a retransmission of the SPS PDSCHs. The at least one serving cell is determined based on the first DCI format.

According to at least one embodiment of the disclosure, a method performed by a terminal in a wireless communication system is provided. The method includes: receiving a PDCCH carrying a first DCI format; and receiving PDSCHs in one or more serving cells based on the first DCI format. The one or more serving cells are determined based on at least one of a first field or a second field included in the first DCI format, where the first field is used to indicate one or more scheduled cells, and where the second field is used to indicate time domain resource allocation (TDRA) for the PDSCHs.

According to at least one embodiment of the disclosure, a method performed by a terminal in a wireless communication system is provided. The method includes: receiving a PDCCH carrying a second DCI format; and for at least one serving cell, validating the PDCCH for activation or release of configured grant (CG) PUSCHs, or retransmitting the CG PUSCHs. The at least one serving cell is determined based on the second DCI format.

According to at least one embodiment of the disclosure, a method performed by a terminal in a wireless communication system is provided. The method includes: receiving a PDCCH carrying a second DCI format; and transmitting PUSCHs in one or more serving cells based on the second DCI format. The one or more serving cells are determined based on at least one of a first field or a second field included in the second DCI format, where the first field is used to indicate one or more scheduled cells, and where the second field is used to indicate TDRA for the PUSCHs.

According to at least one embodiment of the disclosure, a method performed by a terminal in a wireless communication system is provided. The method includes: receiving configuration information related to HARQ-ACK deferral; receiving one or more semi-persistent scheduling (SPS) physical downlink shared channels (PDSCHs); and determining to defer a transmission of a first HARQ-ACK information bit for at least one of the one or more SPS PDSCHs based on a first time.

In an embodiment, for example, the first time is determined based on a second time, where the second time includes at least one of:

a start position or an end position of a first physical uplink control channel (PUCCH) which is a PUCCH with the first HARQ-ACK information bit;

a start position of an earliest PUCCH or PUSCH among the first PUCCH and one or more PUCCHs or physical uplink shared channels (PUSCHs) overlapping with the first PUCCH;

a start position or an end position of an uplink time unit of one or more uplink time units that include a first uplink time unit where the first PUCCH is located and/or a second uplink time unit after the first uplink time unit;

a start position or an end position of a second PUCCH, where the second PUCCH carries a third HARQ-ACK information bit that includes a second HARQ-ACK information bit from the first HARQ-ACK information bit, and/or the second PUCCH is located in the second uplink time unit;

a start position of an earliest PUCCH or PUSCH among the second PUCCH and/or one or more PUCCHs or PUSCHs overlapping with the second PUCCH;

a start position or an end position of a third PUCCH which is a PUCCH with a fourth HARQ-ACK information bit in the second uplink time unit;

a start position of an earliest PUCCH or PUSCH among the third PUCCH and/or one or more PUCCHs or PUSCHs overlapping with the third PUCCH; or a start position of an earliest PUCCH or PUSCH of a set of overlapping PUCCHs or PUSCHs, where the set of overlapping PUCCHs or PUSCHs includes at least one of the first PUCCH, the second PUCCH or the third PUCCH.

In an embodiment, for example, the first time is determined to be N time units before the second time or N time units after the second time, where N is a rational number greater than 0.

In an embodiment, for example, the determining to defer the transmission of the first HARQ-ACK information bit for at least one of the one or more SPS PDSCHs based on the first time includes at least one of: determining to defer the transmission of the first HARQ-ACK information bit in the first time; determining to defer the transmission of the first HARQ-ACK information bit at a time equal to or later than the first time; or determining the first PUCCH for carrying the first HARQ-ACK information bit in the first time.

In an embodiment, for example, in case that the terminal determines to defer the transmission of the first HARQ-ACK information bit in the first time, the terminal is not expected to determine not to defer the transmission of the first HARQ-ACK information bit after the first time; and/or in case that the terminal determine not to defer the transmission of the first HARQ-ACK information bit in the first time, the terminal is not expected to determine to defer the transmission of the first HARQ-ACK information bit after the first time.

In an embodiment, for example, in case that the terminal determines to defer the transmission of the first HARQ-ACK information bit in the first time, the terminal is not expected to transmit a PUCCH or PUSCH overlapping with the first PUCCH which is indicated by first downlink control information (DCI) after the first time, where the first PUCCH carries the first HARQ-ACK information bit; and/or in case that the terminal determines to defer the transmission of the first HARQ-ACK information bit in the first time, the terminal is not expected to transmit a PUCCH with a positive scheduling request (SR) which overlaps with the first PUCCH after the first time, where a priority of the positive SR is higher than that of the first PUCCH; and/or in case that the terminal determines not to defer the transmission of the first HARQ-ACK information bit in the first time, the terminal is not expected to transmit a PUCCH or PUSCH indicated by second DCI information after the first time, so that a transmission of the first PUCCH is not cancelled by the PUCCH or PUSCH indicated by the second DCI information, where a priority of the PUCCH or PUSCH indicated by the second DCI information is higher than that of the first PUCCH.

In an embodiment, for example, in case that a SPS PDSCH of the one or more SPS PDSCHs overlaps with a PDSCH scheduled by DCI in a same serving cell in time domain, the first HARQ-ACK information bit for the SPS PDSCH is not deferred.

In an embodiment, for example, the configuration information indicates the maximum number of time units the transmission of a HARQ-ACK information bit for the SPS PDSCH of the one or more SPS PDSCHs can be deferred.

According to at least one embodiment of the disclosure, a method performed by a base station in a wireless communication system is provided. The method includes: transmitting configuration information related to HARQ-ACK deferral; and transmitting one or more SPS PDSCHs, where deferral of a first HARQ-ACK information bit for at least one of the one or more SPS PDSCHs is determined based on a first time.

In an embodiment, for example, the first time is determined based on a second time, where the second time includes at least one of:

a start position or an end position of a first PUCCH which is a PUCCH with a first HARQ-ACK information bit;

a start position of an earliest PUCCH or PUSCH among the first PUCCH and one or more PUCCHs or PUSCHs overlapping with the first PUCCH;

a start position or an end position of an uplink time unit of one or more uplink time units that include a first uplink time unit where the first PUCCH is located and/or a second uplink time unit after the first uplink time unit;

a start position or an end position of a second PUCCH, where the second PUCCH carries a third HARQ-ACK information bit that includes a second HARQ-ACK information bit from the first HARQ-ACK information bit, and/or the second PUCCH is located in the second uplink time unit;

a start position of an earliest PUCCH or PUSCH among the second PUCCH and/or one or more PUCCHs or PUSCHs overlapping with the second PUCCH;

a start position or an end position of a third PUCCH which is a PUCCH with a fourth HARQ-ACK information bit in the second uplink time unit;

a start position of an earliest PUCCH or PUSCH among the third PUCCH and/or one or more PUCCHs or PUSCHs overlapping with the third PUCCH; or a start position of an earliest PUCCH or PUSCH of a set of overlapping PUCCHs or PUSCHs, where the set of overlapping PUCCHs or PUSCHs includes at least one of the first PUCCH, the second PUCCH or the third PUCCH.

In an embodiment, for example, the first time is determined to be N time units before the second time or N time units after the second time, where N is a rational number greater than 0.

In an embodiment, the first HARQ-ACK information bit is determined to be deferred in the first time; and/or the first HARQ-ACK information bit is determined to be deferred at a time equal to or later than the first time; or the first PUCCH for carrying the first HARQ-ACK information bit is determined in the first time.

In an embodiment, for example, in case that a SPS PDSCH of the one or more SPS PDSCHs overlaps with a PDSCH scheduled by DCI in a same serving cell in time domain, the first HARQ-ACK information bit for the SPS PDSCH is not deferred.

In an embodiment, for example, the configuration information indicates the maximum number of time units the transmission of a HARQ-ACK information bit for the SPS PDSCH of the one or more SPS PDSCHs can be deferred.

According to at least one embodiment of the disclosure, a terminal in a wireless communication system is also provided. The terminal includes: a transceiver; and a controller coupled with the transceiver and configured to perform one or more of the operations in the above-mentioned methods performed by the terminal.

According to some embodiments of the disclosure, a base station in a wireless communication system is also provided. The base station includes: a transceiver; and a controller coupled with the transceiver and configured to perform one or more of the operations in the above-mentioned method performed by the base station.

According to at least one embodiment of the disclosure, a computer-readable storage medium having one or more computer programs stored thereon is also provided, where the one or more computer programs, when executed by one or more processors, can implement any of the above-described methods.

FIG. 1 illustrates an example wireless network 100 according to an embodiment of the disclosure. The embodiment of the wireless network 100 shown in FIG. 1 is for illustration only. Other embodiments of the wireless network 100 can be used without departing from the scope of the disclosure.

The wireless network 100 includes a gNodeB (gNB) 101, a gNB 102, and a gNB 103. The gNB 101 communicates with gNB 102 and gNB 103. The gNB 101 also communicates with at least one Internet Protocol (IP) network 130, such as the Internet, a private IP network, or other data networks.

Depending on a type of the network, other well-known terms such as "base station (BS)" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For example, the terms "terminal", "user equipment" and "UE" may be used in this patent document to refer to remote wireless devices that wirelessly access the gNB, no matter whether the UE is a mobile device (such as a mobile phone or a smart phone) or a fixed device (such as a desktop computer or a vending machine).

The gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a wireless fidelity (Wi-Fi) Hotspot (HS); a UE 114, which may be located in a first residence (R); a UE 115, which may be located in a second residence (R); a UE 116, which may be a mobile device (M), such as a cellular phone, a wireless laptop computer, a wireless personal digital assistant (PDA), etc. The gNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE advanced (LTE-A), WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a two dimensional (2D) antenna array as described in embodiments of the disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, the gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
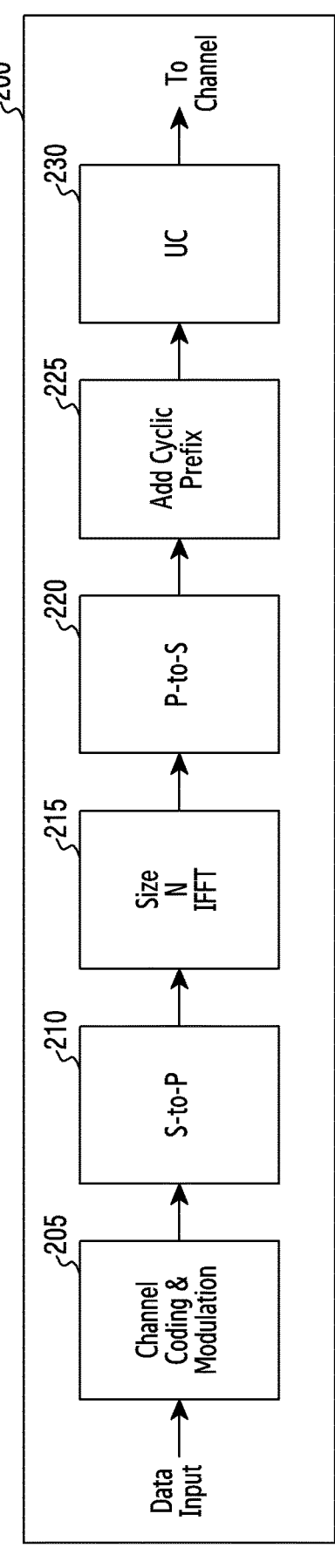
FIG. 2A illustrates example wireless transmission and reception paths according to an embodiment of the disclosure.
Figure 2B:
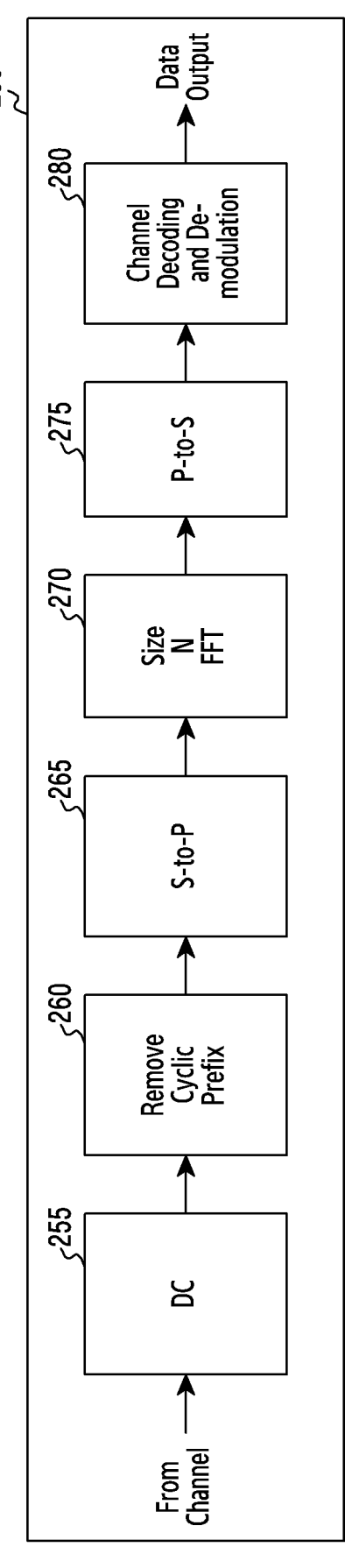
FIG. 2B illustrates example wireless transmission and reception paths according to an embodiment of the disclosure.

FIGS. 2A and 2B illustrate example wireless transmission and reception paths according to various embodiments of the disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time domain output signal. The Parallel-to-Serial block 220 converts (such as multiplexes) parallel time domain output symbols from the Size N IFFT block 215 to generate a serial time domain signal. The cyclic prefix addition block 225 inserts a cyclic prefix into the time domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time domain baseband signal. The Serial-to-Parallel block 265 converts the time domain baseband signal into a parallel time domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
FIG. 3A illustrates an example user equipment (UE) according to an embodiment of the disclosure.

FIG. 3A illustrates an example UE 116 according to an embodiment of the disclosure. The embodiment of UE 116 shown in FIG. 3A is for illustration only, and UEs 111-115 of FIG. 1 can have the same or similar configuration. However, a UE has various configurations, and FIG. 3A does not limit the scope of the disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
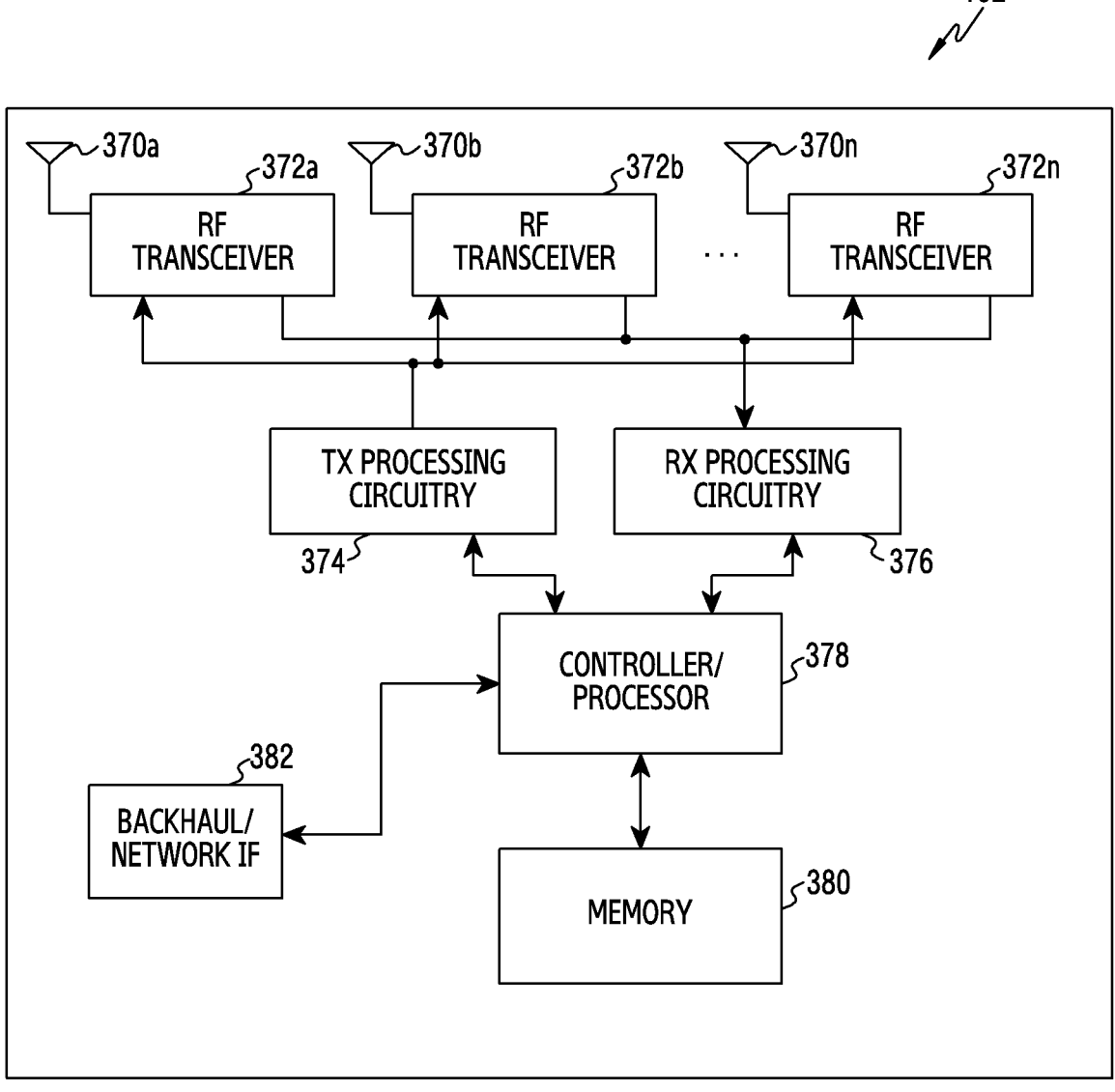
FIG. 3B illustrates an example gNodeB (gNB) according to an embodiment of the disclosure.

FIG. 3B illustrates an example gNB 102 according to an embodiment of the disclosure. The embodiment of gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that gNB 101 and gNB 103 can include the same or similar structures as gNB 102.

Referring to FIG. 3B, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3B illustrates an example of gNB 102, various changes may be made to FIG. 3B. For example, gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

Those skilled in the art will understand that, "terminal" and "terminal device" as used herein include not only devices with wireless signal receiver which have no transmitting capability, but also devices with receiving and transmitting hardware which can carry out bidirectional communication on a bidirectional communication link. Such devices may include cellular or other communication devices with single-line displays or multi-line displays or cellular or other communication devices without multi-line displays; a personal communications service (PCS), which may combine voice, data processing, fax and/or data communication capabilities; a Personal Digital Assistant (PDA), which may include a radio frequency receiver, a pager, an internet/intranet access, a web browser, a notepad, a calendar and/or a Global Positioning System (GPS) receiver; a conventional laptop and/or palmtop computer or other devices having and/or including a radio frequency receiver. "Terminal" and "terminal device" as used herein may be portable, transportable, installed in vehicles (aviation, sea transportation and/or land), or suitable and/or configured to operate locally, and/or in distributed form, operate on the earth and/or any other position in space. "Terminal" and "terminal device" as used herein may also be a communication terminal, an internet terminal, a music/video playing terminal, such as a PDA, a Mobile Internet Device (MID) and/or a mobile phone with music/video playing functions, a smart television (TV), a set-top box and other devices.

With the rapid development of information industry, especially the increasing demand from mobile Internet and internet of things (IoT), it brings unprecedented challenges to the future mobile communication technology. At present in International Telecommunication Union (ITU) report ITU-R M.[IMT.VISION], the framework and overall goals of the future 5G has been discussed, in which the demand outlook, application scenarios and important performance indicators of 5G are described in detail. With respect to new requirements in 5G, ITU report ITU-R M.[IMT.FUTURE TECHNOLOGY TRENDS] provides information related to the technology trends of 5G, aiming at solving significant problems such as significantly improved system throughput, consistent user experience, scalability to support IoT, delay, energy efficiency, cost, network flexibility, support of emerging services and flexible spectrum utilization. In 3rd Generation Partnership Project (3GPP), the first stage of 5G is already in progress. To support more flexible scheduling, the 3GPP decides to support variable Hybrid Automatic Repeat request-Acknowledgement (HARQ-ACK) feedback delay in 5G. In existing Long Term Evolution (LTE) systems, a time from reception of downlink data to uplink transmission of HARQ-ACK is fixed. For example, in Frequency Division Duplex (FDD) systems, the delay is 4 subframes. In Time Division Duplex (TDD) systems, a HARQ-ACK feedback delay is determined for a corresponding downlink subframe based on an uplink and downlink configuration. In 5G systems, whether FDD or TDD systems, for a determined downlink time unit (for example, a downlink slot or a downlink mini slot; for another example, a PDSCH time unit), the uplink time unit (for example, a PUCCH time unit) that can feedback HARQ-ACK is variable. For example, the delay of HARQ-ACK feedback can be dynamically indicated by physical layer signaling, or different HARQ-ACK delays can be determined based on factors such as different services or user capabilities.

The 3GPP has defined three directions of 5G application scenarios-enhanced mobile broadband (eMBB), massive machine-type communication (mMTC) and ultra-reliable and low-latency communication (URLLC). The eMBB scenario aims to further improve data transmission rate on the basis of the existing mobile broadband service scenario, so as to enhance user experience and pursue ultimate communication experience between people. mMTC and URLLC are, for example, the application scenarios of the Internet of Things, but their respective emphases are different: mMTC being mainly information interaction between people and things, while URLLC mainly reflecting communication requirements between things.

In communication (e.g., LTE or NR) systems, scheduling information on downlink (DL) data or uplink (UL) data may be transmitted from a base station to a terminal through DL control information (DCI). The DCI is defined in any of various formats, and it may be determined, depending on each format, whether the DCI is UL grant that is scheduling information for UL data or DL grant that is scheduling information for DL data, whether the DCI is compact DCI with control information of a small size, whether spatial multiplexing using multiple antennas is applied, and whether the DCI is for power control. For example, DCI format 1-1 that is scheduling control information for DL data may include at least one of items as shown in Table 1 below.

TABLE 1

| Item | Content |
|---|---|
| Carrier indicator (or cell indicator) | Indicating from which frequency carrier (e.g., cell) is transmitted. |
| DCI format indicator | Distinguishing whether DCI is for DL or UL. |
| Bandwidth part (BWP) indicator | Indicating from which BWP is transmitted. |
| Frequency domain resource assignment | Indicating RB of frequency domain allocated for data transmission. Represented resource is determined depend on system bandwidth and resource assignment scheme. |
| Time domain resource assignment | Indicating form which OFDM symbol of which slot data-related channel is to be transmitted. |
| VRB to PRB mapping | Indicating how to map virtual RB (VRB) index and physical RB (PRB) index. |
| Modulation and coding scheme (MCS) | Indicating modulation scheme and code rate used for data transmission, and in other words, indicating information indicating QPSK, 16QAM, 64QAM or 256QAM together with code rate value for indicating transport block size (TBS) and channel coding information. |
| Code block group (CBG) transmission information. | Indicating information about which CBG is transmitted, when CBG retransmission is configured. |
| HARQ process number (HPN) | Indicating process number of HARQ. |
| New data indicator (NDI) | Indicating HARQ initial transmission or retransmission. |
| Redundancy version (RV) | Indicating redundancy version of HARQ. |
| Transmit power control command (TPC) for physical uplink control channel (PUCCH) | Indicating transmit power control command for PUCCH that is uplink control channel. |

In Table 1, in the case of physical DL shared channel (PDSCH), time domain resource allocation may be represented by information on a slot where PDSCH is transmitted, a starting symbol location S from the slot, and a number L of symbols to which PDSCH is mapped. Here, S may be a relative position from a start of the slot, L may be the number of consecutive symbols, and S and L may be determined from a start and length indicator value (SLIV) defined as shown in Table 2.

TABLE 2

If $(L - 1) \le 7$ then
$\quad SLIV = 14 * (L - 1) + S$
Else
$\quad SLIV = 14 * (14 - L + 11) + (14 - 1 - S)$
$\quad$ where $0 < L \le 14 - S$ The base station may configure one or more search space sets for the UE according to configuration information. For example, the base station may configure a search space set 1 and a search space set 2 for the UE. The search space set 1 may be configured such that the UE monitors a DCI format A scrambled by X-RNTI in the common search space, and the search space set 2 may be configured such that the UE monitors a DCI format B scrambled by Y-RNTI in the UE-specific search space (USS).

According to the configuration information, there may be one or more search space sets in the common search space or the UE-specific search space. For example, a search space set #1 and a search space set #2 may be configured as the common search spaces, and a search space set #3 and a search space set #4 may be configured as the UE-specific search spaces.

In the common search space, the following combinations of a DCI format and an RNTI may be monitored. However, the combinations are not limited to the following examples.

DCI format 0_0/1_0 with cyclic redundancy check (CRC) scrambled by C-RNTI, CS-RNTI, SP-CSI-RNTI, RA-RNTI, TC-RNTI, P-RNTI, SI-RNTI.

DCI format 2_0 with CRC scrambled by SFI-RNTI.

DCI format 2_1 with CRC scrambled by INT-RNTI.

DCI format 2_2 with CRC scrambled by TPC-PUSCH-RNTI, TPC-PUCCH-RNTI.

DCI format 2_3 with CRC scrambled by TPC-SRS-RNTI.

DCI format 2_4 with CRC scrambled by CI-RNTI.

DCI format 2_5 with CRC scrambled by AI-RNTI.

DCI format 2_6 with CRC scrambled by PS-RNTI.

In the UE-specific search space, the following combinations of a DCI format and an RNTI may be monitored. However, the combinations are not limited to the following examples.

DCI format 0_0/1_0 with CRC scrambled by C-RNTI, CS-RNTI, TC-RNTI.

DCI format 1_0/1_1 with CRC scrambled by C-RNTI, CS-RNTI, TC-RNTI.

The specified RNTI may follow the following definitions and usages.

Cell RNTI (C-RNTI): for scheduling UE-specific PDSCH.

Temporary cell RNTI (TC-RNTI): for scheduling UE-specific PDSCH.

Configured scheduling RNTI (CS-RNTI): for scheduling quasi-statically configured UE-specific PDSCH.

Random access RNTI (RA-RNTI): for scheduling PDSCH during random access.

Paging RNTI (P-RNTI): for scheduling PDSCH where paging is transmitted.

System information RNTI (SI-RNTI): for scheduling PDSCH where system information is transmitted.

Interruption RNTI (INT-RNTI): for notifying punching of PDSCH.

Transmit power control for PUSCH RNTI (TPC-PUSCH-RNTI): for indicating power adjustment command for PUSCH.

Transmit power control for PUCCH RNTI (TPC-PUCCH-RNTI): for indicating power adjustment command for PUCCH.

Transmit power control for SRS RNTI (TPC-SRS-RNTI) (TPC-SRS-RNTI): for indicating power adjustment command for SRS.

Cancellation indicator RNTI (CI-RNTI): for indicating the cancellation of PUSCH transmission.

Availability indicator RNTI (AI-RNTI): for indicating availability of soft resources.

Power saving RNTI (PS-RNTI): for indicating power consumption reduction command in DRX inactive section.

The DCI formats specified above may follow the definitions in Table 3 below.

TABLE 3

| DCI format | Usage |
|---|---|
| 0_0 | Scheduling of PUSCH in one cell |
| 0_1 | Scheduling of PUSCH in one cell |

TABLE 3-continued

| DCI format | Usage |
|---|---|
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of PRB(s) and OFDM symbol(s) where UE may assume that no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying PRB(s) and OFDM symbol(s) where UE cancels the corresponding UL transmission from the UE |
| 2_5 | Notifying the availability of soft resources |
| 2_6 | Notifying power saving information outside DRX active time for one or more UEs. |

At present, when scheduling uplink and downlink data for multiple serving cells, the control signaling overhead is large, so an enhanced scheduling scheme is needed to reduce the control signaling overhead.

In addition, in some cases, (the transmission of) UCI (e.g., HARQ-ACK information) may be deferred. It is necessary to consider a method to provide this service efficiently.

In order to at least solve one or more of the above technical problems, embodiments of the disclosure provide a method performed by a terminal (UE), the terminal (UE), a method performed by a base station and the base station in a wireless communication system, and a non-transitory computer-readable storage medium. Hereinafter, various embodiments of the disclosure will be described in detail with reference to the accompanying drawings.

In embodiments of the disclosure, for the convenience of description, a first transceiving node and a second transceiving node are defined. For example, the first transceiving node may be a base station, and the second transceiving node may be a UE. In the following examples, the base station is taken as an example (but not limited thereto) to illustrate the first transceiving node, and the UE is taken as an example (but not limited thereto) to illustrate the second transceiving node.

Various embodiments of the disclosure are further described below with reference to the drawings.

The text and drawings are provided as examples only to help readers understand the disclosure. They are not intended and should not be interpreted as limiting the scope of the disclosure in any way. Although certain embodiments and examples have been provided, based on the content disclosed herein, it will be apparent to those skilled in the art that changes may be made to the illustrated embodiments and examples without departing from the scope of the disclosure.

Figure 4:
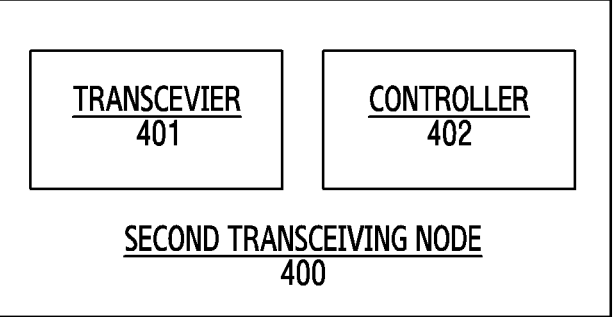
FIG. 4 illustrates a block diagram of a second transceiving node according to an embodiment of the disclosure.

FIG. 4 illustrates a block diagram of the second transceiving node according to an embodiment of the disclosure.

Referring to FIG. 4, the second transceiving node 400 may include a transceiver 401 and a controller 402.

The transceiver 401 may be configured to receive first data and/or first control signaling from the first transceiving node, and transmit second data and/or second control signaling to the first transceiving node in a determined time unit.

The controller 402 may be an application specific integrated circuit or at least one processor. The controller 402 may be configured to control the overall operation of the second transceiving node and control the second transceiving node to implement the methods proposed in the embodiments of the disclosure. For example, the controller 402 may be configured to determine the second data and/or the second control signaling and a time unit for transmitting the second data and/or the second control signaling based on the first data and/or the first control signaling, and control the transceiver 401 to transmit the second data and/or the second control signaling to the first transceiving node in the determined time unit.

In an embodiment, the controller 402 may be configured to perform one or more of operations in methods of various embodiments described below. For example, the controller 402 may be configured to perform one or more of operations in a method 500 to be described in connection with FIG. 5, a method 900 to be described in connection with FIG. 9, a method 1000 to be described in connection with FIG. 10, a method 1100 to be described in connection with FIG. 11, a method 1200 to be described in connection with FIG. 12, and a method 1300 to be described in connection with FIG. 13 later.

In an embodiment, the first data may be data transmitted by the first transceiving node to the second transceiving node. In the following examples, downlink data carried by a Physical Downlink Shared Channel (PDSCH) is taken as an example (but not limited thereto) to illustrate the first data.

In an embodiment, the second data may be data transmitted by the second transceiving node to the first transceiving node. In the following examples, uplink data carried by a Physical Uplink Shared Channel (PUSCH) is taken as an example to illustrate the second data, but not limited thereto.

In an embodiment, the first control signaling may be control signaling transmitted by the first transceiving node to the second transceiving node. In the following examples, downlink control signaling is taken as an example (but not limited thereto) to illustrate the first control signaling. The downlink control signaling may be downlink control information (DCI) carried by a Physical Downlink Control Channel (PDCCH) and/or control signaling carried by a Physical Downlink Shared Channel (PDSCH). For example, the DCI may be UE specific DCI, and the DCI may also be common DCI. The common DCI may be DCI common to a part of UEs, such as group common DCI, and the common DCI may also be DCI common to all of the UEs. The DCI may be uplink DCI (e.g., DCI for scheduling a PUSCH) and/or downlink DCI (e.g., DCI for scheduling a PDSCH).

In an embodiment, the second control signaling may be control signaling transmitted by the second transceiving node to the first transceiving node. In the following examples, uplink control signaling is taken as an example (but is not limited thereto) to illustrate the second control signaling. The uplink control signaling may be Uplink Control Information (UCI) carried by a Physical Uplink Control Channel (PUCCH) and/or control signaling carried by a Physical Uplink Shared Channel (PUSCH). A type of UCI may include one or more of: HARQ-ACK information, Scheduling Request (SR), Link Recovery Request (LRR), Chanel State Information (LRR) or Configured Grant (CG) UCI. In embodiments of the disclosure, when UCI is carried by a PUCCH, the UCI may be used interchangeably with the PUCCH.

In an embodiment, a PUCCH carrying SR may be a PUCCH carrying positive SR and/or negative SR. The SR may be the positive SR and/or the negative SR.

In an embodiment, the CSI may also be Part 1 CSI and/or Part 2 CSI.

In an embodiment, a first time unit is a time unit in which the first transceiving node transmits the first data and/or the first control signaling. In the following examples, a downlink time unit or downlink slot is taken as an example (but not limited thereto) to illustrate the first time unit.

In an embodiment, a second time unit is a time unit in which the second transceiving node transmits the second data and/or the second control signaling. In the following examples, an uplink time unit or uplink slot or PUCCH slot or Primary Cell (PCell) slot or PUCCH slot on PCell is taken as an example (but not limited thereto) to illustrate the second time unit. The "PUCCH slot" may be understood as a PUCCH transmission slot.

In an embodiment, the first time unit and the second time unit may be one or more slots, one or more subslots, one or more OFDM symbols, one or more spans, or one or more subframes.

Herein, depending on the network type, the term "base station" or "BS" can refer to any component (or a set of components) configured to provide wireless access to a network, such as a Transmission Point (TP), a Transmission and Reception Point (TRP), an evolved base station (eNodeB or eNB), a 5G base station (gNB), a macrocell, a femtocell, a Wi-Fi access point (AP), or other wirelessly enabled devices. Base stations may provide wireless access in accordance with one or more wireless communication protocols, e.g., 5G 3GPP new radio (NR) interface/access, Long Term Evolution (LTE), LTE advanced (LTE-A), High Speed Packet Access (HSPA), Wi-Fi 802.11a/b/g/n/ac, etc.

In describing a wireless communication system and in the disclosure described below, higher layer signaling or higher layer signals may be signal transferring methods for transferring information from a base station to a terminal over a downlink data channel of a physical layer or from a terminal to a base station over an uplink data channel of a physical layer, and examples of the signal transferring methods may include signal transferring methods for transferring information via Radio Resource Control (RRC) signaling, Packet Data Convergence Protocol (PDCP) signaling, or a Medium Access Control (MAC) Control Element (MAC CE).

Figure 5:
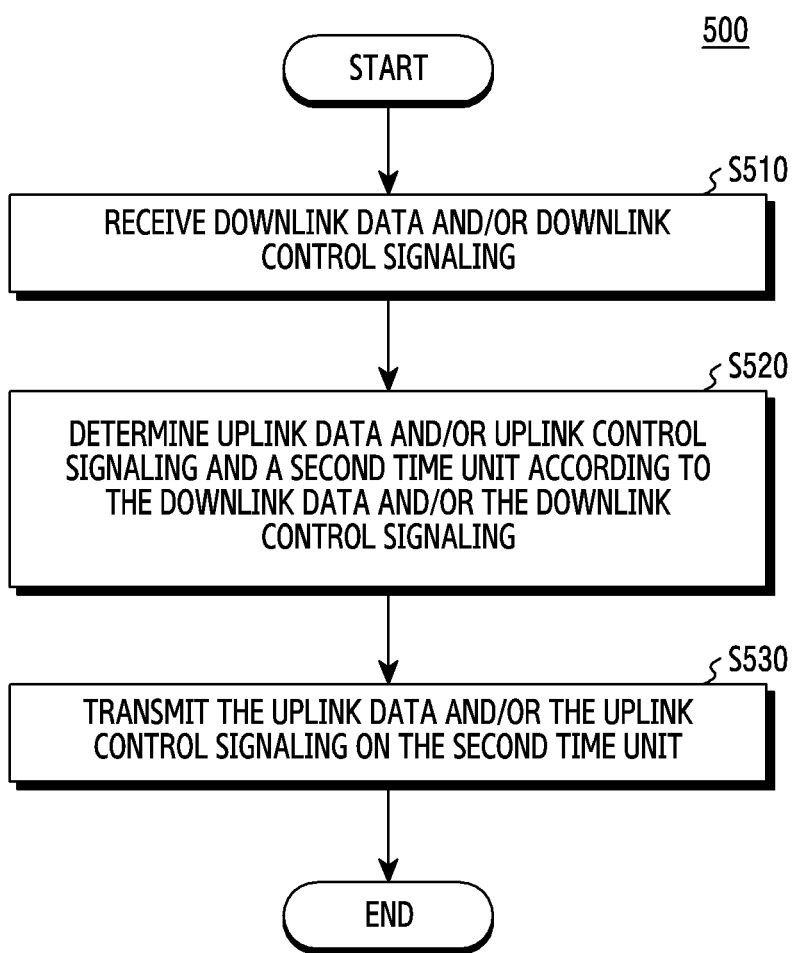
FIG. 5 illustrates a flowchart of a method performed by a UE according to an embodiment of the disclosure.

FIG. 5 illustrates a flowchart of a method performed by a UE according to an embodiment of the disclosure.

Referring to FIG. 5, in operation S510, the UE (e.g., UE 111 to 116 of FIG. 1) may receive downlink data (e.g., downlink data carried by a PDSCH) and/or downlink control signaling from a base station (e.g., BS 101, 102, 103). For example, the UE may receive the downlink data and/or the downlink control signaling from the base station based on predefined rules and/or received configuration parameters.

In operation S520, the UE may determine (or, identify) uplink data and/or uplink control signaling and a second time unit based on the downlink data and/or downlink control signaling.

In operation S530, the UE may transmit the uplink data and/or the uplink control signaling to the base station on the second time unit.

In an embodiment, acknowledgement/negative acknowledgement (ACK/NACK) for downlink transmissions may be performed through HARQ-ACK.

In an embodiment, the downlink control signaling may include DCI carried by a PDCCH and/or control signaling carried by a PDSCH. For example, the DCI may be used to schedule transmission of a PUSCH or reception of a PDSCH. Some examples of uplink transmission timing will be described below with reference to FIGS. 6A to 6C.

Figure 6A:
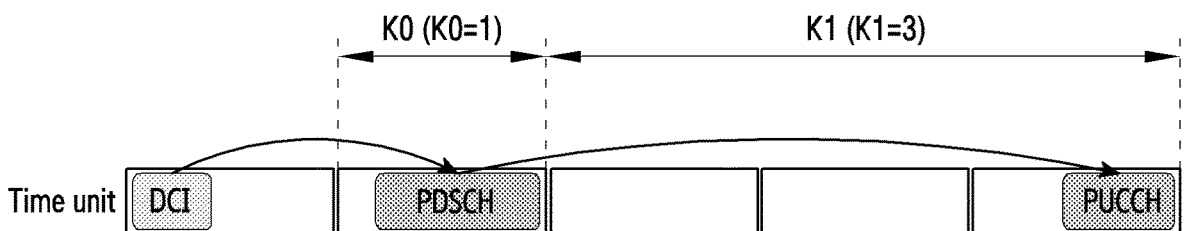
FIG. 6A illustrates some examples of uplink transmission timing according to an embodiment of the disclosure.

FIG. 6A illustrates some examples of uplink transmission timing according to an embodiment of the disclosure.

Figure 6B:
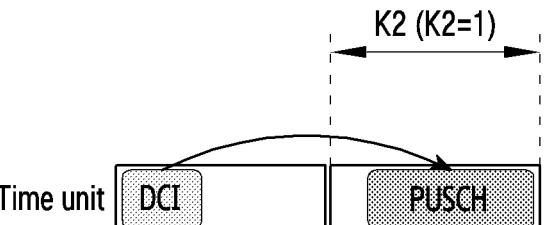
FIG. 6B illustrates some examples of uplink transmission timing according to an embodiment of the disclosure.

FIG. 6B illustrates some examples of uplink transmission timing according to an embodiment of the disclosure.

Figure 6C:
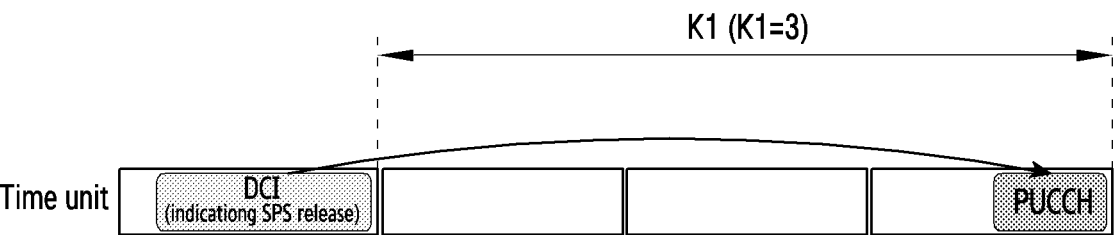
FIG. 6C illustrates some examples of uplink transmission timing according to an embodiment of the disclosure.

FIG. 6C illustrates some examples of uplink transmission timing according to an embodiment of the disclosure.

In an example, the UE receives the DCI and receives the PDSCH based on time domain resources indicated by the DCI. For example, a parameter K0 may be used to represent a time interval between the PDSCH scheduled by the DCI and the PDCCH carrying the DCI, and K0 may be in units of slots. For example, FIG. 6A gives an example in which K0=1. In the example illustrated in FIG. 6A, the time interval from the PDSCH scheduled by the DCI to the PDCCH carrying the DCI is one slot. In embodiments of the disclosure, "a UE receives DCI" may mean that "the UE detects the DCI".

In another example, the UE receives the DCI and transmits the PUSCH based on time domain resources indicated by the DCI. For example, a timing parameter K2 may be used to represent a time interval between the PUSCH scheduled by the DCI and the PDCCH carrying the DCI, and K2 may be in units of slots. For example, FIG. 6B gives an example in which K2=1. In the example illustrated in FIG. 6B, the time interval between the PUSCH scheduled by the DCI and the PDCCH carrying the DCI is one slot. K2 may also represent a time interval between a PDCCH for activating a configured grant (CG) PUSCH and the first activated CG PUSCH. In examples of the disclosure, unless otherwise specified, the PUSCH may be a dynamically scheduled PUSCH (e.g., scheduled by DCI) (e.g., may be referred to as DG (dynamic grant) PUSCH, in embodiments of the disclosure) and/or a PUSCH not scheduled by DCI (e.g., CG PUSCH).

In an example, the UE receives the PDSCH, and may transmit HARQ-ACK information for the PDSCH reception in a PUCCH in the second time unit. For example, a timing parameter (which may also be referred to as a timing value) K1 (e.g., the higher layer parameter dl-DataToUL-ACK) may be used to represent a time interval between the PUCCH for transmitting the HARQ-ACK information for the PDSCH reception and the PDSCH, and K1 may be in units of second time units, such as slots or subslots. In a case where K1 is in units of slots, the time interval is a value of a slot offset between the PUCCH for feeding back the HARQ-ACK information for the PDSCH reception and the PDSCH, and K1 may be referred to as a slot timing value. For example, FIG. 6A gives an example in which K1=3. In the example illustrated in FIG. 6A, the time interval between the PUCCH for transmitting the HARQ-ACK information for the PDSCH reception and the PDSCH is 3 slots. It should be noted that in embodiments of the disclosure, the timing parameter K1 may be used interchangeably with a timing parameter $K_1$, the timing parameter K0 may be used interchangeably with a timing parameter $K_0$, and the timing parameter K2 may be used interchangeably with a timing parameter $K_2$.

The PDSCH may be a PDSCH scheduled by the DCI and/or a SPS PDSCH. The UE will periodically receive the SPS PDSCH after the SPS PDSCH is activated by the DCI. In examples of the disclosure, the SPS PDSCH may be equivalent to a PDSCH not scheduled by the DCI/PDCCH. After the SPS PDSCH is released (deactivated), the UE will no longer receive the SPS PDSCH.

In embodiments of the disclosure, HARQ-ACK may be HARQ-ACK for a SPS PDSCH reception (e.g., HARQ-ACK not indicated by DCI) and/or HARQ-ACK indicated by a DCI format (e.g., HARQ-ACK for a PDSCH reception scheduled by a DCI format).

In an example, the UE receives the DCI (e.g., DCI indicating SPS (Semi-Persistent Scheduling) PDSCH release (deactivation)), and may transmit HARQ-ACK information for the DCI in the PUCCH in the second time unit. For example, the timing parameter K1 may be used to represent a time interval between the PUCCH for transmitting the HARQ-ACK information for the DCI and the DCI, and K1 may be in units of second time units, such as slots or subslots. For example, FIG. 6C gives an example in which K1=3. In the example of FIG. 6C, the time interval between the PUCCH for transmitting the HARQ-ACK information for the DCI and the DCI is 3 slots. For example, the timing parameter K1 may be used to represent a time interval between a PDCCH reception carrying DCI indicating SPS PDSCH release (deactivation) and the PUCCH feeding back HARQ-ACK for the PDCCH reception.

In an embodiment, in operation S520, the UE may report (or signal/transmit) a UE capability to the base station or indicate the UE capability. For example, the UE reports (or signals/transmits) the UE capability to the base station by transmitting the PUSCH. In this case, the UE capability information is included in the PUSCH transmitted by the UE.

In an embodiment, the base station may configure higher layer signaling for the UE based on a UE capability previously received from the UE (e.g., in operation S510 in the previous downlink-uplink transmission processes). For example, the base station configures the higher layer signaling for the UE by transmitting the PDSCH. In this case, the higher layer signaling configured for the UE is included in the PDSCH transmitted by the base station. It should be noted that the higher layer signaling is higher layer signaling compared with physical layer signaling, and the higher layer signaling may include RRC signaling and/or a MAC CE.

In an embodiment, downlink channels (downlink resources) may include PDCCHs and/or PDSCHs. Uplink channels (uplink resources) may include PUCCHs and/or PUSCHs.

In an embodiment, the UE may be configured with two levels of priorities for uplink transmission (for example, the UE is configured with the higher layer parameter PUCCH-ConfigurationList). For example, the UE may be configured to multiplex UCIs with different priorities by higher layer signaling (e.g., by the higher layer parameter uci-MuxWith-DiffPrio), otherwise (e.g., in case that the UE is not configured to multiplex UCIs with different priorities), the UE performs prioritization for PUCCHs and/or PUSCHs with different priorities. For example, the two levels of priorities may include a first priority and a second priority which are different from each other. In an example, the first priority may be higher than the second priority, that is, the first priority is the higher priority, and the second priority is the lower priority. In another example, the first priority may be lower than the second priority. However, embodiments of the disclosure are not limited to this, and for example, the UE may be configured with more than two levels of priorities. For the sake of convenience, in embodiments of the disclosure, description will be made considering that the first priority is higher than the second priority. It should be noted that all embodiments of the disclosure are applicable to situations where the first priority may be higher than the second priority; all embodiments of the disclosure are applicable to situations where the first priority may be lower than the second priority; and all embodiments of the disclosure are applicable to situations where the first priority may be equal to the second priority.

For example, multiplexing of multiple PUCCHs and/or PUSCHs overlapping in time domain may include multiplexing UCI information of the PUCCH in a PUCCH or PUSCH.

For example, prioritizing of two PUCCHs and/or PUSCHs overlapping in time domain by the UE may include that the UE transmits the PUCCH or the PUSCH with the higher priority and/or the UE does not transmit the PUCCH or the PUSCH with the lower priority.

In an embodiment, the UE may be configured with a subslot-based PUCCH transmission. For example, a subslot length parameter (which may also be referred to as a parameter with respect to a subslot length in embodiments of the disclosure) (e.g., the higher layer parameter subslot-LengthForPUCCH) of each PUCCH configuration parameter of the first PUCCH configuration parameter and the second PUCCH configuration parameter may be 7 OFDM symbols or 6 OFDM symbols or 2 OFDM symbols. Subslot configuration length parameters in different PUCCH configuration parameters may be configured separately. In case that no subslot length parameter is configured in a PUCCH configuration parameter, the scheduling time unit of this PUCCH configuration parameter is one slot by default. In case that a subslot length parameter is configured in the PUCCH configuration parameter, the scheduling time unit of this PUCCH configuration parameter is L (L is the configured subslot configuration length) OFDM symbols.

The mechanism of slot-based PUCCH transmissions is basically the same as that of subslot-based PUCCH transmissions. In the disclosure, a slot may be used to represent a PUCCH occasion unit; for example, in case that the UE is configured with subslots, a slot which is a PUCCH occasion unit may be replaced with a subslot. For example, it may be specified by protocols that in case that the UE is configured with the subslot length parameter (e.g., the higher layer parameter subslotLengthForPUCCH), unless otherwise indicated, a number of symbols contained in the slot of the PUCCH transmission is indicated by the subslot length parameter.

For example, in case that the UE is configured with the subslot length parameter, and subslot n is the last uplink subslot overlapping with a PDSCH reception or PDCCH reception (e.g., SPS PDSCH release, and/or indicating SCell dormancy, and/or triggering a Type-3 HARQ-ACK codebook report and without scheduling a PDSCH reception), then HARQ-ACK information for the PDSCH reception or PDCCH reception is transmitted in an uplink subslot n+k, where k is determined by the timing parameter K1 (the definition of the timing parameter K1 may refer to the previous description). For another example, if the UE is not configured with the subslot length parameter, and slot n is the last uplink slot overlapping with a downlink slot where the PDSCH reception or PDCCH reception is located, then the HARQ-ACK information for the PDSCH reception or PDCCH reception is transmitted in an uplink slot n+k, where k is determined by the timing parameter K1.

In embodiments of the disclosure, unicast may refer to a manner in which a network communicates with a UE, and multicast (or groupcast) may refer to a manner in which a network communicates with multiple UEs. For example, a unicast PDSCH may be a PDSCH received by one UE, and the scrambling of the PDSCH may be based on a Radio Network Temporary Identifier (RNTI) specific to the UE, e.g., Cell-RNTI (C-RNTI). A multicast PDSCH may be a PDSCH received by more than one UE simultaneously, and the scrambling of the multicast PDSCH may be based on a UE-group common RNTI. For example, the UE-group common RNTI for scrambling the multicast PDSCH may include an RNTI (which may be referred to as Group RNTI (G-RNTI) in embodiments of the disclosure) for scrambling of a dynamically scheduled multicast transmission (e.g., PDSCH) or an RNTI (which may be referred to as group configured scheduling RNTI (G-CS-RNTI) in embodiments of the disclosure) for scrambling of a multicast SPS transmission (e.g., SPS PDSCH). UCI(s) of the unicast PDSCH may include HARQ-ACK information, SR, or CSI of the unicast PDSCH reception. UCI(s) of the multicast PDSCH may include HARQ-ACK information for the multicast PDSCH reception. In embodiments of the disclosure, "multicast" may also be replaced by "broadcast".

In an embodiment, a HARQ-ACK codebook may include HARQ-ACK information for one or more PDSCHs and/or DCI. In case that the HARQ-ACK information for the one or more PDSCHs and/or DCI is transmitted in a same second time unit, the UE may generate the HARQ-ACK codebook based on a predefined rule. For example, in case that a PDSCH is successfully decoded, the HARQ-ACK information for this PDSCH reception is positive ACK. The positive ACK may be represented by 1 in the HARQ-ACK codebook, for example. In case that a PDSCH is not successfully decoded, the HARQ-ACK information for this PDSCH reception is Negative ACK (NACK). NACK may be represented by 0 in the HARQ-ACK codebook, for example. For example, the UE may generate the HARQ-ACK codebook based on the pseudo code specified by protocols. In an example, in case that the UE receives a DCI format that indicates SPS PDSCH release (deactivation), the UE transmits HARQ-ACK information (ACK) for the DCI format. In an example, in case that the UE receives a DCI format that indicates secondary cell dormancy, the UE transmits the HARQ-ACK information (ACK) for the DCI format. In yet another example, in case that the UE receives a DCI format that indicates to transmit HARQ-ACK information (e.g., a Type-3 HARQ-ACK codebook) of all HARQ-ACK processes of all configured serving cells, the UE transmits the HARQ-ACK information of all HARQ-ACK processes of all configured serving cells. In order to reduce a size of the Type-3 HARQ-ACK codebook, in an enhanced Type-3 HARQ-ACK codebook, the UE may transmit HARQ-ACK information of a specific HARQ-ACK process of a specific serving cell based on an indication of the DCI. In yet another example, in case that the UE receives a DCI format that schedules a PDSCH, the UE transmits HARQ-ACK information for the PDSCH reception. In yet another example, the UE receives a SPS PDSCH, and the UE transmits HARQ-ACK information for the SPS PDSCH reception. In yet another example, in case that the UE is configured by higher layer signaling to receive a SPS PDSCH, the UE transmits HARQ-ACK information for the SPS PDSCH reception. The reception of the SPS PDSCH configured by higher layer signaling may be cancelled by other signaling. In an example, in case that at least one uplink symbol (e.g., OFDM symbol) of the UE in a semi-static frame structure configured by higher layer signaling overlaps with a symbol of the SPS PDSCH reception, the UE does not receive the SPS PDSCH. In an example, in case that the UE is configured by higher layer signaling to receive a SPS PDSCH according to a predefined rule, the UE transmits HARQ-ACK information for the SPS PDSCH reception. It should be noted that, in embodiments of the disclosure, "'A' overlaps with 'B'" may mean that 'A' at least partially overlaps with 'B'. That is, "'A' overlaps with 'B'" includes a case where 'A' completely overlaps with 'B'. "'A' overlaps with 'B'" may mean that 'A' overlaps with 'B' in time domain and/or 'A' overlaps with 'B' in frequency domain.

In an embodiment, in case that HARQ-ACK information transmitted in a same second time unit does not include HARQ-ACK information for any DCI format, nor does it include HARQ-ACK information for a dynamically scheduled PDSCH (e.g., a PDSCH scheduled by a DCI format) and/or DCI, or the HARQ-ACK information transmitted in the same second time unit only includes HARQ-ACK information for one or more SPS PDSCHs receptions, the UE may generate HARQ-ACK information (e.g., HARQ-ACK information only for SPS PDSCH reception) according to a rule for generating a HARQ-ACK codebook for a SPS PDSCH. The UE may multiplex the HARQ-ACK information only for SPS PDSCH reception in a specific PUCCH resource. For example, if the UE is configured with a PUCCH list parameter for SPS (e.g., SPS-PUCCH-AN-List), the UE multiplexes the HARQ-ACK information only for SPS PDSCH reception in a PUCCH of a PUCCH list for SPS. For example, the UE determines a PUCCH resource in the PUCCH list for the SPS according to a number of bits of HARQ-ACK. If the UE is not configured with the PUCCH list parameter for SPS, the UE multiplexes the HARQ-ACK information only for SPS PDSCH reception in a PUCCH resource specific to SPS HARQ-ACK (for example, the PUCCH resource is configured by the parameter n1PUCCH-AN).

In an embodiment, in case that the HARQ-ACK information transmitted in the same second time unit includes HARQ-ACK information for a DCI format, and/or a dynamically scheduled PDSCH (e.g., a PDSCH scheduled by a DCI format), the UE may generate HARQ-ACK information according to a rule for generating a HARQ-ACK codebook for a dynamically scheduled PDSCH and/or a DCI format. For example, the UE may determine to generate a semi-static HARQ-ACK codebook (e.g., Type-1 HARQ-ACK codebook) or a dynamic HARQ-ACK codebook (e.g., Type-2 HARQ-ACK codebook in 3GPP) according to a PDSCH HARQ-ACK codebook configuration parameter (e.g., the higher layer parameter pdsch-HARQ-ACK-Codebook). The dynamic HARQ-ACK codebook may also be an enhanced dynamic HARQ-ACK codebook (e.g., Type-2 HARQ-ACK codebook based on grouping and HARQ-ACK retransmission). The UE may multiplex the HARQ-ACK information in a PUCCH resource for HARQ-ACK associated with dynamically scheduling, which may be configured in a resource set list parameter (e.g., the parameter resourceSetToAddModList). The UE determines a PUCCH resource set (e.g., the parameter PUCCH-ResourceSet) in a resource set list according to a number of bits of HARQ-ACK, and the PUCCH resource may determine a PUCCH in the PUCCH resource set according to a PRI (PUCCH Resource Indicator) field indication in the last DCI format.

In an embodiment, if the HARQ-ACK information transmitted in the same second time unit includes only HARQ-ACK information for a SPS PDSCH (e.g., a PDSCH not scheduled by a DCI format), the UE may generate the HARQ-ACK codebook according to a rule for generating a HARQ-ACK codebook for a SPS PDSCH reception (e.g., the pseudo code of a HARQ-ACK codebook for a SPS PDSCH reception).

The semi-static HARQ-ACK codebook (e.g., Type-1 HARQ-ACK codebook), may determine the size of the HARQ-ACK codebook and an order of HARQ-ACK bits according to a semi-statically configured parameter (e.g., a parameter configured by higher layer signaling). For a serving cell c, an active downlink BWP (bandwidth part) and an active uplink BWP, the UE determines a set of $M_{A,C}$ occasions for candidate PDSCH receptions for which the UE can transmit corresponding HARQ-ACK information in a PUCCH in an uplink slot $n_U$.

$M_{A,C}$ may be determined by at least one of:

a) HARQ-ACK slot timing values K1 of the active uplink BWP;

b) a downlink time domain resource allocation (TDRA) table;

c) an uplink SCS configuration and a downlink SCS configuration;

d) a semi-static uplink and downlink frame structure configuration;

e) a downlink slot offset parameter (e.g., the higher layer parameter $$N^{DL}_{slot,offset,c}$$

for the serving cell c and its corresponding slot offset SCS (e.g., the higher layer parameter $\mu_{offset,DL,c}$), and a slot offset parameter (e.g., the higher layer parameter $$N^{UL}_{slot,offset}$$

for a primary serving cell and its corresponding slot offset SCS (e.g., the higher layer parameter $\mu_{offset,UL}$).

The parameter K1 is used to determine a candidate uplink slot, and then determine candidate downlink slots according to the candidate uplink slot. The candidate downlink slots satisfy at least one of the following conditions: (i) if the time unit of the PUCCH is a subslot, the end of at least one candidate PDSCH reception in the candidate downlink slots overlaps with the candidate uplink slot in time domain; or (ii) if the time unit of the PUCCH is a slot, the end of the candidate downlink slots overlap with the candidate uplink slot in time domain. It should be noted that, in embodiments of the disclosure, a starting symbol may be used interchangeably with a start position, and an end symbol may be used interchangeably with an end position. In an embodiment, the starting symbol may be replaced by the end symbol, and/or the end symbol may be replaced by the starting symbol.

A number of PDSCHs in a candidate downlink slot for which HARQ-ACK needs to be fed back is determined by a maximum value of a number of non-overlapping valid PDSCHs in the downlink slot (e.g., the valid PDSCHs may be PDSCHs that do not overlap with semi-statically configured uplink symbols). Time domain resources occupied by the PDSCHs may be determined by (i) a time domain resource allocation table configured by higher layer signaling (in embodiments of the disclosure, it may also be referred to as a table associated with time domain resource allocation), and (ii) a certain row in the time domain resource allocation table dynamically indicated by DCI. Each row in the time domain resource allocation table may define information with respect to time domain resource allocation. For example, for the time domain resource allocation table, an indexed row defines a timing value (e.g., time unit (e.g., slot) offset (e.g., K0)) between a PDCCH and a PDSCH, and a start and length indicator (SLIV), or directly defines a starting symbol and allocation length. For example, for the first row of the time domain resource allocation table, a start OFDM symbol is 0 and an OFDM symbol length is 4; for the second row of the time domain resource allocation table, the start OFDM symbol is 4 and the OFDM symbol length is 4; and for the third row of the time domain resource allocation table, the start OFDM symbol is 7 and the OFDM symbol length is 4. The DCI for scheduling the PDSCH may indicate any row in the time domain resource allocation table. When all OFDM symbols in the downlink slot are downlink symbols, the maximum value of the number of non-overlapping valid PDSCHs in the downlink slot is 2. At this time, the Type-1 HARQ-ACK codebook may need to feed back HARQ-ACK information for two PDSCHs in the downlink slot on the serving cell.

FIGS. 7A and 7B illustrate examples of time domain resource allocation tables according to various embodiments of the disclosure. Specifically, FIG. 7A illustrates a time domain resource allocation table in which one PDSCH is scheduled in one row, and FIG. 7B illustrates a time domain resource allocation table in which multiple PDSCHs are scheduled in one row. Referring to FIG. 7A, each row corresponds to a set of {K0, mapping type, SLIV}, which includes one timing parameter K0 value, one mapping type, and one SLIV. Referring to FIG. 7B, unlike FIG. 7A, each row corresponds to multiple sets of {K0, mapping type, SLIV}.

In an embodiment, the dynamic HARQ-ACK codebook (e.g., Type-2 HARQ-ACK codebook) and/or the enhanced dynamic HARQ-ACK codebook (e.g., Type-2 HARQ-ACK based on grouping and HARQ-ACK retransmission) may determine a size and an order of the HARQ-ACK codebook according to an assignment indicator. For example, the assignment indicator may be a Downlink Assignment Indicator (DAI). In the following embodiments, the assignment indicator as the DAI is taken as an example for illustration. However, the embodiments of the disclosure are not limited thereto, and any other suitable assignment indicator may be adopted.

In an embodiment, a DAI field includes at least one of a first DAI and a second DAI.

In some examples, the first DAI may be a Counter-DAI (C-DAI). The first DAI may indicate an accumulative number of at least one of DCI scheduling PDSCH(s), DCI indicating SPS PDSCH release (deactivation), or DCI indicating secondary cell dormancy. For example, the accumulative number may be an accumulative number up to the current serving cell and/or the current time unit. For example, C-DAI may refer to: an accumulative number of {serving cell, time unit} pair(s) scheduled by PDCCH(s) up to the current time unit within a time window (which may also include a number of PDCCHs (e.g., PDCCHs indicating SPS release and/or PDCCHs indicating secondary cell dormancy)); or an accumulative number of PDCCH(s) up to the current time unit; or an accumulative number of PDSCH transmission(s) up to the current time unit; or an accumulative number of {serving cell, time unit} pair(s) in which PDSCH transmission(s) related to PDCCH(s) (e.g., scheduled by the PDCCH(s)) and/or PDCCH(s) (e.g., PDCCH indicating SPS release and/or PDCCH indicating secondary cell dormancy) is present, up to the current serving cell and/or the current time unit; or an accumulative number of PDSCH(s) with corresponding PDCCH(s) and/or PDCCHs (e.g., PDCCHs indicating SPS release and/or PDCCHs indicating secondary cell dormancy) already scheduled by a base station up to the current serving cell and/or the current time unit; or an accumulative number of PDSCHs (the PDSCHs are PDSCHs with corresponding PDCCHs) already scheduled by the base station up to the current serving cell and/or the current time unit; or an accumulative number of time units with PDSCH transmissions (the PDSCHs are PDSCHs with corresponding PDCCHs) already scheduled by the base station up to the current serving cell and/or the current time unit. The order of each bit in the HARQ-ACK codebook corresponding to at least one of PDSCH reception(s), DCI(s) indicating SPS PDSCH release (deactivation), or DCI(s) indicating secondary cell dormancy may be determined by the time when the first DAI is received and the information of the first DAI. The first DAI may be included in a downlink DCI format.

In some examples, the second DAI may be a Total-DAI (T-DAI). The second DAI may indicate a total number of at least one of all PDSCH receptions, DCI indicating SPS PDSCH release (deactivation), or DCI indicating secondary cell dormancy. For example, the total number may be a total number of all serving cells up to the current time unit. For example, T-DAI may refer to: a total number of {serving cell, time unit} pairs scheduled by PDCCH(s) up to the current time unit within a time window (which may also include a number of PDCCHs for indicating SPS release); or a total number of PDSCH transmissions up to the current time unit; or a total number of {serving cell, time unit} pairs in which PDSCH transmission(s) related to PDCCH(s) (e.g., scheduled by the PDCCH) and/or PDCCH(s) (e.g., a PDCCH indicating SPS release and/or a PDCCH indicating secondary cell dormancy) is present, up to the current serving cell and/or the current time unit; or a total number of PDSCHs with corresponding PDCCHs and/or PDCCHs (e.g., PDCCHs indicating SPS release and/or PDCCHs indicating secondary cell dormancy) already scheduled by a base station up to the current serving cell and/or the current time unit; or a total number of PDSCHs (the PDSCHs are PDSCHs with corresponding PDCCHs) already scheduled by the base station up to the current serving cell and/or the current time unit; or a total number of time units with PDSCH transmissions (e.g., the PDSCHs are PDSCHs with corresponding PDCCHs) already scheduled by the base station up to the current serving cell and/or the current time unit. The second DAI may be included in the downlink DCI format and/or an uplink DCI format. The second DAI included in the uplink DCI format is also referred to as UL DAI.

In the following examples, the first DAI as the C-DAI and the second DAI as the T-DAI are taken as an example for illustration, but the examples are not limited thereto.

Tables 4 and 5 show a correspondence between the DAI field and $V_{T\text{-}DAI,m}$ or $V_{C\text{-}DAI,c,m}$ or $$V_{T\text{-}DAI}^{UL}.$$

Numbers of bits of the C-DAI and T-DAI are limited.

For example, in case that the C-DAI or T-DAI is represented with 2 bits, the value of the C-DAI or T-DAI in the DCI may be determined by equations in Table 4. $V_{T\text{-}DAI,m}$ or $$V_{T\text{-}DAI}^{UL}$$

is the value of the T-DAI in DCI received in a PDCCH Monitoring Occasion (MO) m, and $V_{C\text{-}DAI,c,m}$ is the value of the C-DAI in DCI for a serving cell c received in the PDCCH monitoring occasion m. Both $V_{T\text{-}DAI,m}$ and $V_{C\text{-}DAI,}$

US 12,701,570 B2

31

$c,m$ are related to a number of bits of the DAI field in the DCI. MSB is the Most Significant Bit and LSB is the Least Significant Bit.

TABLE 4

| MSB, LSB of DAI Field | $V_{T-DAI,m}$ or $V_{C-DAI,c,m}$ or $V^{UL}_{T-DAI}$ | Y |
|---|---|---|
| 0, 0 | 1 | (Y − 1) mod 4 + 1 = 1 |
| 0, 1 | 2 | (Y − 1) mod 4 + 1 = 2 |
| 1, 0 | 3 | (Y − 1) mod 4 + 1 = 3 |
| 1, 1 | 4 | (Y − 1) mod 4 + 1 = 4 |

For example, when the C-DAI or T-DAI is 1, 5 or 9, as shown in Table 4, all of the DAI field are indicated with "00", and the value of $V_{C-DAI,c,m}$ or $V_{C-DAI,c,m}$ is represented as "1" by the equation in Table 4. Y may represent the value of the DAI corresponding to the number of DCIs actually transmitted by the base station (the value of the DAI before conversion by the equation in the table).

For example, in case that the C-DAI or T-DAI in the DCI is 1 bit, values greater than 2 may be represented by equations in Table 5.

TABLE 5

| DAI field | $V_{T-DAI,m}$ or $V_{C-DAI,c,m}$ | Y |
|---|---|---|
| 0 | 1 | (Y − 1) mod 2 + 1 = 1 |
| 1 | 2 | (Y − 1) mod 2 + 1 = 2 |

In an embodiment, whether to feed back HARQ-ACK information may be configured by higher layer parameters or dynamically indicated by DCI. The mode of feeding back (or reporting) the HARQ-ACK information (HARQ-ACK feedback mode or HARQ-ACK reporting mode) may also be at least one of the following modes.

HARQ-ACK feedback mode 1: transmitting ACK or NACK (ACK/NACK). For example, for a PDSCH reception, if the UE decodes a corresponding transport block (TB) correctly, the UE transmits ACK; and/or, if the UE does not decode the corresponding transport block correctly, the UE transmits NACK. For example, a HARQ-ACK information bit of the HARQ-ACK information provided according to the HARQ-ACK feedback mode 1 is an ACK value or a NACK value.

HARQ-ACK feedback mode 2: transmitting NACK only (NACK-only). For example, for a PDSCH reception, if the UE decodes the corresponding transport block correctly, the UE does not transmit the HARQ-ACK information; and/or, if the UE does not decode the corresponding transport block correctly, the UE trans-mits NACK. For example, at least one HARQ-ACK information bit of the HARQ-ACK information pro-vided according to the HARQ-ACK feedback mode 2 is a NACK value. For example, for the HARQ-ACK feedback mode 2, the UE does not transmit a PUCCH that would include only HARQ-ACK information with ACK values.

It should be noted that, unless the context clearly indicates otherwise, all or one or more of the methods, steps or operations described in embodiments of the disclosure may be specified by protocols and/or configured by higher layer signaling and/or indicated by dynamic signaling. The dynamic signaling may be PDCCH and/or DCI and/or DCI format. For example, SPS PDSCH and/or CG PUSCH may be dynamically indicated in a corresponding activated DCI/DCI format/PDCCH. All or one or more of the described methods, steps and operations may be optional. For example, in case that a certain parameter (e.g., parameter X) is configured, the UE performs a certain approach (e.g., approach A), otherwise (if the parameter, e.g., parameter X, is not configured), the UE performs another approach (e.g., approach B). Unless otherwise specified, the parameters in the embodiments of the disclosure may be higher layer parameters. For example, the higher layer parameters may be parameters configured or indicated by higher layer sig-naling (e.g., RRC signaling).

It should be noted that, a Primary Cell (PCell) or Primary Secondary Cell (PSCell) in embodiments of the disclosure may be used interchangeably with a cell having a PUCCH. A serving cell may be used interchangeably with a cell.

It should be noted that, methods for downlink in embodi-ments of the disclosure may also be applicable to uplink, and methods for uplink may also be applicable to downlink. For example, 'PDSCH' may be replaced with PUSCH', 'SPS PDSCH' may be replaced with 'CG PUSCH', and 'downlink symbol' may be replaced with 'uplink symbol', so that methods for downlink may be applicable to uplink.

It should be noted that, methods applicable to scheduling multiple PDSCH/PUSCHs in embodiments of the disclosure may also be applicable to a PDSCH/PUSCH transmission with repetitions. For example, a PDSCH/PUSCH of mul-tiple PDSCHs/PUSCHs may be replaced by a repetition of multiple repetitions of the PDSCH/PUSCH transmission.

It should be noted that in methods of the disclosure, "configured and/or indicated with a transmission with rep-etitions" may be understood that the number of the repeti-tions of the transmission is greater than 1. For example, "configured and/or indicated with a transmission with rep-etitions" may be replaced with "PUCCH repeatedly trans-mitted on more than one slot/sub-slot". "Not configured and/or indicated with a transmission with repetitions" may be understood that the number of the repetitions of the transmission equals to 1. For example, "PUCCH that is not configured and/or indicated with repetitions" may be replaced by "PUCCH transmission with the number of the repetitions of 1". For example, the UE may be configured with a parameter $$N^{repeat}_{PUCCH}$$

related to the number of repetitions of PUCCH; When the parameter $$N^{repeat}_{PUCCH}$$

is greater than 1, it may mean that the UE is configured with a PUCCH transmission with repetitions, and the UE may repeat the PUCCH repeat transmission on $$N^{repeat}_{PUCCH}$$

time units (e.g., slots); when the parameter is equal to 1, it may mean that the UE is not configured with a PUCCH transmission with repetitions. For example, the repeatedly transmitted PUCCH may include only one type of UCI. If the PUCCH is configured with repetitions, in embodiments of the disclosure, a repetition of the multiple repetitions of the PUCCH may be used as a PUCCH (or a PUCCH resource), or all of the repetitions of the PUCCH may be used as a PUCCH (or a PUCCH resource), or a specific repetition of the multiple repetitions of the PUCCH may be used as a PUCCH (or a PUCCH resource).

It should be noted that, in methods of the disclosure, a PDCCH and/or DCI and/or a DCI format schedules multiple PDSCHs/PUSCHs, which may be multiple PDSCHs/PUSCHs on a same serving cell and/or multiple PDSCHs/PUSCHs on different serving cells.

It should be noted that, the multiple manners described in the disclosure may be combined in any order. In a combination, a manner may be performed one or more times.

It should be noted that, steps of methods of the disclosure may be implemented in any order.

It should be noted that, in embodiments of the disclosure, "canceling a transmission" may mean canceling the transmission of the entire uplink channel and/or cancelling the transmission of a part of the uplink channel.

It should be noted that, in embodiments of the disclosure, "an order from small to large" (e.g., an ascending order) may be replaced by "an order from large to small" (e.g., a descending order), and/or "an order from large to small" (e.g., a descending order) may be replaced by "an order from small to large" (e.g., an ascending order).

It should be noted that, in embodiments of the disclosure, a PUCCH/PUSCH carrying A may be understood as a PUCCH/PUSCH only carrying A, and may also be understood as a PUCCH/PUSCH carrying at least A.

It should be noted that, in embodiments of the disclosure, "slot" may be replaced by "subslot" or "time unit".

It should be noted that, in embodiments of the disclosure, "performing a predefined methods (or step) if a predefined condition is satisfied" and "not performing the predefined methods (or step) if the predefined conditions is not satisfied" may be used interchangeably. "Not performing a predefined method (or step) if a predefined condition is satisfied" and "performing the predefined methods (or step) if the predefined condition is not satisfied" may be used interchangeably. In embodiments of the disclosure, the term "predefined condition" may be used interchangeably with "specified condition", "predetermined condition" or "condition".

It should be noted that, in embodiments of the disclosure, "a set of overlapping channels" may be understood as that each channel of the set of overlapping channels overlaps with at least one of channels in the set except this channel. The channel may include one or more PUCCHs and/or one or more PUSCHs. For example, "a set of overlapping channels" may include "a set of overlapping PUCCHs and/or PUSCHs". As a specific example, when a first PUCCH overlaps with at least one of a second PUCCH and a third PUCCH, the second PUCCH overlaps with at least one of the first PUCCH and the third PUCCH, and the third PUCCH overlaps with at least one of the first PUCCH and the second PUCCH, the first PUCCH, the second PUCCH and the third PUCCH constitute a set of overlapping channels (PUCCHs). For example, the first PUCCH overlaps with the second PUCCH and the third PUCCH, and the second PUCCH and the third PUCCH do not overlap.

It should be noted that, in embodiments of the disclosure, "resolving overlapping channels" may be understood as resolving the conflict of overlapping channels. For example, when a PUCCH overlaps with a PUSCH, resolving overlapping or conflict may include multiplexing UCI include in the PUCCH in the PUSCH, or may include transmitting the PUCCH or PUSCH with a higher priority. For another example, when a PUCCH overlaps with one or another PUCCH, resolving overlapping or conflict may include multiplexing UCI in a PUCCH, or may include transmitting a PUCCH with the higher priority. For another example, when two PUSCHs in the same serving cell overlap, resolving overlapping or conflict may include transmitting a PUSCH with the higher priority of the two PUSCHs.

It should be noted that in some cases, "HARQ-ACK codebook", "HARQ-ACK information" and "HARQ-ACK information bit" may be used interchangeably.

It should be noted that, in embodiments of the disclosure, the parameters, information or configurations may be pre-configured or predefined or configured by a base station. Therefore, in some cases, the parameters, information or configurations may be referred to as predefined parameters, predefined information or predefined configurations, respectively. In embodiments of the disclosure, the meaning of preconfiguring certain information or parameters in the UE may be interpreted as default information or parameters embedded in the UE when manufacturing the UE, or information or parameters pre-acquired and stored in the UE by higher layer signaling (e.g., RRC) configurations, or information or parameters acquired from the base station and stored.

According to some embodiments of the disclosure, a DCI format (for example, which may be a new DCI format or a modified existing DCI format) is provided, which can schedule PDSCH(s) (for example, but not limited to semi-persistent scheduling (SPS) PDSCH) or PUSCH(s) (for example, but not limited to CG (configured grant) PUSCH) in multiple serving cells. For example, when a DCI format can schedule PDSCH(s) (e.g., SPS PDSCH) or PUSCH(s) (e.g., CG PUSCH) in multiple serving cells, how to determine PDSCH (e.g., SPS PDSCH) reception and/or how to determine PUSCH (e.g., CG PUSCH) transmission is a problem to be solved.

For convenience of description, in some embodiments of the disclosure, a DCI format that can schedule PDSCH(s) in one or more serving cells is referred to as DCI format 1_3, and a DCI format that can schedule PUSCH(s) in one or more serving cells is referred to as DCI format 0_3. It should be noted that the naming of the DCI format is only an example, and any suitable naming can be adopted.

In some cases, the UE may be scheduled with PDSCHs in multiple serving cells by a DCI format (e.g., DCI format 1_3), and/or the UE may be scheduled PUSCHs in multiple serving cells by a DCI format (e.g., DCI format 0_3). It should be noted that DCI format 1_3 and DCI format 0_3 are only exemplary illustrations, and may also be other DCI formats. In may be configured by higher layer parameters to enable the scheduling mode (or the UE may be configured to monitor the DCI format). It may be configured by using at least one of manners MN1-MN2.

Manner MN1

According to some aspects of manner MN1, the UE may be configured with a parameter (e.g., the higher layer parameter dci-Format1-3And0-3-r18) that indicates to enable a DCI format to schedule PDSCH(s) and/or PUSCH(s) in multiple serving cells. For example, the parameter may be configured by higher layer signaling.

In an embodiment, if the UE is configured with the parameter (e.g., the higher layer parameter dci-Format1-3And0-3-r18) that indicates to enable a DCI format to schedule PDSCH(s) and/or PUSCH(s) in multiple serving cells, the UE may be configured to monitor DCI format 0_3 and/or DCI format 1_3.

In an embodiment, at least one of the following parameters (e.g., one of the following parameters) may be configured in a DCI format parameter (e.g., the higher layer parameter dci-FormatsExt-r18):

formats0-3-And-1-3, for example, used to indicate to monitor PDCCH for DCI format 0_3 and DCI format 1_3.

formats0-2-And-1-2, for example, used to indicate to monitor PDCCH for DCI format 0_2 and DCI format 1_2.

formats0-1-And-1-1And-0-3-And-1-3, for example, used to indicate to monitor PDCCH for DCI format 0_1, DCI format 1_1, DCI format 0_3, and DCI format 1_3.

formats0-2-And-1-2And-0-3-And-1-3, for example, used to indicate to monitor PDCCH for DCI format 0_2, DCI format 1_2, DCI format 0_3, and DCI format 1_3.

formats0-1-And-1-1And-0-2-And-1-2, for example, used to indicate to monitor PDCCH for DCI format 0_1, DCI format 1_1, DCI format 0_2, and DCI format 1_2.

formats0-1-And-1-1And-0-2-And-1-2And0-3-And-1-3, for example, used to indicate to monitor the PDCCH for DCI format 0_1, DCI format 1_1, DCI format 0_2, DCI format 1_2, DCI format 0_3, and DCI format 1_3.

In an embodiment, if a search space set s is a USS set, the DCI format parameter (e.g., the higher layer parameter dci-FormatsExt-r18) may indicate to monitor PDCCH carrying a DCI format, which may be at least one of:

DCI format 0_2 and DCI format 1_2

DCI format 0_3 and DCI format 1_3

DCI format 0_1, DCI format 1_1, DCI format 0_2, and DCI format 1_2.

DCI format 0_1, DCI format 1_1, DCI format 0_3, and DCI format 1_3.

DCI format 0_2, DCI format 1_2, DCI format 0_3, and DCI format 1_3.

DCI format 0_1, DCI format 1_1, DCI format 0_2, DCI format 1_2, DCI format 0_3 and DCI format 1_3.

In an embodiment, the configurations (e.g., fields) in DCI format 0_3 and/or DCI format 1_3 may include one or more of:

an NDI field, which is configured separately for each TB, that is, each TB with a corresponding NDI field.

a RV field, which is configured separately for each TB, that is, each TB with a corresponding RV field.

a serving cell indicator (or carrier indicator) field (or serving cell set indicator field) used to indicate one or more serving cells scheduled by this DCI format. In embodiments of the disclosure, the serving cell indicator field is taken as an example for illustration.

a TDRA field, in which a row in TDRA may indicate a set of {K0 or K2, PDSCH allocation or PUSCH allocation} of one or more serving cells (which may be referred to as a set of TDRA information) separately, where the PUSCH allocation or PDSCH allocation may include {mapping type, LIV}, and the PUSCH allocation or PDSCH allocation may also include at least one of mapping type, SLIV, starting symbol, length, a number of repetitions for transmission, a number of slots, extended K2. Or, a row in TDRA may indicate a set of {K0 or K2, mapping type, SLIV, a number of repetitions for transmission} of one or more serving cells, respectively. Or, a row in TDRA may indicate a set of {K0 or K2, mapping type, SLIV, a number of repetitions for transmission, a number of repetitions for transmission} of one or more serving cells, respectively. The definition of parameter K0 or K2 may refer to the description of various embodiments of the disclosure.

In an embodiment, if the number of repetitions for transmission is not configured in the TDRA configuration (e.g., TDRA table), when the UE receives a DCI format 1_3, it may be specified that the scheduled PDSCH is not transmitted with repetitions (or the number of repetitions for transmission is 1), or it may be specified that the number of repetitions for transmission of the scheduled PDSCH is determined according to the parameter pdsch-Aggregation-Factor configured in the information element (IE) PDSCH-config (for example, determined for each serving cell separately). If the number of repetitions for transmission is not configured in the TDRA configuration (e.g., TDRA table), when the UE receives a DCI format 0_3, it may be specified that the scheduled PUSCH is not transmitted with repetitions (or the number of repetitions for transmission is 1), or it may be specified that the number of repetitions for transmission of the scheduled PDSCH is determined according to the parameter pusch-AggregationFactor configured in the IE PUSCH-Config (for example, determined for each serving cell separately).

In a method according to some embodiments of the disclosure, the UE first receives a PDCCH carrying a first DCI format. For example, the first DCI format may be a DCI format (e.g., DCI format 1_3) scheduling PDSCH receptions in multiple serving cells. The UE receives the PDSCH(s) in one or more serving cells according to information indicated by the first DCI format. The reception of the PDSCH(s) may include reception of the PDSCH(s) in determined time domain resources and/or frequency domain resources.

In the method, the UE then determines a PUCCH resource according to the information indicated by the first DCI format, where the PUCCH resource carries HARQ-ACK information for the PDSCH receptions.

In the method, the UE finally transmits a PUCCH. For example, the PUCCH includes the HARQ-ACK information for the PDSCH receptions.

In a method according to some embodiments of the disclosure, the UE first receives a second DCI format. For example, the second DCI format may be a DCI format (e.g., DCI format 0_3) scheduling PUSCHs in multiple serving cells. The UE may transmit the PUSCH(s) in one or more serving cells according to the information indicated by the second DCI format.

In the method, the UE then determines time domain resources and/or frequency domain resources of the PUSCH(s) in one or more serving cells according to information indicated by the second DCI format.

In the method, the UE finally transmits the PUSCH(s) in the determined time domain resources and/or frequency domain resources.

The method according to manner MN1 can improve the scheduling flexibility. In addition, only configuring the DCI format that the UE needs to monitor can reduce the blind detection of the UE and reduce the implementation complexity of the UE.

Manner MN2

According to some aspects of manner MN2, the UE may be configured with a parameter (e.g., the higher layer parameter dci-Format1-3) that indicates to enable a DCI format to schedule PDSCHs in multiple serving cells, and/or may be configured with a parameter (e.g., the parameter dci-Format0-3) that indicates to enable a DCI format to schedule PUSCHs in multiple serving cells.

In an embodiment, if the UE is configured with the parameter (e.g., the higher layer parameter dci-Format1-3) that indicates to enable a DCI format to schedule PDSCHs in multiple serving cells, the UE may be configured to monitor DCI format 1_3. If the UE is configured with the parameter (e.g., the parameter dci-Format0-3) that indicates to enable a DCI format to schedule PUSCHs in multiple serving cells, the UE may be configured to monitor DCI format 0_3.

The method according to manner MN2 can more flexibly configure the DCI format scheduling multiple serving cells.

In some cases, if the UE receives a DCI format (e.g., DCI format 1_3 or DCI format 0_3) scheduling PDSCH(s) and/or PUSCH(s) in one or more serving cells, the UE may determine a number of serving cells and/or serving cells scheduled by the DCI format according to at least one of the following manners MN3-MN5.

Manner MN3

According to some aspects of manner MN3, serving cells indicated by a serving cell indicator field in the DCI format 1_3 or DCI format 0_3 are all scheduled serving cells, that is, a number N of the scheduled serving cells may be determined to be (for example, equal to) a number N1 of serving cells indicated by the serving cell indicator field.

In an embodiment, it may be specified by protocols that N1 sets of {SLIV, mapping type, K0 or K2} indicated in the TDRA field are valid. For example, the first N1 (or the last N1) sets of {SLIV, mapping type, K0 or K2} indicated in the TDRA field are valid. The UE does not expect that a number N2 of sets of {SLIV, mapping type, K0 or K2} indicated in the TDRA field is smaller than the number N1 of serving cells indicated by the serving cell indicator field. This can improve the flexibility of scheduling.

In an embodiment, it may be specified by protocols that the number N1 of serving cells indicated by the serving cell indicator field of the DCI format 1_3 or DCI format 0_3 is equal to the number N2 of sets of {SLIV, mapping type, K0 or K2} indicated in the TDRA field. This is simple to implement and can reduce the implementation complexity.

N1 sets of {SLIV, mapping type, K0 or K2} indicated in the TDRA field correspond to the time domain resources of PUSCHs or PDSCHs in the serving cells indicated by the serving cell indicator field, respectively. For example, the n-th set of {SLIV, mapping type, K0 or K2} indicated in the TDRA field corresponds to the time domain resources of the PUSCH or PDSCH in the n-th serving cell indicated by the serving cell indicator field, where n is equal to $1, 2, \ldots, N1$.

Manner MN4

According to some aspects of manner MN4, the number N of serving cells scheduled by the DCI format 1_3 or DCI format 0_3 may be determined to be (for example, equal to) the number N2 of sets of {SLIV, mapping type, K0 or K2} indicated in the TDRA field. The first N2 (or the last N2) serving cells indicated by the serving cell indicator field are all scheduled serving cells. The UE does not expect that the number N1 of serving cells indicated by the serving cell indicator field is smaller than the number N2 of sets of {SLIV, mapping type, K0 or K2} indicated in the TDRA field. This can improve the flexibility of scheduling.

Manner MN5

According to some aspects of manner MN5, the number N of serving cells scheduled by the DCI format 1_3 or DCI format 0_3 may be determined to be (for example, equal to) a minimum value of the number N2 of sets of {SLIV, mapping type, K0 or K2} indicated in the TDRA field and the number N1 of serving cells indicated by the serving cell indicator field. This can improve the flexibility of scheduling. N (e.g., the first N or last N) sets of {SLIV, mapping type, K0 or K2} indicated in the TDRA field correspond to the time domain resources of PDSCHs or PUSCHs on N (e.g., the first N or last N) serving cells indicated by the serving cell indicator field, respectively. This can improve the flexibility of scheduling.

In some cases, the UE may be scheduled with PDSCHs in multiple serving cells by a DCI format (e.g., DCI format 1_3), and/or the UE may be scheduled with PUSCHs in multiple serving cells by a DCI format (e.g., DCI format 0_3). The RNTI by which the DCI format 0_3 and/or DCI format 1_3 can be scrambled may be determined by at least one of manners MN6-MN7.

Manner MN6

In an embodiment, the DCI format 0_3 and/or DCI format 1_3 may be scrambled by at least one of the following RNTIs:

a C-RNTI used for dynamically scheduling of transmission.

a modulation and coding scheme (MCS)-C-RNTI used for dynamically scheduling of transmission;

a CS-RNTI used for configured scheduling of transmission (e.g., transmission of SPS PDSCH or CG PUSCH).

The method according to manner MN6 can support the DCI format 0_3 and/or DCI format 1_3 for activation, release (deactivation) or retransmission of SPS PDSCH(s) and/or CG PUSCH(s), so the flexibility of scheduling can be improved.

Manner MN7

In an embodiment, the DCI format 0_3 and/or DCI format 1_3 may be scrambled by at least one of the following RNTIs:

a C-RNTI used for dynamically scheduling of transmission;

an MCS-C-RNTI used for dynamically scheduling of transmission.

The method according to manner MN7 is simple to implement.

In an embodiment, the UE may report a UE capability to indicate at least one of:

whether to support monitoring of DCI format 0_3 and/or DCI format 1_3 (or whether to support PDSCH(s) and/or PUSCH(s) in multiple serving cells scheduled by a DCI format).

whether to support DCI format 0_3 and/or DCI format 1_3 scrambled by CS-RNTI.

For example, the base station may perform scheduling based on the UE capability reported by the UE.

In a method according to some embodiments of the disclosure, the UE first receives a PDCCH carrying a first DCI format. For example, the first DCI format may be a DCI format (e.g., DCI format 1_3) scheduling PDSCH receptions in multiple serving cells. The UE receives the PDSCHs in one or more serving cells according to information indicated by the first DCI format. The receptions of the PDSCHs may include receptions of the PDSCHs in the determined time domain resources and/or frequency domain resources.

In the method, the UE then determines a PUCCH resource according to the information indicated by the first DCI format, where the PUCCH resource carries the HARQ-ACK information for the PDSCH receptions.

In the method, the UE finally transmits a PUCCH. For example, the PUCCH includes the HARQ-ACK information for the PDSCH receptions.

In a method according to some embodiments of the disclosure, the UE first receives a second DCI format. For example, the second DCI format may be a DCI format (e.g., DCI format 0_3) scheduling PUSCHs in multiple serving cells. The UE may transmit the PUSCH(s) in one or more serving cells according to information indicated by the second DCI format.

In the method, the UE then determines time domain resources and/or frequency domain resources of the PUSCH(s) in one or more serving cells according to the information indicated by the second DCI format.

In the method, the UE finally transmits the PUSCH(s) in the determined time domain resources and/or frequency domain resources.

In some cases, if the UE receives a DCI format 1_3 scrambled by a CS-RNTI, at least one of activation, release (deactivation) or retransmission of SPS PDSCH(s) may be confirmed or determined or identified by at least one of the following manners MN8-MN11.

It should be noted that the method for determining at least one of activation, release (deactivation) or retransmission of SPS PDSCH(s) in embodiments of the disclosure is also applicable to determining at least one of activation, release (deactivation) or retransmission of CG PUSCH(s) (e.g., Type-2 CG PUSCH), for example, by replacing 'DCI format 1_3' with 'DCI format 0_3' and replacing 'SPS PDSCH' with 'CG PUSCH'.

Manner MN8

According to some aspects of manner MN8, the DCI format 1_3 can only indicate activation, release (deactivation) or retransmission of the SPS PDSCH on one serving cell. For example, it may be specified by protocols that when the DCI format 1_3 is scrambled by the CS-RNTI, the serving cell indicator field only indicates one serving cell, and/or there is only one SLIV in a row indicated by the TDRA field of the DCI format 1_3. For another example, it may be specified by protocols that when the DCI format 1_3 is scrambled by the CS-RNTI, only one serving cell is valid (or indicated) in the serving cell indicator field. For example, the valid (or indicated) serving cell is a serving cell with the smallest (or largest) index in the serving cell indicator field. Among the SLIVs indicated by the TDRA field in the DCI format 1_3, only an SLIV corresponding to the valid (or indicated) serving cell is valid.

In an embodiment, the UE receives a DCI format 1_3 scrambled by a CS-RNTI, and whether a SPS PDSCH is activated or released (deactivated) or whether the retransmission of the SPS PDSCH is scheduled may be determined by the corresponding NDI field value of the valid (or indicated) serving cell (or the NDI field values of all serving cells) in the DCI format 1_3. For example, if the corresponding NDI field value is a first predetermined value (e.g., 0), the DCI format 1_3 indicates activation or release (deactivation) of the SPS PDSCH. Otherwise, if the corresponding NDI field value is a second predetermined value (e.g., 1), the DCI format 1_3 schedules the retransmission of the SPS PDSCH.

In an embodiment, when a MAC entity has a C-RNTI, and/or a TC-RNTI (Temporary C-RNTI), and/or a CS-RNTI, the MAC entity shall for each PDCCH occasion during which it monitors PDCCH and for each serving cell:

1> if a downlink assignment for the PDCCH occasion and the serving cell has been received on the PDCCH for the MAC entity's CS-RNTI 2> if the NDI in the received HARQ information is 1

3> consider the NDI to have been toggled.

For example, if the NDI is not toggled, the corresponding transmission may be considered as retransmission. Otherwise, it may be considered that SPS PDSCH activation or release is indicated.

In an embodiment, the UE validates, for scheduling activation or scheduling release, a PDCCH (for example, a downlink SPS assignment PDCCH or a configured uplink grant Type-2 PDCCH), if at least one of the following conditions is satisfied (for example, all of the following conditions are satisfied):

the CRC of a corresponding DCI format is scrambled with a CS-RNTI. For example, the CS-RNTI is provided (or configured) by cs-RNTI.

the NDI field in the DCI format (e.g., the NDI field for the enabled TB) is set to 0.

the Downlink Feedback Information (DFI) flag field (if present) is set to 0.

the TDRA field in the DCI format indicates a row (also referred to as TDRA row in embodiments of the disclosure) with one SLIV (or with a single SLIV) (or the TDRA field in the DCI format indicates a row with only one SLIV (or with a single SLIV) for one serving cell).

if the validation is for scheduling activation and if the PDSCH-to-HARQ_feedback timing indicator field in the DCI format (which may indicate a timing relationship between PDSCH reception and HARQ feedback therefor) is present, the PDSCH-to-HARQ_feedback timing indicator field does not provide an inapplicable value from dl-DataToUL-ACK-r16.

In an embodiment, the UE validates, for scheduling activation or scheduling release, a PDCCH (for example, a downlink SPS assignment PDCCH or a configured uplink grant Type-2 PDCCH), if at least one of the following conditions is satisfied (for example, all of the following conditions are satisfied):

the CRC of a corresponding DCI format is scrambled with a CS-RNTI. For example, the CS-RNTI is provided (or configured) by cs-RNTI.

the NDI field in the DCI format (e.g., the NDI field for the enabled TB) is set to 0.

the DFI flag field (if present) is set to 0.

if the DCI format is DCI format 1_1, the TDRA in the DCI format indicates a row with one SLIV (or with a single SLIV).

if the validation is for scheduling activation and if the PDSCH-to-HARQ_feedback timing indicator field in the DCI format is present, the PDSCH-to-HARQ_feedback timing indicator field does not provide an inapplicable value from dl-DataToUL-ACK-r16.

In an embodiment, the validation for scheduling activation or scheduling release may be based on the values of one or more fields in the DCI format.

In some examples, if the UE is configured with only one SPS PDSCH or Type-2 CG PUSCH (the UE is provided with only one configuration for SPS PDSCH or for Type-2 CG PUSCH), the activation of the SPS PDSCH or Type-2 CG PUSCH may be validated according to the settings of all DCI fields in Table 6, and/or the release (deactivation) of the SPS PDSCH or Type-2 CG PUSCH may be validated according to the settings of all DCI fields in Table 7. For example, if all fields of the DCI format are set according to Table 6, the validation of the DCI format is achieved. For example, if the validation is achieved, the UE may consider the information in the DCI format as a valid activation or valid release of the downlink SPS or the configured uplink grant Type-2. Additionally or alternatively, if the validation is not achieved, the UE may discard or ignore all information in the DCI format or information related to the serving cell. In embodiments of the disclosure, unless otherwise specified, "validation of DCI format" and "validation of PDCCH" may be used interchangeably.

TABLE 6

| | DCI format 0_0/0_1/0_2/0_3 | DCI format 1_0/1_2/4_1 | DCI format 1_1/1_3/4_2 |
|---|---|---|---|
| HARQ process number (HPN) (if present) | set to all '0's | set to all '0's | set to all '0's |
| Redundancy version (if present) | set to all '0's | set to all '0's | For the enabled TB: set to all "0" |

TABLE 7

| | DCI format 0_0/0_1/0_2/0_3 | DCI format 1_0/1_1/1_2/1_3/4_1/4_2 |
|---|---|---|
| HARQ process number (if present) | set to all '0's | set to all '0's |
| Redundancy version (if present) | set to all '0's | set to all '0's |
| Modulation and coding scheme | set to all '1's | set to all '1's |
| Frequency domain resource assignment | set to all '0's for FDRA Type 2 with $\mu = 1$ set to all "1" otherwise, | set to all '0's for FDRA Type 2 or for dynamic switch set to all '0's for FDRA Type 1 |

It should be noted that, for the DCI format 1_3/0_3, the modulation and coding scheme field and/or the frequency domain resource assignment field may be defined as a modulation and coding mode field and/or a frequency domain resource assignment field corresponding to a serving cell (e.g., the serving cell where SPS PDSCH or CG PUSCH is located).

In an embodiment, if the UE is configured with more than one SPS PDSCH or Type-2 CG PUSCH (the UE is provided with more than one configuration for SPS PDSCH or for Type-2 CG PUSCH), the value of the HARQ process number field in a DCI format indicates an activation for a corresponding UL grant Type-2 PUSCH (Type-2 CG PUSCH) or for a SPS PDSCH configuration with the same value as provided by a CG configuration index parameter (e.g., the higher layer parameter ConfiguredGrantConfigIndex) or by a SPS configuration index (e.g., the higher layer parameter SPS-ConfigIndex). The activation of the SPS PDSCH or Type-2 CG PUSCH may be validated according to the settings of all DCI fields in Table 8. For example, if all fields of the DCI format are set according to Table 8, the validation of the DCI format is achieved. If the validation is achieved, the UE may consider the information in the DCI format as a valid activation or valid release of the downlink SPS or the configured uplink grant Type-2. Additionally or alternatively, if the validation is not achieved, the UE may discard or ignore all information in the DCI format or information related to the serving cell.

TABLE 8

| | DCI format 0_0/0_1/0_2/0_3 | DCI format 1_0/1_2/4_1 | DCI format 1_1/1_3/4_2 |
|---|---|---|---|
| Redundancy version (if present) | set to all '0's | set to all '0's | for the enabled TB: set to all '0's |

In an embodiment, if the UE is configured with more than one SPS PDSCH or Type-2 CG PUSCH (the UE is provided with more than one configuration for SPS PDSCH or for Type-2 CG PUSCH), if the UE is provided with a Type-2 CG configuration deactivation state list parameter (e.g., the higher layer parameter ConfiguredGrantConfigType2DeactivationStateList) or a SPS configuration deactivation state list parameter (e.g., the higher layer parameter spsConfigDeactivationStateList), the value of the HARQ process number field in a DCI format indicates a corresponding entry for scheduling release of one or more UL grant Type-2 PUSCH or SPS PDSCH configurations.

if the UE is not provided with the Type-2 CG configuration deactivation state list parameter (e.g., ConfiguredGrantConfigType2DeactivationStateList) or the SPS configuration deactivation state list parameter (e.g., the higher layer parameter spsConfigDeactivationStateList), the value of the HARQ process number field in the DCI format indicates a release for a corresponding UL grant Type-2 PUSCH or for a SPS PDSCH configuration with the same value as provided by the CG configuration index parameter (e.g., the higher layer parameter ConfiguredGrantConfigIndex) or the SPS configuration index (e.g., the higher layer parameter SPS-ConfigIndex), respectively.

TABLE 9

| | DCI format 0_0/0_1/0_2/0_3 | DCI format 1_0/1_1/1_2/1_3/4_1/4_2 |
|---|---|---|
| Redundancy version (if present) | set to all '0's | set to all '0's |
| Modulation and coding scheme | set to all '1's | set to all '1's |
| Frequency domain resource allocation | for FDRA Type 2 and $\mu = 1$, set to all '0's otherwise, set to all '1's | for FDRA Type 2 or dynamic switch, set to all '0's for FDRA Type 1, set to all '0's |

The method according to manner MN8 can improve the flexibility of scheduling.

Manner MN9

According to some aspects of manner MN9, the DCI format 1_3 may indicate activation, release (deactivation) or retransmission of the SPS PDSCH(s) on one or more serving cells. For example, it may be specified by protocols that when the DCI format 1_3 is scrambled by the CS-RNTI, the serving cell indicator field may indicate one or more serving cells. When the DCI format 1_3 is scrambled by the CS-RNTI, the DCI format 1_3 may indicate one of:

activation of SPS PDSCH configuration(s) on one or more serving cells;

release (deactivation) of SPS PDSCH configuration(s) on one or more serving cells; or retransmission of the SPS PDSCH(s) on one or more serving cells.

In an embodiment, when the UE receives a DCI format 1_3 scrambled by a CS-RNTI, whether the DCI format indicates activation or release (deactivation) of SPS PDSCH (s) or schedules a retransmission of the SPS PDSCH(s) may be determined by the corresponding NDI fields in the DCI format 1_3, of all serving cells scheduled by the DCI format (or the NDI fields of all configured serving cells). For example, if the corresponding NDI fields of the serving cells scheduled by the DCI format (or NDI fields of all configured serving cells) are a first predetermined value (e.g., 0), the DCI format 1_3 indicates activation or release (deactivation) of the SPS PDSCH(s). The UE may validate the downlink SPS assignment for scheduling activation or scheduling release separately for each of the serving cells indicated by the serving cell indicator field, for example, according to the method of other embodiments of the disclosure, such as the method described in manner MN8. Otherwise, if the corresponding NDI fields of the serving cells scheduled by this DCI format (or the NDI fields of all configured serving cells) are a second predetermined value (e.g., 1), the DCI format 1_3 schedules the retransmission of the SPS PDSCH(s). For example, the DCI format 1_3 schedules the retransmission of the SPS PDSCH(s) on the serving cell(s) indicated by the serving cell indicator field.

The method can support the activation, release (deactivation) or retransmission of multiple SPS PDSCHs with one DCI format, which can save the signaling overhead of PDCCH and improve the spectrum efficiency of the system.

Manner MN10

According to some aspects of manner MN10, the DCI format 1_3 may indicate activation, release (deactivation) or retransmission of SPS PDSCH(s) on one or more serving cells. For example, it may be specified by protocols that when the DCI format 1_3 is scrambled by the CS-RNTI, the serving cell indicator field may indicate one or more serving cells. When the DCI format 1_3 is scrambled by CS-RNTI, the DCI format 1_3 may indicate activation and/or release (deactivation) of the SPS PDSCH configuration(s) on one or more serving cells or the DCI format 1_3 may indicate retransmission of the SPS PDSCH(s) on one or more serving cells. Or, the DCI format 1_3 may indicate activation of the SPS PDSCH configuration(s) on one or more serving cells, or the DCI format 1_3 may indicate activation or deactivation of the SPS PDSCH configuration(s) or schedule retransmission of the SPS PDSCH(s) on one or more serving cells.

In an embodiment, when the UE receives a DCI format 1_3 scrambled by a CS-RNTI, it may be determined that the DCI format 1_3 indicates activation or release (deactivation) of SPS PDSCH(s) on one or more serving cells or that the DCI format 1_3 indicates retransmission of the SPS PDSCH(s) on one or more serving cells by the corresponding NDI fields in DCI format 1_3, of all serving cells scheduled by the DCI format (or NDI fields of all configured serving cells). For example, if the corresponding NDI fields of all serving cells scheduled by the DCI format (or the NDI fields of all configured serving cells) are a first predetermined value (e.g., 0), the DCI format 1_3 indicates activation or release (deactivation) of the SPS PDSCH(s) on one or more serving cells. The UE validates the downlink SPS assignment for scheduling activation or scheduling release separately for each of the serving cells indicated by the serving cell indicator field, for example, according to the method of other embodiments of the disclosure, such as the method described in manner MN8. Otherwise, if the corresponding NDI fields of all serving cells scheduled by this DCI format (or NDI fields of all configured serving cells) are a second predetermined value (e.g., 1), the DCI format 1_3 schedules the retransmission of the SPS PDSCH(s) on one or more serving cells. For example, the DCI format 1_3 schedules the retransmission of the SPS PDSCH(s) on the serving cell(s) indicated by the serving cell indicator field.

The method according to manner MN10 can support the activation, release (deactivation) or retransmission of multiple SPS PDSCHs with one DCI format, which can save the signaling overhead of PDCCH and improve the spectrum efficiency of the system.

Manner MN11

According to some aspects of manner MN11, the DCI format 1_3 may indicate activation, release(deactivation) or retransmission of SPS PDSCH(s) on one or more serving cells. For example, it may be specified by protocols that when the DCI format 1_3 is scrambled by the CS-RNTI, the serving cell indicator field may indicate one or more serving cells. When the DCI format 1_3 is scrambled by the CS-RNTI, the DCI format 1_3 may indicate at least one of activation, release (deactivation) and retransmission of the SPS PDSCH configuration(s) on one or more serving cells. For example, activation, release (deactivation) or retransmission of the SPS PDSCH configuration on a serving cell indicated by the serving cell indicator field may be determined according to at least one of the NDI field, RV field, HPN field, MCS field and FDRA field corresponding to the serving cell, respectively. For example, the downlink SPS assignment may be validated for scheduling activation or scheduling release, for example, according to the method of other embodiments of the disclosure, such as the method described in manner MN8.

The method according to manner MN11 can support the activation, release (deactivation) or retransmission of multiple SPS PDSCHs with one DCI format, and thus the signaling overhead of PDCCH can be saved and the spectrum efficiency of the system can be improved.

The method of determining at least one of activation, release (deactivation) or retransmission of SPS PDSCH(s) according to some embodiments of the disclosure is described above. The method is also applicable to determining at least one of activation, release (deactivation) or retransmission of CG PUSCH(s) (e.g., Type-2 CG PUSCH), for example, by replacing 'DCI format 1_3' with 'DCI format 0_3' and replacing 'SPS PDSCH' with 'CG PUSCH'. A method of determining at least one of activation, release (deactivation) or retransmission of CG PUSCH(s) according to some embodiments of the disclosure will be described below. For the sake of brevity, the description of repeated contents will be omitted. At least one of activation, release (deactivation) or retransmission of CG PUSCH(s) is confirmed or determined or identified by at least one of the following manners MN12-MN15.

Manner MN12

According to some aspects of manner MN12, the DCI format 0_3 can only indicate activation, release (deactivation) or retransmission of the CG PUSCH on one serving cell. For example, it may be specified by protocols that when the DCI format 0_3 is scrambled by the CS-RNTI, the serving cell indicator field only indicates one serving cell, and/or there is only one SLIV in a row indicated by the TDRA field of the DCI format 0_3. For another example, it may be specified by protocols that when the DCI format 0_3 is scrambled by the CS-RNTI, only one serving cell is valid (or indicated) in the serving cell indicator field. For example, the valid (or indicated) serving cell is a cell with the smallest (or largest) index in the serving cell indicator field. Among the SLIVs indicated by the TDRA field of the DCI format 0_3, only an SLIV corresponding to the valid (or indicated) serving cell is valid.

In an embodiment, the UE receives a DCI format 0_3 scrambled by a CS-RNTI, and whether a CG PUSCH is activated or released (deactivated) or the retransmission of the CG PUSCH is scheduled may be determined by the corresponding NDI field value of the valid (or indicated) serving cell (or the NDI field values of all serving cells) in the DCI format 0_3. For example, if the corresponding NDI field value is a first predetermined value (e.g., 0), the DCI format 0_3 indicates activation or release (deactivation) of the CG PUSCH. Otherwise, if the corresponding NDI field value is a second predetermined value (e.g., 1), the DCI format 0_3 schedules the retransmission of the CG PUSCH.

In an embodiment, when a MAC entity has a C-RNTI, and/or a TC-RNTI (Temporary C-RNTI), and/or a CS-RNTI, the MAC entity shall for each PDCCH occasion during which it monitors PDCCH and for each serving cell:

>  1> if a downlink assignment for the PDCCH occasion and the serving cell has been received on the PDCCH for the MAC entity's CS-RNTI.
>>  2> if the NDI in the received HARQ information is 1.
>>>  3> consider the NDI to have been toggled.

For example, if the NDI is not toggled, the corresponding transmission may be considered as retransmission. Otherwise, it may be considered that CG PUSCH activation or release is indicated.

In an embodiment, the UE validates, for scheduling activation or scheduling release, a PDCCH (for example, a downlink SPS assignment PDCCH or a configured uplink grant Type-2 PDCCH), if at least one of the following conditions is satisfied (for example, all of the following conditions are satisfied):

>  the CRC of a corresponding DCI format is scrambled with a CS-RNTI. For example, the CS-RNTI is provided (or configured) by cs-RNTI.
>  the NDI field in the DCI format (e.g., the NDI field for the enabled TB) is set to 0.
>  the Downlink Feedback Information (DFI) flag field (if present) is set to 0.
>  the TDRA field in the DCI format indicates a row (also referred to as TDRA row in embodiments of the disclosure) with one SLIV (or with a single SLIV) (or the TDRA field in the DCI format indicates a row with only one SLIV (or with a single SLIV) for one serving cell).
>  if the validation is for scheduling activation and if the PDSCH-to-HARQ_feedback timing indicator field in the DCI format (which may indicate a timing relationship between PDSCH reception and HARQ feedback therefor) is present, the PDSCH-to-HARQ_feedback timing indicator field does not provide an inapplicable value from dl-DataToUL-ACK-r16.

In an embodiment, the UE validates, for scheduling activation or scheduling release, a PDCCH (for example, a downlink SPS assignment PDCCH or a configured uplink grant Type-2 PDCCH), if at least one of the following conditions is satisfied (for example, all of the following conditions are satisfied):

>  the CRC of a corresponding DCI format is scrambled with a CS-RNTI. For example, the CS-RNTI is provided (or configured) by cs-RNTI.
>  the NDI field in the DCI format (e.g., the NDI field for the enabled TB) is set to 0.
>  the DFI flag field (if present) is set to 0.
>  if the DCI format is DCI format 1_1, the TDRA in the DCI format indicates a row with one SLIV (or with a single SLIV).
>  if the validation is for scheduling activation and if the PDSCH-to-HARQ_feedback timing indicator field in > the DCI format is present, the PDSCH-to-HARQ_feedback timing indicator field does not provide an inapplicable value from dl-DataToUL-ACK-r16.

In an embodiment, the validation for scheduling activation or scheduling release may be based on the values of one or more fields in the DCI format. For an example of validation for scheduling activation or scheduling release, reference may be made to the example described above in manner MN8. Repeated descriptions are omitted here.

The method according to manner MN12 can improve the flexibility of scheduling.

Manner MN13

According to some aspects of manner MN13, the DCI format 0_3 may indicate activation, release (deactivation) or retransmission of the CG PUSCH(s) on one or more serving cells. For example, it may be specified by protocols that when the DCI format 0_3 is scrambled by the CS-RNTI, the serving cell indicator field may indicate one or more serving cells. When DCI format 0_3 is scrambled by the CS-RNTI, the DCI format 0_3 may indicate one of:

>  activation of CG PUSCH configuration(s) on one or more serving cells.
>  release (deactivation) of CG PUSCH configuration(s) on one or more serving cells.
>  retransmission of the CG PUSCH(s) on one or more serving cells.

In an embodiment, when the UE receives a DCI format 0_3 scrambled by a CS-RNTI, whether the DCI format indicates activation or release (deactivation) of CG PUSCH(s) or schedules a retransmission of the CG PUSCH(s) may be determined by the corresponding NDI fields in the DCI format 0_3, of all serving cells scheduled by the DCI format (or the NDI fields of all configured serving cells). For example, if the corresponding NDI fields of the serving cells scheduled by this DCI format (or the NDI fields of all configured serving cells) are a first predetermined value (e.g., 0), the DCI format 0_3 indicates activation or release (deactivation) of the CG PUSCH(s). The UE may validate the uplink CG grant for scheduling activation or scheduling release separately for each of the serving cells indicated by the serving cell indicator field, for example, according to the methods of other embodiments of the disclosure, such as methods described in manners MN8 and/or MN12. Otherwise, if the corresponding NDI fields of the serving cell scheduled by the DCI format (or NDI fields of all configured serving cells) are a second predetermined value (e.g., 1), the DCI format 0_3 schedules the retransmission of the CG PUSCH(s). For example, the DCI format 0_3 schedules the retransmission of the CG PUSCH(s) on the serving cell(s) indicated by the serving cell indicator field.

The method can support the activation, release (deactivation) or retransmission of multiple CG PUSCHs with one DCI format, which can save the signaling overhead of PDCCH and improve the spectrum efficiency of the system.

Manner MN14

According to some aspects of manner MN14, the DCI format 0_3 may indicate activation, release(deactivation) or retransmission of CG PUSCH(s) on one or more serving cells. For example, it may be specified by protocols that when the DCI format 0_3 is scrambled by the CS-RNTI, the serving cell indicator field may indicate one or more serving cells. When the DCI format 0_3 is scrambled by the CS-RNTI, the DCI format 0_3 may indicate activation and/or release (deactivation) of the CG PUSCH configuration(s) on one or more serving cells or the DCI format 0_3 may indicate the retransmission of the CG PUSCH(s) on one or more serving cells. Or, the DCI format 0_3 may indicate activation of the CG PUSCH configuration(s) on one or more serving cells, or the DCI format 1_3 may indicate activation or deactivation of the CG PUSCH configuration(s) on one or more serving cells or schedule retransmission of the CG PUSCH(s).

In an embodiment, when the UE receives a DCI format 0_3 scrambled by a CS-RNTI, it may be determined that the DCI format 0_3 indicates activation or release (deactivation) of CG PUSCH(s) on one or more serving cells or that the DCI format 0_3 indicates retransmission of the CG PUSCH(s) on one or more serving cells by the corresponding NDI fields in the DCI format 0_3, of all serving cells scheduled by the DCI format (or the NDI fields of all configured serving cells). For example, if the corresponding NDI fields of all serving cells scheduled by the DCI format (or the NDI fields of all configured serving cells) are a first predetermined value (e.g., 0), the DCI format 0_3 indicates activation or release (deactivation) of the CG PUSCH(s) on one or more serving cells. The UE validates the uplink CG grant for scheduling activation or scheduling release separately for each of the serving cells indicated by the serving cell indicator field, for example, according to the methods of other embodiments of the disclosure, such as methods described in manners MN8 and/or MN12. Otherwise, if the corresponding NDI fields of all serving cells scheduled by this DCI format (or the NDI fields of all configured serving cells) are a second predetermined value (e.g., 1), the DCI format 0_3 schedules the retransmission of the CG PUSCH(s) on one or more serving cells. For example, the DCI format 0_3 schedules the retransmission of the CG PUSCH(s) on the serving cell(s) indicated by the serving cell indicator field.

The method according to manner MN14 can support the activation, release (deactivation) or retransmission of multiple CG PUSCHs with one DCI format, which can save the signaling overhead of PDCCH and improve the spectrum efficiency of the system.

Manner MN15

According to some aspects of manner MN15, the DCI format 0_3 may indicate activation, release(deactivation) or retransmission of CG PUSCH(s) on one or more serving cells. For example, it may be specified by protocols that when DCI format 0_3 is scrambled by the CS-RNTI, the serving cell indicator field may indicate one or more serving cells. When the DCI format 0_3 is scrambled by the CS-RNTI, the DCI format 0_3 may indicate at least one of activation, release (deactivation) and retransmission of the CG PUSCH(s) configuration on one or more serving cells. For example, activation, release (deactivation) or retransmission of the CG PUSCH configuration of a serving cell indicated by the serving cell indicator field may be determined according to at least one of NDI field, RV field, HPN field, MCS field and FDRA field corresponding to a serving cell indicated by the serving cell indicator field, respectively. For example, the uplink CG grant may be validated for the scheduling activation or the scheduling release, for example, according to the methods of other embodiments of the disclosure, such as the methods described in manners MN8 and/or MN12.

The method according to manner MN15 can support the activation, release (deactivation) or retransmission of multiple CG PUSCHs with one DCI format, therefore, the signaling overhead of PDCCH can be saved and the spectrum efficiency of the system can be improved.

In some cases, the UE may be configured with a parameter related to HARQ-ACK deferral (e.g., SPS HARQ-ACK deferral parameter, such as the higher layer parameter sps- HARQ-Deferral). The parameter related to HARQ-ACK deferral (e.g., SPS HARQ-ACK deferral parameter) may be used to indicate the maximum number of time units (e.g., slots or subslots) the transmission of HARQ-ACK information for PDSCH reception(s) (e.g., SPS PDSCH reception (s)) can be deferred. If the UE is configured with the SPS HARQ-ACK deferral parameter (e.g., the parameter sps-HARQ-Deferral), after resolving overlapping among PUCCH(s) and/or PUSCH(s) (if the PUCCH(s) and/or PUSCH(s) overlap in a first slot (for example, a PUCCH slot; for another example, a PCell slot)), and the UE determines a PUCCH resource for a PUCCH transmission with first HARQ-ACK information for SPS PDSCH reception(s), and the PUCCH resource satisfies a second predefined condition, then the UE determines an earliest second slot (for example, PUCCH slot; for another example, PCell slot). The first slot may be a time unit in which the UE would report the first HARQ-ACK information for a first time; for example, for various reasons, the first HARQ-ACK information has not actually been reported in the first slot. The second slot may be used for transmission of the deferred first HARQ-ACK information. For example, the UE may defer (in embodiments of the disclosure, "defer" may be used interchangeably with "defer the transmission of") the first HARQ-ACK information to the second slot. For example, the second slot may be after the first slot. The time difference between the SPS PDSCH reception and the second slot satisfies the requirements indicated by the parameter related to HARQ-ACK deferral (e.g., SPS HARQ-ACK deferral parameter). It should be noted that the determining of the earliest second slot by the UE may be understood as determining to defer the transmission of the first HARQ-ACK information by the UE. In embodiments of the disclosure, "determining to defer (the transmission of) the first HARQ-ACK information" and "UE determining the earliest second slot" may be used interchangeably.

For example, for the PUCCH resource, the second predefined condition may be the following conditions:

the PUCCH resource is provided by the HARQ-ACK list parameter for PUCCH for SPS (e.g., parameter SPS-PUCCH-AN-List), or by a HARQ-ACK parameter for PUCCH for SPS (e.g., parameter n1PUCCH-AN) if the HARQ-ACK list parameter for PUCCH for SPS (e.g., parameter SPS-PUCCH-AN-List) is not configured.

the PUCCH resource is not cancelled by an overlapping PUCCH or PUSCH transmission with a higher priority.

the PUCCH resource overlaps with a (or at least one) first predefined time unit (for example, the time unit may include a slot, a subslot, a symbol, or a subframe). For the convenience of description, a first predefined symbol is taken as an example for illustration. The first predefined symbol may include a downlink symbol (semi-statically) configured by higher layer signaling (e.g., parameter tdd-UL-DL-ConfigurationCommon or tdd-UL-DL-ConfigDedicated) and/or indicated for a SSB (Synchronization Signal Block), and/or belonging to CORESET0 (for example, CORESET associated with a Type0-PDCCH Common Search Space (CSS) set).

The HARQ-ACK information in the second slot may include second HARQ-ACK information, which may be or from the deferred HARQ-ACK information for the SPS PDSCH reception(s). For example, the deferred HARQ-ACK information for the SPS PDSCH reception(s) may be the HARQ-ACK information for the SPS PDSCH reception that satisfies a first predefined condition. The first predefined condition may be that the SPS PDSCH configuration corresponding to the SPS PDSCH reception(s) is configured with the SPS HARQ-ACK deferral parameter and the parameter (for example, the maximum number of slots the transmission of the HARQ-ACK information for the SPS PDSCH reception(s) can be deferred indicated by the parameter) is greater than or equal to a slot interval (e.g., in number of slots) (e.g., slots for PUCCH transmission on a primary serving cell) between the SPS PDSCH reception(s) and the second slot.

It should be noted that, in embodiments of the disclosure, "HARQ-ACK information" may be replaced by "HARQ-ACK information bit".

It should be noted that the second predefined condition may also be at least one of the above described conditions.

Figure 8:
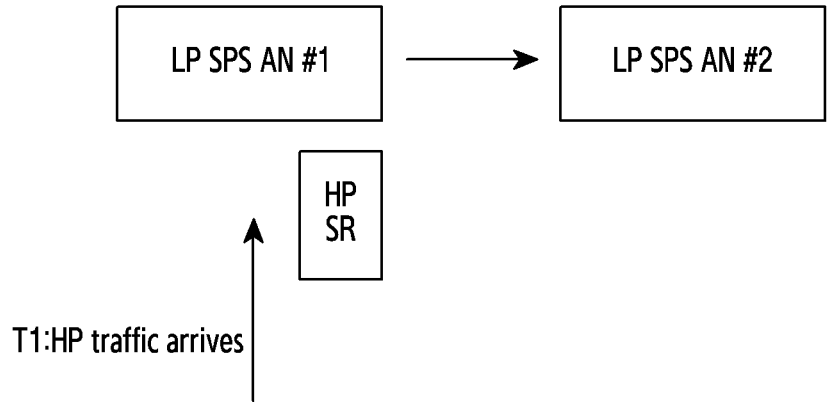
FIG. 8 illustrates a schematic diagram of an example scenario of Hybrid Automatic Repeat Request-Acknowledgement (HARQ-ACK) information deferral according to an embodiment of the disclosure.

In some cases, the results of UE determining whether to defer the first HARQ-ACK information at different times may be different. FIG. 8 gives an example of such situation.

FIG. 8 illustrates a schematic diagram of an example scenario of HARQ-ACK information deferral according to an embodiment of the disclosure.

Referring to FIG. 8, when uplink data with a higher priority (HP) arrives in time T1, the UE may transmit a SR with the higher priority (HP SR). Before time T1, according to a second predefined condition (e.g., the second predefined condition described above), the UE may determine that the first HARQ-ACK information with a lower priority (LP) (LP SPS AN #1) is deferred. After time T1, according to the second predefined condition (e.g., the second predefined condition described above), the UE may determine that the first HARQ-ACK information with the lower priority (LP SPS AN #1) is not deferred, for example, because the first HARQ-ACK information with the lower priority (LP SPS AN #1) is cancelled by the SR with the higher priority (HP SR). Because the base station does not know the time when the UE determines whether to defer the first HARQ-ACK information, it may lead to different understandings between the UE and the base station on whether the first HARQ-ACK information is deferred. For example, when the UE determines that the first HARQ-ACK information is not deferred, the UE does not transmit the first HARQ-ACK information. However, the base station may consider that the UE determines that the first HARQ-ACK information is deferred, so the base station will detect the deferred first HARQ-ACK information, which will cause the base station to consume power, and the base station will not reallocate the uplink resources of the deferred first HARQ-ACK information, thus causing reduction of the uplink spectrum efficiency. For another example, when the UE determines that the first HARQ-ACK information is deferred, the UE will defer the first HARQ-ACK information. However, the base station may consider that the UE determines that the first HARQ-ACK information is not deferred, so the base station will not detect the deferred first HARQ-ACK information, which will reduce the reliability of the transmission of the first HARQ-ACK information. In order to at least solve the problem, at least one of manners MN16-MN20 may be adopted. It should be noted that, what is shown in and described in connection with FIG. 8 is only an example, and the embodiments of the disclosure may be applicable to other similar scenarios. For example, although FIG. 8 illustrates that the second slot immediately follows the first slot, the embodiments of the disclosure are not limited thereto, and there may be one or more slots between the second slot and the first slot.

Manner MN16

In an embodiment, the UE may determine whether to defer the first HARQ-ACK (for example, to the next slot (e.g., PUCCH slot) based on a first predefined time (for example, in the first predefined time; for another example, in the first predefined time at the earliest; for another example, not earlier than the first predefined time). For example, the UE may determine to defer the first HARQ-ACK information (for example, to the next slot (e.g., PUCCH slot)) based on the first predefined time. As an example, the UE may determine to defer the first HARQ-ACK information (for example, to the next slot (e.g., PUCCH slot)) in the first predefined time. As another example, the UE may determine to defer the first HARQ-ACK information (for example, to the next slot (e.g., PUCCH slot)) in the first predefined time at the earliest. As still another example, the UE may determine to defer the first HARQ-ACK information (for example, to the next slot (e.g., PUCCH slot)) in a time not earlier than the first predefined time. The first HARQ-ACK information may be the HARQ-ACK information for the SPS PDSCH reception(s) (for example, the HARQ-ACK information for the SPS PDSCH reception(s) in the first slot).

In an example, if the UE is configured with the SPS HARQ-ACK deferral parameter (e.g., parameter sps-HARQ-Deferral), after resolving overlapping among PUCCH(s) and/or PUSCH(s) (if the PUCCH(s) and/or PUSCH(s) overlaps in a first slot (for example, PUCCH slot; for another example, PCell slot)), and the UE determines, in the first predefined time (or in the first predefined time at the earliest), a PUCCH resource for a PUCCH transmission with the first HARQ-ACK information for the SPS PDSCH reception(s), and the PUCCH resource satisfies the second predefined condition, then the UE determines an earliest second slot (for example, PUCCH slot; for another example, PCell slot).

The method can ensure that the UE and the base station have the same understanding on whether to the first HARQ-ACK information is deferred, and thus unnecessary detection of the base station can be avoided, thereby reducing the power consumption of the base station, improving the uplink spectrum efficiency and improving the reliability of the transmission of the first HARQ-ACK information.

Manner MN17

In an embodiment, it may be specified by protocols that the UE does not expect to determine to defer the first HARQ-ACK information in the first predefined time and to determine not to defer the first HARQ-ACK information after the first predefined time, and/or the UE does not expect to determine not to defer the first HARQ-ACK information in the first predefined time and to determine to defer the first HARQ-ACK information after the first predefined time.

In an example, the UE does not expect to determine, in the first predefined time, to defer the first HARQ-ACK information and receive, after the first predefined time, a DCI format indicating that a PUCCH or PUSCH overlaps with the PUCCH with the first HARQ-ACK information.

In an example, the UE does not expect to determine to defer, in the first predefined time, the first HARQ-ACK information with a lower priority, and transmits, after the first predefined time, a PUCCH that carries a positive SR with a higher priority and overlaps with the PUCCH with the first HARQ-ACK information. For example, the UE defers the positive SR to the next PUCCH resource.

In an example, the UE does not expect to determine, in the first predefined time, not to defer the first HARQ-ACK information and receive, after the first predefined time, a DCI format indicating a PUCCH or PUSCH with a higher priority, so that the transmission of the PUCCH with the first HARQ-ACK information is not cancelled by the PUCCH or PUSCH with the higher priority.

The method can reduce the implementation complexity of the UE.

Manner MN18

In an embodiment, a first predefined time (e.g., the first predefined time described above) may be N time units (e.g., symbols) before (or after) a first reference, where N may be a rational number (or integer) greater than 0. N may be N1+N2, where N1 may be predefined, preconfigured or prespecified by protocols, and N2 may be reported based on UE capabilities or a default value (e.g., 0). For example, the UE may report or indicate one of one or more candidate values of N2 (for example, the one or more candidate values may be predefined, preconfigured or prespecified by protocols).

In an example (for example, the UE is not configured with processingType2Enabled set to enable), for μ equal to 0, 1, 2, 3, 5, 6, N1 (or N) may be 8, 10, 17, 20, 80, 160, respectively. In another example (for example, the UE is configured with processingType2Enabled indicating enable), for μ equal to 0, 1, 2, N1 (or N) may be 3, 4.5, 9, separately. μ is an SCS parameter.

In an embodiment, the first reference may be determined based on or as at least one of:

a second reference. The second reference may be a start (or end) position (or symbol) of a PUCCH time unit. For example, the second reference may be an end position (or symbol) of the first slot. For another example, the second reference may be a start position (or symbol) of the second slot. Referring to FIG. 8, the second reference may be an end position (or symbol) of slot 0 or a start position (or symbol) of slot 1. In this way, whether HARQ-ACK information in the second slot includes the first HARQ-ACK information may be determined in the first predefined time.

a third reference. The third reference may be a start (or end) position (or symbol) of the PUCCH with the first HARQ-ACK information.

a fourth reference. The fourth reference may be a start (or end) position (or symbol) of a PUCCH with HARQ-ACK information in the second slot.

a fifth reference. The fifth reference may be a start (or end) position (or symbol) of a PUCCH with HARQ-ACK information for SPS PDSCH reception(s) in the second slot. The HARQ-ACK information for the SPS PDSCH reception(s) in the second slot may include the second HARQ-ACK information.

a sixth reference. The sixth reference may be a start position (or symbol) of a PUCCH or PUSCH with an earliest start position (or symbol) among a PUCCH with the HARQ-ACK information in the second slot and/or PUCCH(s) or PUSCH(s) overlapping with the PUCCH with the HARQ-ACK information in the second slot.

a seventh reference. The seventh reference may be a start position (or symbol) of a PUCCH or PUSCH with an earliest start position (or symbol) among the PUCCH with the HARQ-ACK information for the SPS PDSCH reception(s) in the second slot and/or PUCCHs or PUSCHs overlapping with the PUCCH with the HARQ-ACK information for the SPS PDSCH reception(s) in the second slot.

an eighth reference. The eighth reference may be a start position (or symbol) of a PUCCH or PUSCH with an earliest start position (or symbol) among the PUCCH with the first HARQ-ACK information and PUCCHs or PUSCHs overlapping with the PUCCH.

a ninth reference. The ninth reference may be a start position of an earliest PUCCH or PUSCH of a set of overlapping PUCCHs or PUSCHs. For example, the set of overlapping PUCCHs or PUSCHs may include one or more of the PUCCH with the first HARQ-ACK information, the PUCCH with the HARQ-ACK information in the second slot, or the PUCCH with the HARQ-ACK information for the SPS PDSCH reception(s) in the second slot as described above.

In some examples, the first reference may be determined as an earlier one of one or more of the first to ninth references described above.

As an example, the first reference may be determined as an earlier one of the second reference and the seventh reference.

As another example, the first reference may be determined as an earlier one of the second reference and the sixth reference.

The method can ensure that the UE and the base station have the same understanding on whether to defer the first HARQ-ACK information, and thus unnecessary detection of the base station can be avoided, thereby reducing the power consumption of the base station, improving the uplink spectrum efficiency and improving the reliability of the transmission of the first HARQ-ACK information.

It should be noted that, the method of determining the deferral of the first HARQ-ACK information in the first slot in the embodiments of the disclosure is also applicable to determining the deferral of the second HARQ-ACK information in the second slot.

Manner MN19

In an embodiment, "the PUCCH resource is not cancelled by an overlapping PUCCH or PUSCH transmission with a higher priority" in the second predefined condition may be included in at least one of the following scenarios:

a scenario where the transmission of the PUCCH resource can be cancelled by an overlapping PUCCH with a negative SR, of a higher priority;

a scenario where the transmission of the PUCCH resource can be cancelled by an overlapping CG PUSCH with a higher priority (e.g., a CG PUSCH without MAC PDU).

In this way, it can be ensured that the results of determining whether the HARQ-ACK information for SPS PDSCH is deferred at different times are the same. The method is simple to implement and can improve the reliability of uplink transmission.

Manner MN20

In an embodiment, if a SPS PDSCH overlaps with a PDSCH scheduled by DCI in a same serving cell in time domain, the UE does not defer the HARQ-ACK information for the SPS PDSCH reception. For example, the second HARQ-ACK information does not include the HARQ-ACK information for the SPS PDSCH reception.

The method can reduce the number of HARQ-ACK information bits, improve the reliability of uplink transmission, improve the spectrum efficiency and reduce the transmission power of the UE.

Figure 9:
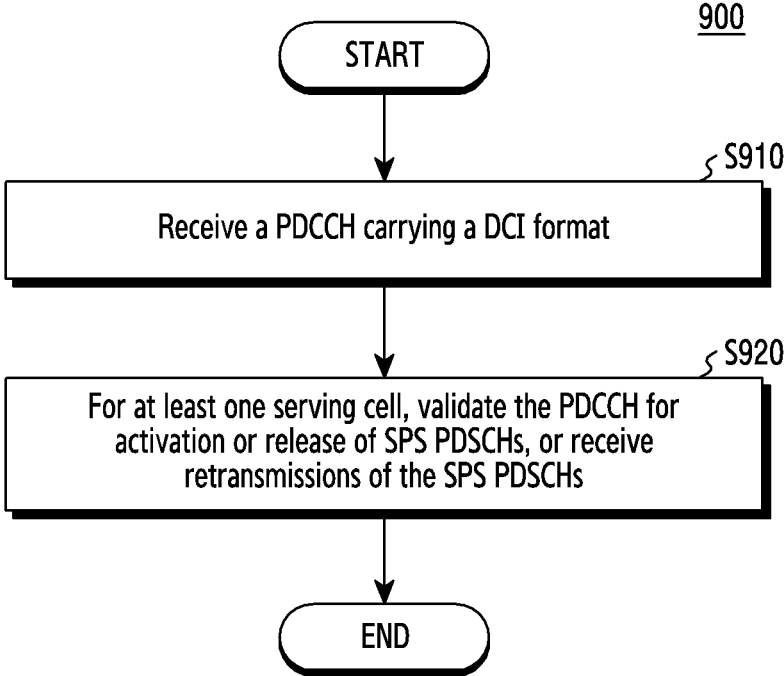
FIG. 9 a flowchart of a method performed by a terminal according to an embodiment of the disclosure.

FIG. 9 illustrates a flowchart of a method 900 performed by a terminal according to an embodiment of the disclosure.

Referring to FIG. 9, in operation S910, the terminal may receive a PDCCH carrying a first DCI format. For example, the first DCI format may be a DCI format 1_3 described in some embodiments of the disclosure. For example, the terminal may receive a PDCCH carrying a second DCI format from the base station.

Continuing to refer to FIG. 9, in operation S920, for at least one serving cell, the terminal validates the PDCCH for activation or release of SPS PDSCHs, or receives retransmissions of the SPS PDSCHs.

In an embodiment, for example, the first DCI format (or, first DCI) may be scrambled by a first RNTI which is used for configured scheduling of transmission. For example, the first RNTI may be at least one of a CS-RNTI, C-RNTI or MCS-C-RNTI.

In an embodiment, for example, the at least one serving cell may be determined based on at least one of a first field (e.g., a serving cell indicator field) or a second field (e.g., a TDRA field) included in the first DCI format (or, first DCI), where the first field is used to indicate one or more scheduled cells, and the second field includes one or more start and length indicator value (SLIV) entries.

In an embodiment, for example, the at least one serving cell may be determined based on one of the one or more scheduled cells indicated by the first field.

In an embodiment, for example, the at least one serving cell may be determined based on a cell with a smallest cell index or a largest cell index of the one or more scheduled cells indicated by the first field.

In an embodiment, for example, the second field may indicate a TDRA row, where the TDRA row includes an SLIV entry on each of the at least one serving cell; and/or a bit value corresponding to the at least one serving cell in a third field (e.g., an NDI field) included in the first DCI format may be set to a predetermined value (e.g., 0), where the third field is used to indicate new transmission in the one or more scheduled cells.

In an embodiment, for example, for each of the at least one serving cell, the terminal may separately validate the PDCCH, or receive the retransmissions of the SPS PDSCHs.

In an embodiment, for example, the first DCI format may indicate activation or release of the SPS PDSCHs on all of the at least one serving cell, or retransmissions of the SPS PDSCHs on all serving cells of the at least one cell.

In an embodiment, for example, the first DCI format may indicate activation of the SPS PDSCHs on all of the at least one serving cell, or the first DCI format may indicate release of the SPS PDSCHs on all of the at least one serving cell, or retransmission of the SPS PDSCHs on all serving cells of the at least one cell.

In an embodiment, operations S910 and/or S920 may be performed based on the methods described according to various embodiments (e.g., various manners described above, such as manners MN1-MN20) of the disclosure.

In an embodiment, the method 900 may omit one or more of operation S910 or operation S920, or may include additional operations, for example, the operations performed by the terminal (e.g., UE) that are described according to various embodiments (e.g., various manners described above, such as manners MN1-MN20) of the disclosure.

FIG. 10 illustrates a flowchart of a method 1000 performed by a terminal according to an embodiment of the disclosure.

Referring to FIG. 10, in operation S1010, the terminal may receive a PDCCH carrying a first DCI format. For example, the first DCI format may be a DCI format 1_3 described in some embodiments of the disclosure. For example, the terminal may receive the PDCCH carrying the first DCI format from the base station.

Continuing to refer to FIG. 10, in operation S1020, the terminal may receive PDSCHs in one or more serving cells based on the first DCI format, the one or more serving cells being determined based on at least one of a first field (e.g., a serving cell indicator field) or a second field (e.g., a TDRA field) included in the first DCI format, where the first field is used to indicate one or more scheduled cells, and the second field is used to indicate TDRA for the PDSCH. For example, the first DCI format may be a DCI format 1_3 described in some embodiments of the disclosure.

In an embodiment, for example, the one or more serving cells may be determined as the one or more scheduled cells indicated by the first field.

In an embodiment, for example, a number of the one or more scheduled cells indicated by the first field may be equal to a number of SLIV entries indicated by the second field, where the second field indicates a TDRA row that includes an SLIV entry on each of at least one serving cell.

In an embodiment, for example, a number of SLIV entries corresponding to the TDRA row indicated by the second field may be not less than N1, where N1 is the number of the one or more scheduled cells indicated by the first field, where the PDSCHs are received based on N1 SLIV entries of the SLIV entries corresponding to the TDRA row indicated by the second field.

In an embodiment, for example, a number of the one or more serving cells may be the number of the SLIV entries corresponding to the TDRA row indicated by the second field.

In an embodiment, for example, the number of the one or more serving cells may be a minimum value of (i) the number of the one or more scheduled cells indicated by the first field, and (ii) the number of the SLIV entries corresponding to the TDRA row indicated by the second field.

In an embodiment, operations S1010 and/or S1020 may be performed based on the methods described according to various embodiments (e.g., various manners described above, such as manners MN1-MN20) of the disclosure.

In an embodiment, the method 1000 may omit one or more of operation S1010 or operation S1020, or may include additional operations, for example, the operations performed by the terminal (e.g., UE) that are described according to various embodiments (e.g., various manners described above, such as manners MN1-MN20) of the disclosure.

Figure 11:
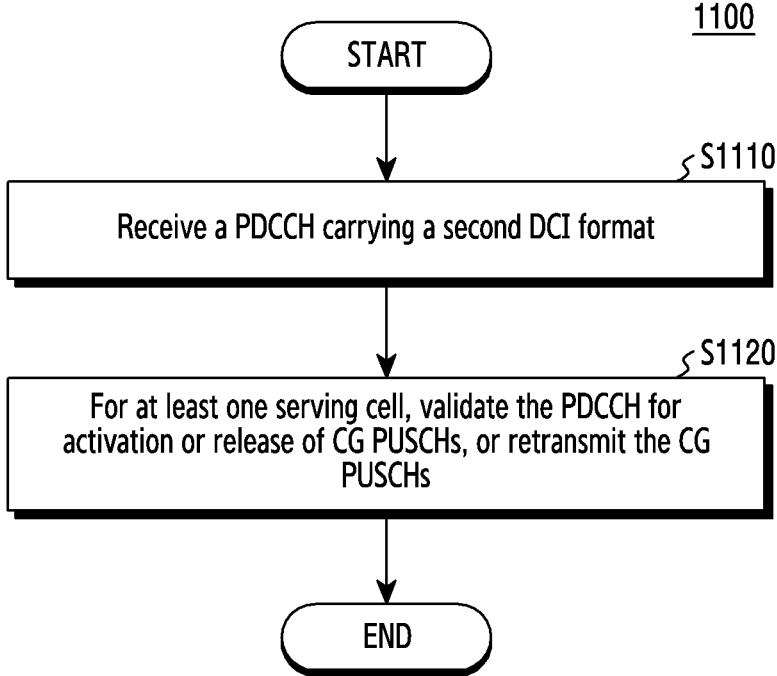
FIG. 11 a flowchart of a method performed by a terminal according to an embodiment of the disclosure.

FIG. 11 illustrates a flowchart of a method 1100 performed by a terminal according to an embodiment of the disclosure.

Referring to FIG. 11, in operation S1110, the terminal (or user equipment) may receive a PDCCH carrying a second DCI format. For example, the second DCI format may be the DCI format 0_3 described in some embodiments of the disclosure. For example, the terminal may receive the PDCCH carrying the second DCI format from the base station.

Continuing to refer to FIG. 11, in operation S1120, for at least one serving cell, the terminal may validate the PDCCH for activation or release of CG PUSCHs, or retransmits the CG PUSCHs.

In an embodiment, for example, the second DCI format may be scrambled by a first RNTI which is used for configured scheduling of transmission. For example, the first RNTI may be at least one of a CS-RNTI, C-RNTI or MCS-C-RNTI.

In an embodiment, for example, the at least one serving cell may be determined based on at least one of a first field (e.g., a serving cell indicator field) or a second field (e.g., a TDRA field) included in the second DCI format, where the first field is used to indicate one or more scheduled cells, and the second field includes one or more start and length indicator value (SLIV) entries.

In an embodiment, for example, the at least one serving cell may be determined based on one of the one or more scheduled cells indicated by the first field.

In an embodiment, for example, the at least one serving cell may be determined based on a cell with a smallest cell index or a largest cell index of the one or more scheduled cells indicated by the first field.

In an embodiment, for example, the second field may indicate a TDRA row, where the TDRA row includes an SLIV entry on each of the at least one serving cell; and/or a bit value corresponding to the at least one serving cell in a third field (e.g., a new data indicator (NDI) field) included in the second DCI format may be set to a predetermined value (e.g., 0), where the third field is used to indicate new transmission in the one or more scheduled cells.

In an embodiment, for example, for each of the at least one serving cell, the terminal separately validates the PDCCH, or re-transmits the CG PUSCH.

In an embodiment, for example, the first DCI format may indicate activation or release of the CG PUSCHs on all of the at least one serving cell, or retransmission of the CG PUSCHs on all serving cells of the at least one cell.

In an embodiment, for example, the first DCI format may indicate activation of the CG PUSCHs on all of the at least one serving cell, or release of the CG PUSCHs on all of the at least one serving cell, or retransmission of the CG PUSCHs on all serving cells of the at least one cell.

In an embodiment, operations S1110 and/or S1120 may be performed based on the methods described according to various embodiments (e.g., various manners described above, such as manners MN1-MN20) of the disclosure.

In an embodiment, the method 1100 may omit one or more of operation S1110 or operation S1120, or may include additional operations, for example, the operations performed by the terminal (e.g., UE) that are described according to various embodiments (e.g., various manners described above, such as manners MN1-MN20) of the disclosure.

FIG. 12 illustrates a flowchart of a method 1200 performed by a terminal according to an embodiment of the disclosure.

Referring to FIG. 12, in operation S1210, the terminal may receive a PDCCH carrying a second DCI format. For example, the second DCI format may be the DCI format 0_3 described in some embodiments of the disclosure. For example, the terminal may receive the PDCCH carrying the second DCI format from the base station.

Continuing to refer to FIG. 12, in operation S1220, the terminal may transmit PUSCHs in one or more serving cells is based on the second DCI format, the one or more serving cells being determined based on at least one of a first field (e.g., a serving cell indicator field) or a second field (e.g., a TDRA field) included in the second DCI format, where the first field is used to indicate one or more scheduled cells, and the second field is used to indicate TDRA for the PUSCHs. For example, the second DCI format may be the DCI format 0_3 described in some embodiments of the disclosure. In operation S1220, the terminal may transmit the PUSCHs in the one or more serving cells to the base station based on the second DCI format.

In an embodiment, for example, the one or more serving cells may be determined to be the one or more scheduled cells indicated by the first field.

In an embodiment, for example, a number of the one or more scheduled cells indicated by the first field may be equal to a number of SLIV entries indicated by the second field, where the second field indicates a TDRA row that includes an SLIV entry on each of at least one serving cell.

In an embodiment, for example, a number of SLIV entries corresponding to the TDRA row indicated by the second field may be not less than N1, where N1 is the number of the one or more scheduled cells indicated by the first field, where the PUSCHs are transmitted based on N1 SLIV entries of the SLIV entries corresponding to the TDRA row indicated by the second field.

In an embodiment, for example, a number of the one or more serving cells may be the number of the SLIV entries corresponding to the TDRA row indicated by the second field.

In an embodiment, for example, the number of the one or more serving cells may be a minimum value of (i) the number of the one or more scheduled cells indicated by the first field, and (ii) the number of the SLIV entries corresponding to the TDRA row indicated by the second field.

In an embodiment, operations S1210 and/or S1220 may be performed based on the methods described according to various embodiments (e.g., various manners described above, such as manners MN1-MN20) of the disclosure.

In an embodiment, the method 1200 may omit one or more of operation S1210 or operation S1220, or may include additional operations, for example, the operations performed by the terminal (e.g., UE) that are described according to various embodiments (e.g., various manners described above, such as manners MN1-MN20) of the disclosure.

Figure 13:
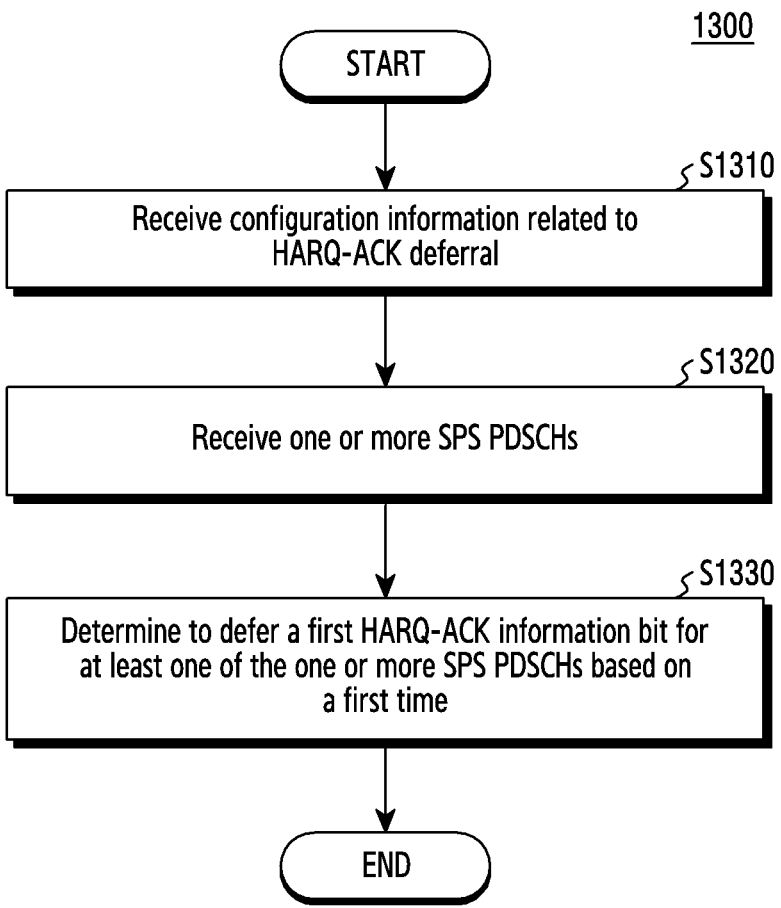
FIG. 13 a flowchart of a method performed by a terminal according to an embodiment of the disclosure.

FIG. 13 illustrates a flowchart of a method 1300 performed by a terminal according to an embodiment of the disclosure.

Referring to FIG. 13, in operation S1310, the terminal may receive configuration information related to a HARQ-ACK deferral (e.g., the SPS HARQ-ACK deferral parameter described above, such as the higher layer parameter sps-HARQ-Deferral, which may be included in a SPS configuration). For example, the terminal may receive the configuration information related to the HARQ-ACK deferral from a base station through a higher layer (e.g., RRC) message.

According to an embodiment, in operation S1320, the terminal may receive one or more SPS PDSCHs. The terminal may receive the one or more SPS PDSCHs from the base station. The one or more SPS PDSCHs may correspond to one or more SPS configurations.

According to embodiment, in operation S1330, the terminal may determine to defer a transmission of a first HARQ-ACK information bit for at least one of the one or more SPS PDSCHs based on a first time.

In an embodiment, for example, the first time is determined based on a second time.

According to an embodiment, the second time includes at least one of: a start position or an end position of a first PUCCH which is a PUCCH with the first HARQ-ACK information bit; a start position of an earliest PUCCH or PUSCH among the first PUCCH and one or more PUCCHs or PUSCHs overlapping with the first PUCCH; a start position or an end position of an uplink time unit of one or more uplink time units (e.g., slots) that include a first uplink time unit where the first PUCCH is located and/or a second uplink time unit after the first uplink time unit; a start position or an end position of a second PUCCH, where the second PUCCH carries a third HARQ-ACK information bit that includes a second HARQ-ACK information bit from the first HARQ-ACK information bit, and/or the second PUCCH is located in the second uplink time unit; a start position of an earliest PUCCH or PUSCH among the second PUCCH and/or one or more PUCCHs or PUSCHs overlapping with the second PUCCH; a start position or an end position of a third PUCCH which is a PUCCH with a fourth HARQ-ACK information bit in the second uplink time unit; a start position of an earliest PUCCH or PUSCH among the third PUCCH and/or one or more PUCCHs or PUSCHs overlapping with the third PUCCH; or a start position of an earliest PUCCH or PUSCH of a set of overlapping PUCCHs or PUSCHs, where the set of overlapping PUCCHs or PUSCHs includes at least one of the first PUCCH, the second PUCCH or the third PUCCH.

In some examples, the first time is determined to be N time units (e.g., symbols) before the second time or N time units (e.g., symbols) after the second time, where N is a rational number greater than 0.

In an embodiment, for example, the determining to defer the transmission of the first HARQ-ACK information bit for at least one of the one or more SPS PDSCHs based on the first time includes at least one of: determining to defer the transmission of the first HARQ-ACK information bit in the first time; determining to defer the transmission of the first HARQ-ACK information bit at a time equal to or later than the first time; or determining the first PUCCH for carrying the first HARQ-ACK information bit in the first time.

In an embodiment, for example, a resource of the first PUCCH satisfies a predefined condition.

In an embodiment, for example, for the resource of the first PUCCH, the predefined condition includes at least one of: a condition that the resource is provided by a first parameter indicating a list of PUCCH resources for SPS HARQ-ACK, or by a second parameter indicating HARQ resources for PUCCH for SPS; a condition that the resource is not cancelled by an overlapping PUCCH or PUSCH transmission with a higher priority than the resource; or a condition that the resource overlaps with at least one first predefined symbol.

In an embodiment, for example, the first predefined symbol includes at least one of: a symbol configured as downlink by higher layer signaling; a symbol indicated for a synchronization signal block (SSB); or a symbol belonging to a CORESET associated with a Type 0 (Type0)-physical downlink control channel (PDCCH) common search space (CSS) set.

In an embodiment, for example, in case that the terminal determines to defer the transmission of the first HARQ-ACK information bit in the first time, the terminal is not expected to determine not to defer the transmission of the first HARQ-ACK information bit after the first time; and/or in case that the terminal determine not to defer the transmission of the first HARQ-ACK information bit in the first time, the terminal is not expected to determine to defer the transmission of the first HARQ-ACK information bit after the first time.

In an embodiment, for example, in case that the terminal determines to defer the transmission of the first HARQ-ACK information bit in the first time, the terminal is not expected to transmit a PUCCH or PUSCH that is indicated by first downlink control information (DCI) and overlaps with the first PUCCH after the first time, where the first PUCCH carries the first HARQ-ACK information bit.

In an embodiment, for example, in case that the terminal determines to defer the transmission of the first HARQ-ACK information bit in the first time, the terminal is not expected to transmit a PUCCH that carries a positive scheduling request (SR) and overlaps with the first PUCCH after the first time, where a priority of the positive SR is higher than that of the first PUCCH.

In an embodiment, for example, in case that the terminal determines not to defer the transmission of the first HARQ-ACK information bit in the first time, the terminal is not expected to transmit a PUCCH or PUSCH indicated by second DCI information after the first time, so that a transmission of the first PUCCH is not cancelled by the PUCCH or PUSCH indicated by the second DCI information, where a priority of the PUCCH or PUSCH indicated by the second DCI information is higher than that of the first PUCCH.

In an embodiment, for example, in case that a SPS PDSCH of the one or more SPS PDSCHs overlaps with a PDSCH scheduled by DCI in a same serving cell in time domain, the first HARQ-ACK information bit for the SPS PDSCH is not deferred.

In an embodiment, for example, the configuration information indicates a maximum number of time units (e.g., slots) the transmission of a HARQ-ACK information bit for the SPS PDSCH of the one or more SPS PDSCHs can be deferred.

In an embodiment, operations S1310 and/or S1320 and/or S1330 may be performed based on the methods described according to various embodiments (e.g., various manners described above, such as manners MN1-MN20) of the disclosure.

In an embodiment, the method 1300 may omit one or more of operation S1310, operation S1320 or operation S1330, or may include additional operations, for example, the operations performed by the terminal (e.g., UE) that are described according to various embodiments (e.g., various manners described above, such as manners MN1-MN20) of the disclosure.

Figure 14:
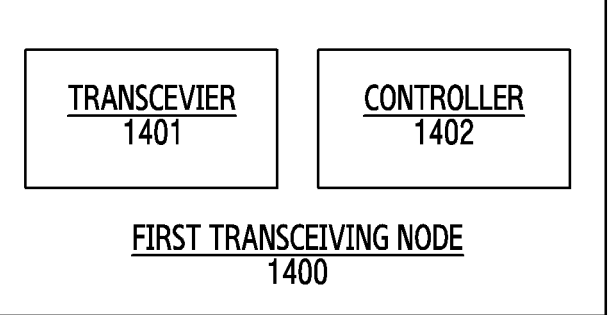
FIG. 14 illustrates a block diagram of a first transceiving node according to an embodiment of the disclosure.

FIG. 14 illustrates a block diagram of a first transceiving node 1400 according to an embodiment of the disclosure.

Referring to FIG. 14, the first transceiving node 1400 may include a transceiver 1401 and a controller 1402.

The transceiver 1401 may be configured to transmit first data and/or first control signaling to a second transceiving node and receive second data and/or second control signaling from the second transceiving node in a time unit.

The controller 1402 may be an application specific integrated circuit or at least one processor. The controller 1402 may be configured to control the overall operation of the first transceiving node, including controlling the transceiver 1401 to transmit the first data and/or the first control signaling to the second transceiving node and receive the second data and/or the second control signaling from the second transceiving node in a time unit.

In an embodiment, the controller 1402 may be configured to perform one or more of the operations in the methods of various embodiments described above.

In the following description, a base station is taken as an example (but not limited thereto) to illustrate the first transceiving node, and a UE is taken as an example (but not limited thereto) to illustrate the second transceiving node. Downlink data and/or downlink control signaling (but not limited thereto) is used to illustrate the first data and/or the first control signaling. Uplink control signaling (but not limited thereto) is used to illustrate the second control signaling.

Figure 15:
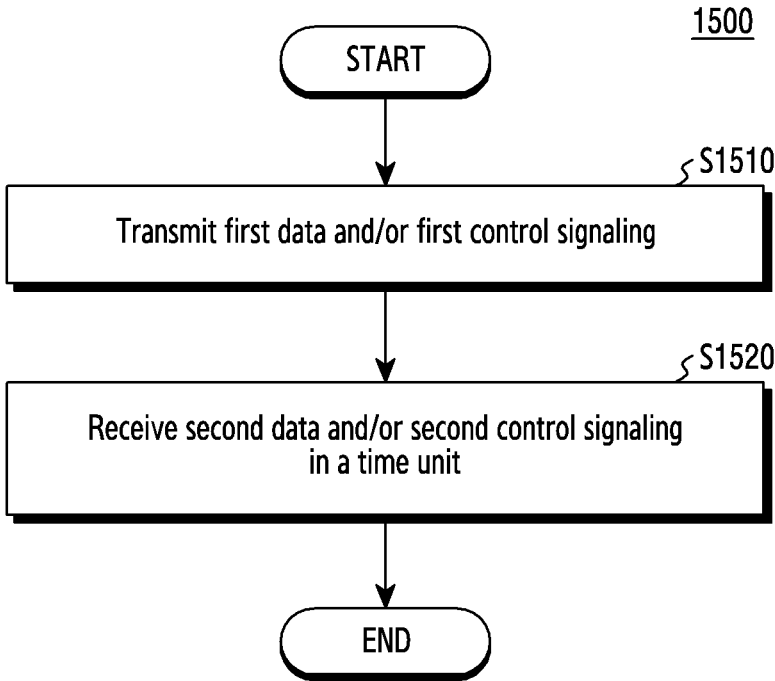
FIG. 15 illustrates a flowchart of a method performed by a base station according to an embodiment of the disclosure.

FIG. 15 illustrates a flowchart of a method 1500 performed by a base station according to an embodiment of the disclosure.

Referring to FIG. 15, in operation S1510, the base station may transmit first data and/or first control signaling.

In operation S1520, the base station may receive second data and/or second control signaling from a UE in a time unit.

For example, the method 1500 may include one or more of the operations performed by the base station that are described in various embodiments (e.g., manners MN1-MN20) of the disclosure.

Figure 16:
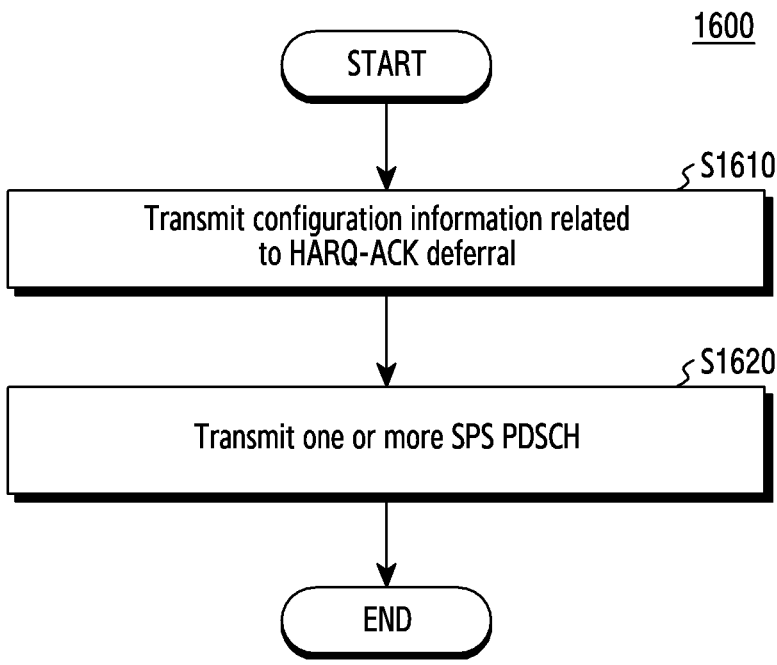
FIG. 16 illustrates a flowchart of a method performed by a base station according to an embodiment of the disclosure.

FIG. 16 illustrates a flowchart of a method 1600 performed by a base station according to an embodiment of the disclosure.

Referring to FIG. 16, in operation S1610, the base station may transmit configuration information related to HARQ-ACK deferral (e.g., the SPS HARQ-ACK deferral parameter described above, such as the higher layer parameter sps-HARQ-Deferral, which may be included in a SPS configuration). For example, the base station may transmit the configuration information related to the HARQ-ACK deferral to a terminal through a higher layer (e.g., RRC) message.

In operation S1620, the base station may transmit one or more SPS PDSCHs. The base station may transmit the one or more SPS PDSCHs to the terminal.

For example, first HARQ-ACK information of at least one of the one or more SPS PDSCHs is determined to be deferred based on a first time.

In an embodiment, for example, the first time may be determined based on a second time.

In an example, the second time may include at least one of: a start position or an end position of a first physical uplink control channel (PUCCH), which is a PUCCH with a first HARQ-ACK information bit; a start position of an earliest PUCCH or PUSCH among the first PUCCH and one or more PUCCHs or physical uplink shared channels (PUSCHs) overlapping with the first PUCCH; a start position or an end position of an uplink time unit of one or more uplink time units (e.g., slots) that include a first uplink time unit where the first PUCCH is located and/or a second uplink time unit after the first uplink time unit; a start position or an end position of a second PUCCH with a third HARQ-ACK information bit that includes a second HARQ-ACK information bit from the first HARQ-ACK information bit, and/or the second PUCCH is located in the second uplink time unit; a start position of an earliest PUCCH or PUSCH among the second PUCCH and/or one or more PUCCHs or PUSCHs overlapping with the second PUCCH; a start position or an end position of a third PUCCH, which is a PUCCH with a fourth HARQ-ACK information bit in the second uplink time unit; a start position of an earliest PUCCH or PUSCH among the third PUCCH and/or one or more PUCCHs or PUSCHs overlapping with the third PUCCH; or a start position of an earliest PUCCH or PUSCH of a set of overlapping PUCCHs or PUSCHs, where the set of overlapping PUCCHs or PUSCHs includes at least one of the first PUCCH, the second PUCCH or the third PUCCH.

In some examples, the first time may be determined to be N time units (e.g., symbols) before the second time or N time units (e.g., symbols) after the second time, where N is a rational number greater than 0.

In an embodiment, operations S1610 and/or S1620 may be performed based on the methods described according to various embodiments (e.g., various manners described above, such as manners MN1-MN20) of the disclosure.

In an embodiment, the method 1600 may omit one of operation S1610 or S1620, or may include additional operations, for example, the operations performed by the base station that are described according to various embodiments (e.g., various manners described above, such as manners MN1-MN20) of the disclosure.

A method performed by a terminal in a wireless communication system is provided. The method comprises receiving a physical downlink control channel (PDCCH) carrying a first downlink control information (DCI) format and for at least one serving cell, validating the PDCCH for activation or release of semi-persistent scheduling SPS physical downlink shared channels (PDSCHs), or receiving retransmissions of the SPS PDSCHs, wherein the at least one serving cell is determined based on the first DCI format.

The first DCI format is scrambled by a first radio network temporary identifier (RNTI) that is used for configured scheduling of transmission.

The at least one serving cell is determined based on at least one of a first field or a second field included in the first DCI format, wherein the first field is used to indicate one or more scheduled cells, and wherein the second field includes one or more start and length indicator value (SLIV) entries.

The at least one serving cell is determined based on one of the one or more scheduled cells indicated by the first field.

The at least one serving cell is determined based on a cell with a smallest cell index or a largest cell index of the one or more scheduled cells indicated by the first field.

The second field indicates a TDRA row that includes an SLIV entry on each of the at least one serving cell and/or a bit value corresponding to the at least one serving cell in a third field included in the first DCI format is set to a predetermined value, wherein the third field is used to indicate new transmission in the one or more scheduled cells.

For each of the at least one serving cell, the terminal separately validates the PDCCH or receives the retransmissions of the SPS PDSCHs.

The first DCI format indicates activation or release of the SPS PDSCHs on all of the at least one serving cell, or retransmission of the SPS PDSCHs on all serving cells of the at least one cell.

The first DCI format indicates activation of the SPS PDSCHs on all of the at least one serving cell, or the first DCI format indicates release of the SPS PDSCHs on all of the at least one serving cell, or retransmission of the SPS PDSCHs on all serving cells of the at least one cell.

A method performed by a terminal in a wireless communication system is provided. The method comprises receiving a physical downlink control channel (PDCCH) carrying a first downlink control information (DCI) format and receiving physical downlink shared channels (PDSCHs) in one or more serving cells based on the first DCI format, the one or more serving cells are determined based on at least one of a first field or a second field included in the first DCI format, the first field is used to indicate one or more scheduled cells, and the second field is used to indicate time domain resource allocation (TDRA) for the PDSCHs.

The one or more serving cells are determined to be the one or more scheduled cells indicated by the first field.

A number of the one or more scheduled cells indicated by the first field is equal to a number of start and length indicator value (SLIV) entries indicated by the second field, wherein the second field indicates a TDRA row that includes an SLIV entry on each of the at least one serving cell.

A number of SLIV entries corresponding to a TDRA row indicated by the second field is not less than N1, where N1 is a number of the one or more scheduled cells indicated by the first field, and the PDSCHs are received based on N1 SLIV entries of the SLIV entries corresponding to the TDRA row indicated by the second field.

A number of the one or more serving cells is a number of SLIV entries corresponding to a TDRA row indicated by the second field.

A number of the one or more serving cells is a minimum value of (i) a number of the one or more scheduled cells indicated by the first field, and (ii) a number of SLIV entries corresponding to a TDRA row indicated by the second field.

A method performed by a terminal in a wireless communication system is provided. The method comprises receiving, from a base station on a first cell, first downlink control information (DCI) for scheduling multiple physical downlink shared channels (PDSCHs) on first multiple cells and receiving, from the base station, the multiple PDSCHs on the first multiple cells based on the first DCI. At least one cyclic redundancy check (CRC) of the first DCI is scrambled with at least one of a first cell radio network temporary identifier (C-RNTI) or a first modulation coding scheme (MCS)-C-RNTI.

The method further comprises receiving, from a base station on a second cell, a second DCI for scheduling multiple physical uplink shared channels (PUSCHs) on second multiple cells and transmitting, to the base station, the multiple PUSCHs on the second multiple cells based on the second DCI. At least one CRC of the second DCI is scrambled with at least one of a second C-RNTI or a second MCS-C-RNTI.

The method further comprises validating a physical downlink control channel (PDCCH) for the first DCI to activate or release semi-persistent scheduling (SPS) PDSCHs on at least one serving cell. The at least one serving cell is based on the first DCI.

The first DCI includes a first field indicating one or more scheduled cells and a second field indicating one or more start and length indicator value (SLIV) entries, and the at least one serving cell is determined based on at least one of the first field or the second field of the first DCI.

The at least one serving cell is determined based on a cell with a smallest cell index or a largest cell index of the one or more scheduled cells indicated by the first field of the first DCI.

A terminal in a wireless communication system is provided. The terminal comprise a transceiver and at least one processor coupled with the transceiver and configured to receive, from a base station on a first cell, first downlink control information (DCI) for scheduling multiple physical downlink shared channels (PDSCHs) on first multiple cells, and receive, from the base station, the multiple PDSCHs on the first multiple cells based on the first DCI. At least one cyclic redundancy check (CRC) of the first DCI is scrambled with at least one of a first cell radio network temporary identifier (C-RNTI) or a first modulation coding scheme (MCS)-C-RNTI.

The at least one processor is further configured to receive, from a base station on a second cell, a second DCI for scheduling multiple physical uplink shared channels (PUSCHs) on second multiple cells, and transmit, to the base station, the multiple PUSCHs on the second multiple cells based on the second DCI. At least one CRC of the second DCI is scrambled with at least one of a second C-RNTI or a second MCS-C-RNTI.

The at least one processor is further configured to validate a physical downlink control channel (PDCCH) for the first DCI to activate or release semi-persistent scheduling (SPS) PDSCHs on at least one serving cell, and the at least one serving cell is based on the first DCI.

The first DCI includes a first field indicating one or more scheduled cells and a second field indicating one or more start and length indicator value (SLIV) entries, and the at least one serving cell is determined based on at least one of the first field or the second field of the first DCI.

The at least one serving cell is determined based on a cell with a smallest cell index or a largest cell index of the one or more scheduled cells indicated by the first field of the first DCI.

A method performed by a base station in a wireless communication system is provided. The method comprises transmitting, to a terminal on a first cell, first downlink control information (DCI) for scheduling multiple physical downlink shared channels (PDSCHs) on first multiple cells and transmitting, to the terminal, the multiple PDSCHs on the first multiple cells based on the first DCI. At least one cyclic redundancy check (CRC) of the first DCI is scrambled with at least one of a first cell radio network temporary identifier (C-RNTI) or a first modulation coding scheme (MCS)-C-RNTI.

The method further comprises transmitting, to the terminal on a second cell, a second DCI for scheduling multiple physical uplink shared channels (PUSCHs) on second multiple cells and receiving, from the terminal, the multiple PUSCHs on the second multiple cells based on the second DCI. At least one CRC of the second DCI is scrambled with at least one of a second C-RNTI or a second MCS-C-RNTI.

The method further comprises activating or releasing semi-persistent scheduling (SPS) PDSCHs on at least one serving cell based on a physical downlink control channel (PDCCH) for the first DCI.

The first DCI includes a first field indicating one or more scheduled cells and a second field indicating one or more start and length indicator value (SLIV) entries, and the at least one serving cell is associated with at least one of the first field or the second field of the first DCI.

The at least one serving cell is associated with a cell with a smallest cell index or a largest cell index of the one or more scheduled cells indicated by the first field of the first DCI.

A base station in a wireless communication system is provided. The base station comprises a transceiver; and at least one processor coupled with the transceiver and configured to transmit, to a terminal on a first cell, first downlink control information (DCI) for scheduling multiple physical downlink shared channels (PDSCHs) on first multiple cells, and transmit, to the terminal, the multiple PDSCHs on the first multiple cells based on the first DCI. At least one cyclic redundancy check (CRC) of the first DCI is scrambled with at least one of a first cell radio network temporary identifier (C-RNTI) or a first modulation coding scheme (MCS)-C-RNTI.

The at least one processor is further configured to transmit, to the terminal on a second cell, a second DCI for scheduling multiple physical uplink shared channels (PUSCHs) on second multiple cells, and receive, from the terminal, the multiple PUSCHs on the second multiple cells based on the second DCI. At least one CRC of the second DCI is scrambled with at least one of a second C-RNTI or a second MCS-C-RNTI.

The at least one processor is further configured to activate or release semi-persistent scheduling (SPS) PDSCHs on at least one serving cell based on a physical downlink control channel (PDCCH) for the first DCI.

The first DCI includes a first field indicating one or more scheduled cells and a second field indicating one or more start and length indicator value (SLIV) entries, and the at least one serving cell is associated with at least one of the first field or the second field of the first DCI.

The at least one serving cell is associated with a cell with a smallest cell index or a largest cell index of the one or more scheduled cells indicated by the first field of the first DCI.

Figure 17:
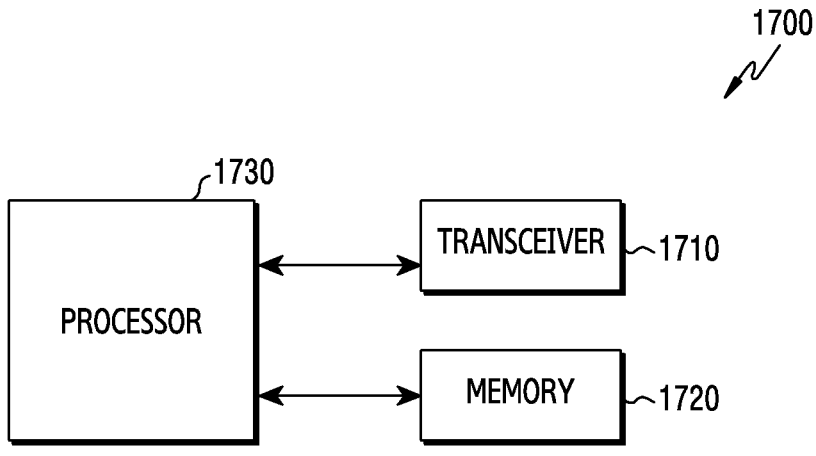
FIG. 17 illustrates a structure of a UE according to an embodiment of the disclosure.

FIG. 17 illustrates a structure of a UE 1700 according to an embodiment of the disclosure.

Referring to FIG. 17, the UE 1700 according to an embodiment may include a transceiver 1710, a memory 1720, and a processor 1730. The transceiver 1710, the memory 1720, and the processor 1730 of the UE may operate according to a communication method of the UE described above. However, the components of the UE are not limited thereto. For example, the UE may include more or fewer components than those described above. In addition, the processor 1730, the transceiver 1710, and the memory 1720 may be implemented as a single chip. Also, the processor 1730 may include at least one processor. Furthermore, the UE of FIG. 17 corresponds to the UE of FIG. 1.

The transceiver 1710 collectively refers to a UE receiver and a UE transmitter, and may transmit/receive a signal to/from a base station or a network entity. The signal transmitted or received to or from the base station or a network entity may include control information and data. The transceiver 1710 may include an RF transmitter for up-converting and amplifying a frequency of a transmitted signal, and an RF receiver for amplifying low-noise and down-converting a frequency of a received signal. However, this is only an example of the transceiver 1710 and components of the transceiver 1710 are not limited to the RF transmitter and the RF receiver.

Also, the transceiver 1710 may receive and output, to the processor 1730, a signal through a wireless channel, and transmit a signal output from the processor 1730 through the wireless channel.

The memory 1720 may store a program and data required for operations of the UE. Also, the memory 1720 may store control information or data included in a signal obtained by the UE. The memory 1720 may be a storage medium, such as read-only memory (ROM), random access memory (RAM), a hard disk, a CD-ROM, and a DVD, or a combination of storage media.

The processor 1730 may control a series of processes such that the UE operates as described above. For example, the transceiver 1710 may receive a data signal including a control signal transmitted by the base station or the network entity, and the processor 1730 may determine a result of receiving the control signal and the data signal transmitted by the base station or the network entity.

Figure 18:
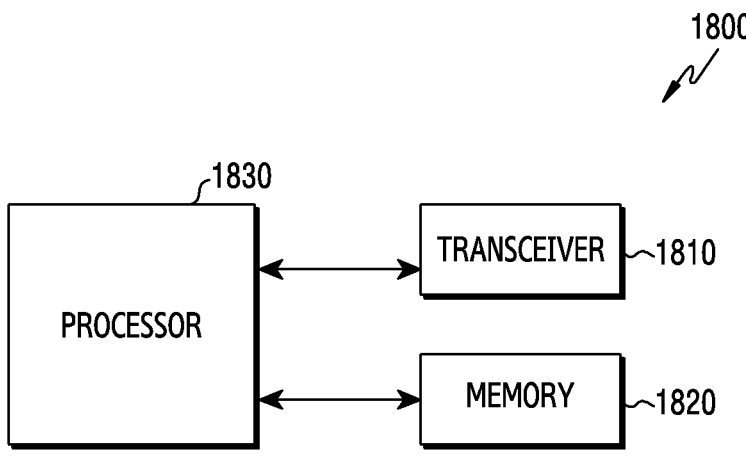
FIG. 18 illustrates a structure of a base station according to an embodiment of the disclosure.

FIG. 18 illustrates a structure of a base station 1800 according to an embodiment of the disclosure.

Referring to FIG. 18, the base station 1800 according to an embodiment may include a transceiver 1810, a memory 1820, and a processor 1830. The transceiver 1810, the memory 1820, and the processor 1830 of the base station may operate according to a communication method of the base station described above. However, the components of the base station are not limited thereto. For example, the base station may include more or fewer components than those described above. In addition, the processor 1830, the transceiver 1810, and the memory 1820 may be implemented as a single chip. Also, the processor 1830 may include at least one processor. Furthermore, the base station of FIG. 18 corresponds to base station of FIG. 1 to FIG. 17.

The transceiver 1810 collectively refers to a base station receiver and a base station transmitter, and may transmit/receive a signal to/from a terminal (UE) or a network entity. The signal transmitted or received to or from the terminal or a network entity may include control information and data. The transceiver 1810 may include an RF transmitter for up-converting and amplifying a frequency of a transmitted signal, and an RF receiver for amplifying low-noise and down-converting a frequency of a received signal. However, this is only an example of the transceiver 1810 and components of the transceiver 1810 are not limited to the RF transmitter and the RF receiver.

Also, the transceiver 1810 may receive and output, to the processor 1830, a signal through a wireless channel, and transmit a signal output from the processor 1830 through the wireless channel.

The memory 1820 may store a program and data required for operations of the base station. Also, the memory 1820 may store control information or data included in a signal obtained by the base station. The memory 1820 may be a storage medium, such as read-only memory (ROM), random access memory (RAM), a hard disk, a CD-ROM, and a DVD, or a combination of storage media.

The processor 1830 may control a series of processes such that the base station operates as described above. For example, the transceiver 1810 may receive a data signal including a control signal transmitted by the terminal, and the processor 1830 may determine a result of receiving the control signal and the data signal transmitted by the terminal.

A terminal, a base station and a communication method thereof in a wireless communication system are provided. The method performed by the terminal includes receiving a physical downlink control channel (PDCCH) carrying a first downlink control information (DCI) format, and for at least one serving cell, validating the PDCCH for activation or release of a semi-persistent scheduling (SPS) physical downlink shared channel (PDSCHs), or receiving a retransmission of the SPS PDSCHs, where the at least one serving cell is determined based on the first DCI format. The disclosure can improve the communication efficiency.

Those skilled in the art will understand that the above illustrative embodiments are described herein and are not intended to be limiting. It should be understood that any two or more of the embodiments disclosed herein may be combined in any combination. Furthermore, other embodiments may be utilized and other changes may be made without departing from the spirit and scope of the subject matter presented herein. It will be readily understood that aspects of the disclosure of the disclosure as generally described herein and shown in the drawings may be arranged, replaced, combined, separated and designed in various different configurations, all of which are contemplated herein.

Those skilled in the art will understand that the various illustrative logical blocks, modules, circuits, and steps described in this application may be implemented as hardware, software, or a combination of both. To clearly illustrate this interchangeability between hardware and software, various illustrative components, blocks, modules, circuits, and steps are generally described above in the form of their functional sets. Whether such function sets are implemented as hardware or software depends on the specific application and the design constraints imposed on the overall system. Technicians may implement the described functional sets in different ways for each specific application, but such design decisions should not be interpreted as causing a departure from the scope of this application.

The various illustrative logic blocks, modules, and circuits described in this application may be implemented or performed by a general purpose processor, a Digital Signal Processor (DSP), an Application Specific Integrated Circuit (ASIC), a Field Programmable Gate Array (FPGA) or other programmable logic devices, discrete gates or transistor logics, discrete hardware components, or any combination thereof designed to perform the functions described herein. The general purpose processor may be a microprocessor, but in an alternative, the processor may be any conventional processor, controller, microcontroller, or state machine. The processor may also be implemented as a combination of computing devices, such as a combination of a DSP and a microprocessor, a plurality of microprocessors, one or more microprocessors cooperating with a DSP core, or any other such configuration.

The steps of the method or algorithm described in this application may be embodied directly in hardware, in a software module executed by a processor, or in a combination thereof. The software module may reside in RAM memory, flash memory, ROM memory, erasable programmable read only memory (EPROM) memory, electrically erasable programmable read only memory (EEPROM) memory, register, hard disk, removable disk, or any other form of storage medium known in the art. A storage medium is coupled to a processor to enable the processor to read and write information from/to the storage media. In an alternative, the storage medium may be integrated into the processor. The processor and the storage medium may reside in an ASIC. The ASIC may reside in a user terminal. In an alternative, the processor and the storage medium may reside in the user terminal as discrete components.

In one or more designs, the functions may be implemented in hardware, software, firmware, or any combination thereof. If implemented in software, each function may be stored as one or more pieces of instructions or codes on a computer-readable medium or delivered through it. The computer-readable medium includes both a computer storage medium and a communication medium, the latter including any medium that facilitates the transfer of computer programs from one place to another. The storage medium may be any available medium that can be accessed by a general purpose or special purpose computer.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
 receiving, from a base station, configuration information including first information indicating whether to monitor in a UE specific search space (USS) for first downlink control information (DCI) for scheduling multiple physical downlink shared channels (PDSCHs) in first multiple cells;
 in case that the first information indicates to monitor in the USS for the first DCI, receiving, from the base station, the first DCI for scheduling the multiple PDSCHs in the first multiple cells; and
 receiving, from the base station, the multiple PDSCHs in the first multiple cells based on the first DCI,
 wherein at least one cyclic redundancy check (CRC) of the first DCI is scrambled with at least one of a first cell radio network temporary identifier (C-RNTI) or a first modulation and coding scheme (MCS)-C-RNTI.

2. The method of claim 1,
 wherein the first information further indicates whether to monitor in the USS for a second DCI for scheduling multiple physical uplink shared channels (PUSCHs) in second multiple cells,
 wherein the method further comprises:
  in case that the first information indicates to monitor in the USS for the second DCI, receiving, from the base station, the second DCI for scheduling the multiple PUSCHs in the second multiple cells; and
  transmitting, to the base station, the multiple PUSCHs in the second multiple cells based on the second DCI, and
 wherein at least one CRC of the second DCI is scrambled with at least one of a second C-RNTI or a second MCS-C-RNTI.

3. The method of claim 1, further comprising:
 validating a physical downlink control channel (PDCCH) for the first DCI to activate or release semi-persistent scheduling (SPS) PDSCHs on at least one serving cell,
 wherein the at least one serving cell is based on the first DCI,
 wherein the first DCI includes a first field indicating one or more scheduled cells and a second field indicating one or more start and length indicator value (SLIV) entries, and
 wherein the at least one serving cell is determined based on at least one of the first field or the second field of the first DCI.

4. The method of claim 3, wherein the at least one serving cell is determined based on a cell with a smallest cell index or a largest cell index of the one or more scheduled cells indicated by the first field of the first DCI.

5. The method of claim 1, wherein the UE is configured with second information on a number of repetitions for data, and
 wherein the multiple PDSCHs are received based on the second information on the number of the repetitions.

6. A user equipment (UE) comprising:
 at least one transceiver;
 at least one processor communicatively coupled to the at least one transceiver; and
 memory, communicatively coupled to the at least one processor, storing instructions executable by the at least one processor individually or in any combination to cause the UE to:
  receive, from a base station, configuration information including first information indicating whether to monitor in a UE specific search space (USS) for first downlink control information (DCI) for scheduling multiple physical downlink shared channels (PDSCHs) in first multiple cells,
  in case that the first information indicates to monitor in the USS for the first DCI, receive, from the base station, the first DCI for scheduling the multiple PDSCHs in the first multiple cells, and
  receive, from the base station, the multiple PDSCHs in the first multiple cells based on the first DCI,
 wherein at least one cyclic redundancy check (CRC) of the first DCI is scrambled with at least one of a first cell radio network temporary identifier (C-RNTI) or a first modulation and coding scheme (MCS)-C-RNTI.

7. The UE of claim 6,
 wherein the first information further indicates whether to monitor in the USS for a second DCI for scheduling multiple physical uplink shared channels (PUSCHs) in second multiple cells, wherein the instructions further cause the UE to:

in case that the first information indicates to monitor in the USS for the second DCI, receive, from the base station, the second DCI for scheduling the multiple PUSCHs in the second multiple cells, and transmit, to the base station, the multiple PUSCHs in the second multiple cells based on the second DCI, and wherein at least one CRC of the second DCI is scrambled with at least one of a second C-RNTI or a second MCS-C-RNTI.

8. The UE of claim 6, wherein the instructions further cause the UE to validate a physical downlink control channel (PDCCH) for the first DCI to activate or release semi-persistent scheduling (SPS) PDSCHs on at least one serving cell, wherein the at least one serving cell is based on the first DCI, wherein the first DCI includes a first field indicating one or more scheduled cells and a second field indicating one or more start and length indicator value (SLIV) entries, and wherein the at least one serving cell is determined based on at least one of the first field or the second field of the first DCI.

9. The UE of claim 8, wherein the at least one serving cell is determined based on a cell with a smallest cell index or a largest cell index of the one or more scheduled cells indicated by the first field of the first DCI.

10. The UE of claim 6, wherein the UE is configured with second information on a number of repetitions for data, and wherein the multiple PDSCHs are received based on the second information on the number of the repetitions.

11. A method performed by a base station, the method comprising:

transmitting, to a user equipment (UE), configuration information including first information indicating whether to monitor in a UE specific search space (USS) for first downlink control information (DCI) for scheduling multiple physical downlink shared channels (PDSCHs) in first multiple cells;

in case that the first information indicates to monitor in the USS for the first DCI, transmitting, to the UE, the first DCI for scheduling the multiple PDSCHs in the first multiple cells; and transmitting, to the UE, the multiple PDSCHs in the first multiple cells based on the first DCI, wherein at least one cyclic redundancy check (CRC) of the first DCI is scrambled with at least one of a first cell radio network temporary identifier (C-RNTI) or a first modulation and coding scheme (MCS)-C-RNTI.

12. The method of claim 11, wherein the first information further indicates whether to monitor in the USS for a second DCI for scheduling multiple physical uplink shared channels (PUSCHs) in second multiple cells, wherein the method further comprises:

in case that the first information indicates to monitor in the USS for the second DCI, transmitting, to the UE, the second DCI for scheduling the multiple PUSCHs in the second multiple cells; and receiving, from the UE, the multiple PUSCHs in the second multiple cells based on the second DCI, and wherein at least one CRC of the second DCI is scrambled with at least one of a second C-RNTI or a second MCS-C-RNTI.

13. The method of claim 11, further comprising:

activating or releasing semi-persistent scheduling (SPS) PDSCHs on at least one serving cell based on a physical downlink control channel (PDCCH) for the first DCI, wherein the first DCI includes a first field indicating one or more scheduled cells and a second field indicating one or more start and length indicator value (SLIV) entries, and wherein the at least one serving cell is associated with at least one of the first field or the second field of the first DCI.

14. The method of claim 13, wherein the at least one serving cell is associated with a cell with a smallest cell index or a largest cell index of the one or more scheduled cells indicated by the first field of the first DCI.

15. The method of claim 11, wherein the UE is configured with second information on a number of repetitions for data, and wherein the multiple PDSCHs are transmitted based on the second information on the number of the repetitions.

16. A base station comprising:

at least one transceiver;

at least one processor communicatively coupled to the at least one transceiver; and memory, communicatively coupled to the at least one processor, storing instructions executable by the at least one processor individually or in any combination to cause the base station to transmit, to a user equipment (UE), configuration information including first information indicating whether to monitor in a UE specific search space (USS) for first downlink control information (DCI) for scheduling multiple physical downlink shared channels (PDSCHs) in first multiple cells, in case that the first information indicates to monitor in the USS for the first DCI, transmit, to the UE, the first DCI for scheduling the multiple PDSCHs in the first multiple cells, and transmit, to UE, the multiple PDSCHs in the first multiple cells based on the first DCI, wherein at least one cyclic redundancy check (CRC) of the first DCI is scrambled with at least one of a first cell radio network temporary identifier (C-RNTI) or a first modulation and coding scheme (MCS)-C-RNTI.

17. The base station of claim 16, wherein the first information further indicates whether to monitor in the USS for a second DCI for scheduling multiple physical uplink shared channels (PUSCHs) in second multiple cells, wherein the instructions further cause the base station to:

in case that the first information indicates to monitor in the USS for the second DCI, transmit, to the UE, the second DCI for scheduling the multiple PUSCHs in the second multiple cells, and receive, from the UE, the multiple PUSCHs in the second multiple cells based on the second DCI, and wherein at least one CRC of the second DCI is scrambled with at least one of a second C-RNTI or a second MCS-C-RNTI.

18. The base station of claim 16, wherein the instructions further cause the base station to activate or release semi-persistent scheduling (SPS) PDSCHs on at least one serving cell based on a physical downlink control channel (PDCCH) for the first DCI, wherein the first DCI includes a first field indicating one or more scheduled cells and a second field indicating one or more start and length indicator value (SLIV) entries, and wherein the at least one serving cell is associated with at least one of the first field or the second field of the first DCI.

19. The base station of claim 18, wherein the at least one serving cell is associated with a cell with a smallest cell index or a largest cell index of the one or more scheduled cells indicated by the first field of the first DCI.

20. The base station of claim 16, wherein the UE is configured with second information on a number of repetitions for data, and wherein the multiple PDSCHs are transmitted based on the second information on the number of the repetitions.

* * * * *